(12) United States Patent
Chang et al.

(10) Patent No.: US 12,164,178 B2
(45) Date of Patent: Dec. 10, 2024

(54) IMAGING OPTICAL LENS ASSEMBLY, IMAGING APPARATUS AND ELECTRONIC DEVICE

(71) Applicant: LARGAN PRECISION CO., LTD., Taichung (TW)

(72) Inventors: Shao-Yu Chang, Taichung (TW); Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 18/222,538

(22) Filed: Jul. 17, 2023

(65) Prior Publication Data

US 2023/0375804 A1 Nov. 23, 2023

Related U.S. Application Data

(63) Continuation of application No. 17/011,160, filed on Sep. 3, 2020, now Pat. No. 11,747,590.

(30) Foreign Application Priority Data

May 4, 2020 (TW) ................................ 109114814

(51) Int. Cl.
| | |
|---|---|
| G02B 9/12 | (2006.01) |
| G02B 3/04 | (2006.01) |
| G02B 7/00 | (2021.01) |
| G02B 9/60 | (2006.01) |
| G02B 17/02 | (2006.01) |

(52) U.S. Cl.
CPC ............. *G02B 9/60* (2013.01); *G02B 3/04* (2013.01); *G02B 7/003* (2013.01); *G02B 9/12* (2013.01); *G02B 17/023* (2013.01)

(58) Field of Classification Search
None
See application file for complete search history.

(56) References Cited

U.S. PATENT DOCUMENTS

| | | | |
|---|---|---|---|
| 4,398,809 A * | 8/1983 | Canzek | G02B 17/0856 359/731 |
| 5,781,350 A | 7/1998 | Tachihara et al. | |
| 7,515,345 B2 | 4/2009 | Heimer | |
| 9,310,587 B2 | 4/2016 | Tsai et al. | |
| 9,557,627 B2 | 1/2017 | Mercado | |
| 10,234,659 B2 | 3/2019 | Yao et al. | |
| 10,437,022 B2 | 10/2019 | Yao et al. | |

(Continued)

FOREIGN PATENT DOCUMENTS

| | | |
|---|---|---|
| CN | 104898352 A | 9/2015 |
| CN | 104991329 B | 8/2017 |

(Continued)

*Primary Examiner* — Darryl J Collins
(74) *Attorney, Agent, or Firm* — Locke Lord LLP; Tim Tingkang Xia, Esq.

(57) ABSTRACT

An imaging optical lens assembly includes five optical elements with refractive power. The five optical elements, in order from an object side to an image side along an optical path, are a first optical element, a second optical element, a third optical element, a fourth optical element, and a fifth optical element. The first optical element has an object-side surface being concave in a paraxial region thereof. The third optical element has negative refractive power.

24 Claims, 69 Drawing Sheets

(56) References Cited

U.S. PATENT DOCUMENTS

| | | |
|---|---|---|
| 10,788,651 B2 | 9/2020 | Bae |
| 11,340,388 B2 | 5/2022 | Shigemitsu et al. |
| 2008/0291531 A1 | 11/2008 | Heimer |
| 2011/0141581 A1* | 6/2011 | Lee .................... G02B 17/0856 359/728 |
| 2013/0182339 A1 | 7/2013 | Sekine et al. |
| 2013/0308181 A1* | 11/2013 | Nakano .............. G02B 17/0824 359/365 |
| 2014/0226203 A1* | 8/2014 | Nakano .............. G02B 17/0856 359/728 |
| 2016/0327773 A1 | 11/2016 | Choi et al. |
| 2018/0341086 A1 | 11/2018 | Tseng et al. |
| 2019/0196148 A1 | 6/2019 | Yao et al. |
| 2020/0073028 A1 | 3/2020 | Shigemitsu et al. |

FOREIGN PATENT DOCUMENTS

| | | |
|---|---|---|
| CN | 208569167 U | 3/2019 |
| CN | 208872940 U | 5/2019 |
| CN | 209525527 U | 10/2019 |
| CN | 110780422 A | 2/2020 |
| JP | 1987278519 A | 12/1987 |
| JP | 2001356265 A | 12/2001 |
| TW | I656374 B | 4/2019 |
| WO | 2019234506 A1 | 12/2019 |

\* cited by examiner

IMAGING OPTICAL LENS ASSEMBLY, IMAGING APPARATUS AND ELECTRONIC DEVICE

RELATED APPLICATIONS

This application is a continuation application of U.S. application Ser. No. 17/011,160, filed on Sep. 3, 2020, now approved and claims priority to Taiwan Application Serial Number 109114814, filed on May 4, 2020, which is incorporated by reference herein in its entirety.

BACKGROUND

Technical Field

The present disclosure relates to an imaging optical lens assembly and an imaging apparatus, and more particularly, to an imaging optical lens assembly and an imaging apparatus applicable to electronic devices.

Description of Related Art

As the applications of camera modules are becoming more and more extensive, installing a camera module in various smart electronic products such as car devices, identification systems, entertainment devices, sports devices and smart home systems is a major trend for future technology development. In order to provide more extensive user experiences, smart devices equipped with one, two, three or even more lenses have gradually become the mainstream on the market. In response to different application needs, optical systems with different optical properties have been developed.

With the rapid technology development, the application range of electronic devices equipped with an imaging optical system is more extensive, and the requirements for the imaging optical system are also more diversified. As a conventional imaging optical system is unable to meet the current demands, there is a need for an imaging optical system capable of balancing between the requirements such as imaging quality, sensitivity, aperture size, volume, or angle of view.

SUMMARY

According to one aspect of the present disclosure, an imaging optical lens assembly includes five optical elements with refractive power. The five optical elements, in order from an object side to an image side along an optical path, are a first optical element, a second optical element, a third optical element, a fourth optical element, and a fifth optical element.

The first optical element has an object-side surface being concave in a paraxial region thereof. The third optical element has negative refractive power. A sum of axial thicknesses of the first optical element, the second optical element, the third optical element, the fourth optical element, and the fifth optical element along the optical path is $\Sigma CT$, an axial thickness of the first optical element along the optical path is CT1, and the following condition is satisfied:

$$\Sigma CT/CT1<2.30.$$

According to another aspect of the present disclosure, an imaging optical lens assembly includes five optical elements with refractive power. The five optical elements, in order from an object side to an image side along an optical path, are a first optical element, a second optical element, a third optical element, a fourth optical element, and a fifth optical element.

The first optical element has an object-side surface being concave in a paraxial region thereof. The first optical element has an image-side surface being convex in a paraxial region thereof. The third optical element has negative refractive power. The fifth optical element has an image-side surface being concave thereof. A sum of axial thicknesses of the first optical element, the second optical element, the third optical element, the fourth optical element, and the fifth optical element along the optical path is $\Sigma CT$, an axial thickness of the first optical element along the optical path is CT1, and the following condition is satisfied:

$$\Sigma CT/CT1<3.0.$$

According to another aspect of the present disclosure, an imaging optical lens assembly includes five optical elements with refractive power. The five optical elements, in order from an object side to an image side along an optical path, are a first optical element, a second optical element, a third optical element, a fourth optical element, and a fifth optical element.

The first optical element has an object-side surface being concave in a paraxial region thereof. The first optical element includes a reflective surface. A sum of axial thicknesses of the first optical element, the second optical element, the third optical element, the fourth optical element, and the fifth optical element along the optical path is $\Sigma CT$, an axial thickness of the first optical element along the optical path is CT1, and the following condition is satisfied:

$$\Sigma CT/CT1<3.0.$$

According to another aspect of the present disclosure, an imaging optical lens assembly includes a plurality of optical elements with refractive power.

At least one of the optical elements with refractive power includes a reflective surface, is made of cyclo olefin polymer material, and has an object-side surface being concave in a paraxial region thereof.

According to another aspect of the present disclosure, an imaging apparatus includes the aforementioned imaging optical lens assembly and an image sensor.

According to another aspect of the present disclosure, an electronic device includes at least three imaging apparatuses. The three imaging apparatuses include the aforementioned imaging apparatus. The three imaging apparatuses face the same direction. A maximum angle of view among the three imaging apparatuses is FOVmax, a minimum angle of view among the three imaging apparatuses is FOVmin, and the following condition is satisfied:

$$40<FOVmax-FOVmin.$$

DETAILED DESCRIPTION

Figure 1A:
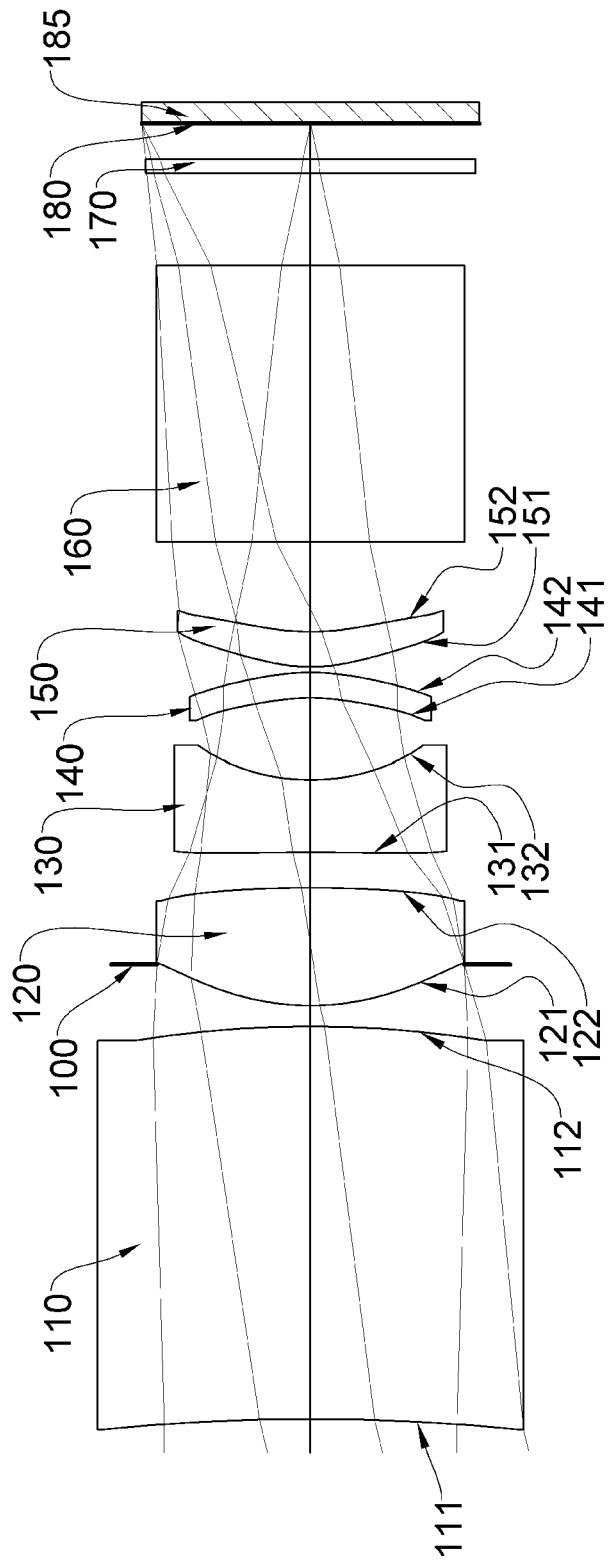
FIG. 1A is a schematic view of an imaging apparatus according to the 1st embodiment of the present disclosure.

In recent years, the miniaturization of electronic devices is becoming a trend. However, it is difficult for conventional imaging lenses to meet the requirements of high specifications and miniaturization concurrently, especially the compact lens systems with large apertures or telephoto features. Furthermore, as the demand and standard for optical zoom features have become higher (such as increased zoom ratios, etc.), the conventional telephoto lens systems are unable to meet the demand (with an overly long total length, an overly small aperture, insufficient imaging quality or lack of miniaturization). As such, different optical configurations with folded optical axis are required to solve the aforementioned problems. Due to the thickness limitation of electronic devices, some optical lens systems have lens barrels or lens elements trimmed to remove the portions that are not used for imaging so as to reduce the size of the lens system in one dimension. Reflective elements can be used to provide the thickness reduction and a sufficient total length for telephoto configurations.

The present disclosure provides an imaging optical lens assembly including five optical elements. The five optical elements, in order from an object side to an image side along an optical path, are a first optical element, a second optical element, a third optical element, a fourth optical element, and a fifth optical element.

The first optical element may have positive refractive power so as to reduce the total length of the imaging optical lens assembly. The first optical element has an object-side surface being concave in a paraxial region thereof so as to adjust incident light from larger angles of view. The first optical element may have an image-side surface being convex in a paraxial region thereof so as to favorably correct aberrations. The first optical element may include a reflective surface, which can further provide the functionality of a reflective element, is favorable for imaging, and can also reduce the size of the first optical element and the required total thickness of the camera module, which will be applicable in thin and compact electronic devices. The first optical element may have both the object-side surface and the image-side surface being spherical so as to simplify manufacturing and improve the yield rates.

The second optical element may have positive refractive power so as to provide significant converging abilities such that the imaging optical lens assembly can be effectively miniaturized.

The third optical element may have negative refractive power so as to favorably correct aberrations from the second optical element.

The fifth optical element may have an image-side surface being concave in a paraxial region thereof so as to effectively control the back focal length and adjust the incident angle of the chief ray on the image surface. The fifth optical element may have an object-side surface being convex in a paraxial region thereof so as to improve astigmatism correction.

The first optical element, the second optical element, the third optical element, the fourth optical element and the fifth optical element may all be made of plastic so as to reduce the weight and the manufacturing cost of the imaging optical lens assembly.

A sum of axial thicknesses of the first optical element, the second optical element, the third optical element, the fourth optical element, and the fifth optical element along the optical path is ΣCT, and an axial thickness of the first optical element along the optical path is CT1. When the imaging optical lens assembly satisfies the following condition: ΣCT/CT1<3.0, it is favorable for the first optical element having a sufficient thickness to fold the optical path. Moreover, the following condition can be satisfied: ΣCT/CT1<2.50. Moreover, the following condition can be satisfied: ΣCT/CT1<2.30. Moreover, the following condition can be satisfied: ΣCT/CT1<2.0.

A focal length of the imaging optical lens assembly is f, a focal length of the second optical element is f2, and a focal length of the third optical element is f3. When the imaging optical lens assembly satisfies the following condition: 3.0<|f/f2|+|f/f3|<6.0, it is favorable for providing sufficient refractive power in the middle section of the optical system so as to balance the total length of the imaging optical lens assembly and imaging quality.

A focal length of the first optical element is f1, the focal length of the second optical element is f2, the focal length of the third optical element is f3, a focal length of the fourth optical element is f4, and a focal length of the fifth optical element is f5. When the imaging optical lens assembly satisfies the following condition: f2/f1|<0.75; |f2/f4|<0.75; |f2/f5|<0.75; |f3/f1|<0.75; |f3/f4|<0.75; |f3/f5|<0.75, it is favorable for having sufficient refractive power in the middle section of the optical system so as to reduce the total length of the imaging optical lens assembly.

The focal length of the second optical element is f2, and the focal length of the third optical element is f. When the imaging optical lens assembly satisfies the following condition: |f3/f2|<1.0, the refractive power between the second optical element and the third optical element can be balanced.

The focal length of the imaging optical lens assembly is f, a curvature radius of an object-side surface of the second optical element is R3, and a curvature radius of an image-side surface of the third optical element is R6. When the imaging optical lens assembly satisfies the following condition: (f/R3)+(f/R6), it is favorable for correcting aberrations so as to improve imaging quality.

The focal length of the imaging optical lens assembly is f, and the focal length of the first optical element is f1. When the imaging optical lens assembly satisfies the following condition: 0.03<f/f1<0.40, it is favorable for balancing the refractive power and the manufacturing complexity of the first optical element.

The focal length of the imaging optical lens assembly is f, a curvature radius of the object-side surface of the first optical element is R1, and a curvature radius of the image-side surface of the first optical element is R2. When the imaging optical lens assembly satisfies the following condition: 0.50<|f/R1|+|f/R2|<2.50, the lens surfaces of the first optical element can have suitable shapes so as to reduce the difficulty in manufacturing and increase the yield rate. Moreover, the following condition can be satisfied: 0.75<|f/R1|+|f/R2|<1.60.

An axial distance between an object-side surface of the second optical element and the image-side surface of the fifth optical element along the optical path is Dr3r10, an axial distance between the image-side surface of the fifth optical element and an image surface along the optical path is BL. When the imaging optical lens assembly satisfies the following condition: Dr3r10/BL<1.0, there is enough space between the lens and the imaging surface for disposing optical path folding or other optical elements, which will provide a wider range of functions and applications.

An axial thickness of the second optical element along the optical path is CT2, and an axial thickness of the third optical element along the optical path is CT3. When the imaging optical lens assembly satisfies the following condition: CT2/CT3<2.0, it is favorable for enhancing the structural strength of the second optical element and the third optical element.

An axial distance between the object-side surface of the first optical element and the image surface along the optical path remains the same while the imaging optical lens assembly is focusing such that the total length of the imaging optical lens can be limited, and it is favorable for the design and configuration of the optical elements of the imaging optical lens assembly.

An Abbe number of an optical element with refractive power is V, and a refractive index of the optical element with refractive power is N. When at least one optical element of the imaging optical lens assembly satisfies the following condition: 5.0<V/N<12.0, corrections of chromatic aberrations and astigmatism can be balanced and the effective radius of the optical element can be favorably reduced so as to improve the miniaturization of the optical lens assembly.

An f-number of the imaging optical lens assembly is Fno. When the imaging optical lens assembly satisfies the following condition: 2.0<Fno<4.0, the aperture can be effective increased to enhance photographic functions in low-light conditions.

An axial thickness of the second optical element along the optical path is CT2, an axial thickness of the third optical element along the optical path is CT3, an axial thickness of the fourth optical element along the optical path is CT4, and an axial thickness of the fifth optical element along the optical path is CT5. When the imaging optical lens assembly satisfies the following condition: 2.0<(CT2+CT3)/(CT4+CT5), it is favorable for increasing the thicknesses of the second optical element and the third optical element and thereby enhancing the structural strength thereof. Moreover, the following condition can be satisfied: 2.75<(CT2+CT3)/(CT4+CT5).

A focal length of the imaging optical lens assembly is f, a curvature radius of an object-side surface of the fifth optical element is R9, and a curvature radius of an image-side surface of the fifth optical element is R10. When the imaging optical lens assembly satisfies the following condition: 7.0<(f/R9)+(f/R10), the exit pupil can be shifted toward the object side so as to favorably reduce the expansion speed of light beams after passing through the lens for miniaturization of the lens module.

A maximum vertical distance between a point on an effective optical region of the object-side surface of the second optical element and an optical axis is Y2R1, and a maximum vertical distance between a point on an effective optical region of the image-side surface of the fifth optical element and the optical axis is Y5R2. When the imaging optical lens assembly satisfies the following condition: 0.90<Y2R1/Y5R2<1.25, the beam size can be favorably controlled so as to avoid an overly large effective radius of the optical elements which will negatively affect the lens miniaturization.

The glass transition temperature of the material of the first optical element is Tg1, and a refractive index of the first optical element is N1. When the imaging optical lens assembly satisfies the following condition: $92.5<Tg1/N1<105$, the selection of a proper material for the first optical element can increase the yield rate thereof.

The present disclosure provides an imaging optical lens assembly, including a plurality of optical elements with refractive power. At least one optical element with refractive power includes a reflective surface. The at least one optical element with refractive power is made of cyclo olefin polymer material. The at least one optical element with refractive power has an object-side surface being concave in a paraxial region thereof. As such, the imaging optical lens assembly will not only improve the imaging function, but also reduce the thickness required for the camera module such that the module can be utilized in a thin and compact electronic device.

The glass transition temperature of the at least one optical element with refractive power is Tg, and a refractive index of the at least one optical element with refractive power is N. When the imaging optical lens assembly satisfies the following condition: $92.5<Tg/N<100$, proper materials can be selected so as to provide sufficient refractive power and increase the yield rate of manufacturing.

Figure 12:
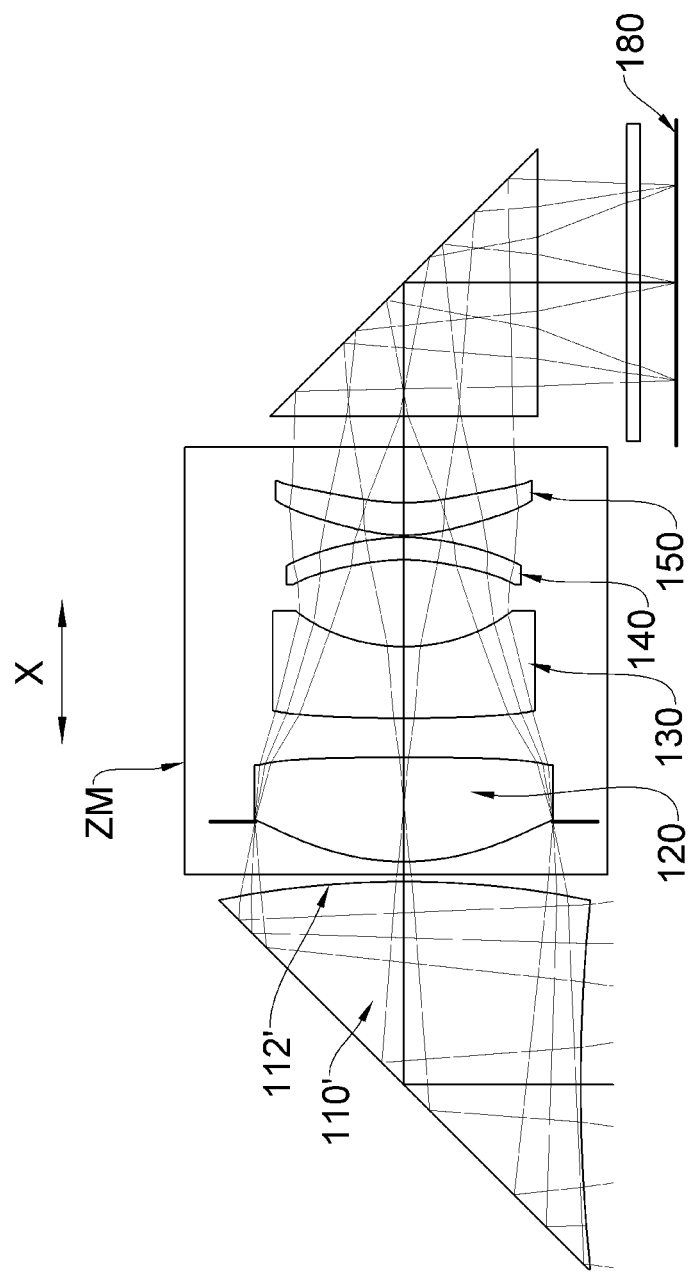
FIG. 12 is a schematic view of performing focusing according to the 1st embodiment of the present disclosure.

Please refer to FIG. 12, which is a schematic view of focusing according to the 1st embodiment of the present disclosure. The imaging optical lens assembly of the present disclosure may begin focusing by moving the imaging optical lens assembly ZM, which includes the aperture 100, the second optical element 120, the third optical element 130, the fourth optical element 140 and the fifth optical element 150, along the optical axis by a distance X while changing the distance between the first optical element 110' and the second optical element 120. As such, an axial distance between the image-side surface 112' of the first optical element 110' and the image surface 180 along the optical path remains the same while focusing.

The present disclosure further provides an imaging apparatus, including the aforementioned imaging optical lens assembly and an image sensor.

The present disclosure further provides an electronic device, including at least three imaging apparatuses. The three imaging apparatuses include the aforementioned imaging apparatus. The three imaging apparatuses face the same direction. A maximum angle of view among the three imaging apparatuses is FOVmax, and a minimum angle of view among the three imaging apparatuses is FOVmin. When the electronic device satisfies the following condition: $40<FOVmax-FOVmin$, it can meet the requirements for providing a combined telephoto and wide view angle configuration for imaging. Moreover, the following condition can be satisfied: $60<FOVmax-FOVmin$.

At least one of the three imaging apparatuses may include two reflective surfaces. Each of at least two of the three imaging apparatuses may include at least one reflective surface, respectively, such that the optical path can be folded which allows more flexible configurations of the imaging apparatus.

Figure 13A:
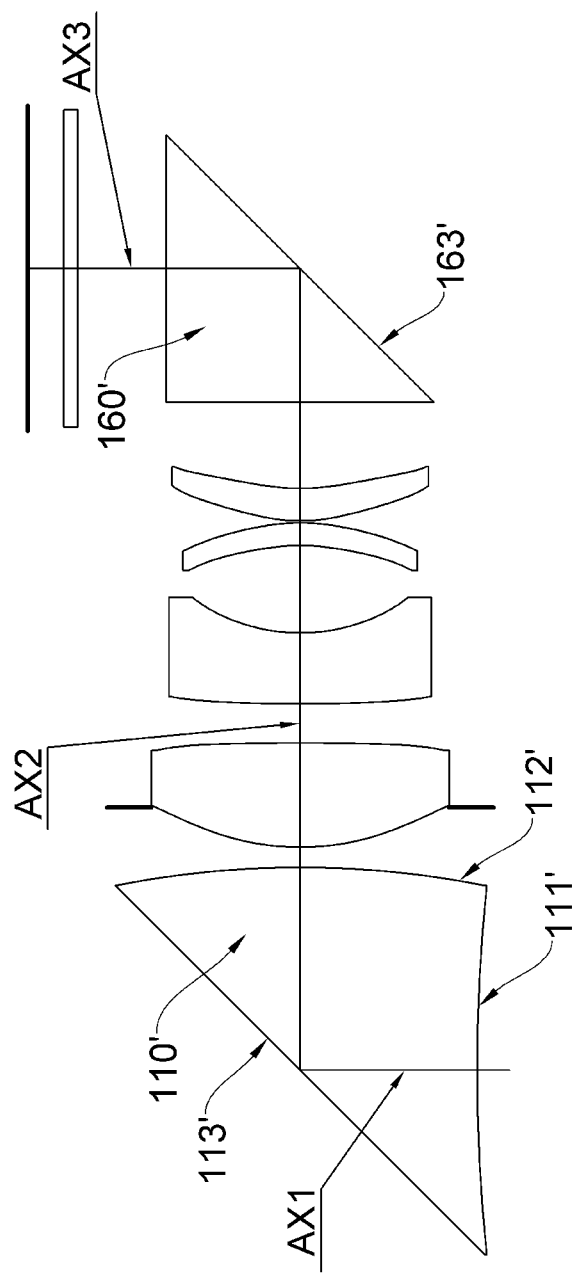
FIG. 13A is a schematic view of an imaging apparatus including two reflective surfaces according to the 1st embodiment of the present disclosure as an example.

Please refer to FIG. 13A, which is a schematic view of an imaging apparatus including two reflective surfaces according to the 1st embodiment of the present disclosure as an example. As shown, the first optical element 110' is a prism including a reflective surface 113' such that an optical axis AX1 and an optical axis AX2 will form an angle of 90 degrees. The prism 160' includes a reflective surface 163' such that the optical axis AX2 and an optical axis AX3 will form an angle of 90 degrees. The reflective surface 113' of the first optical element 110' in the imaging apparatus is disposed to be in parallel with the reflective surface 163' of the prism 160' such that the optical axis AX1 is in parallel with the optical axis AX3 and light will travel in the same direction along the optical axis AX1 and AX3.

Figure 13B:
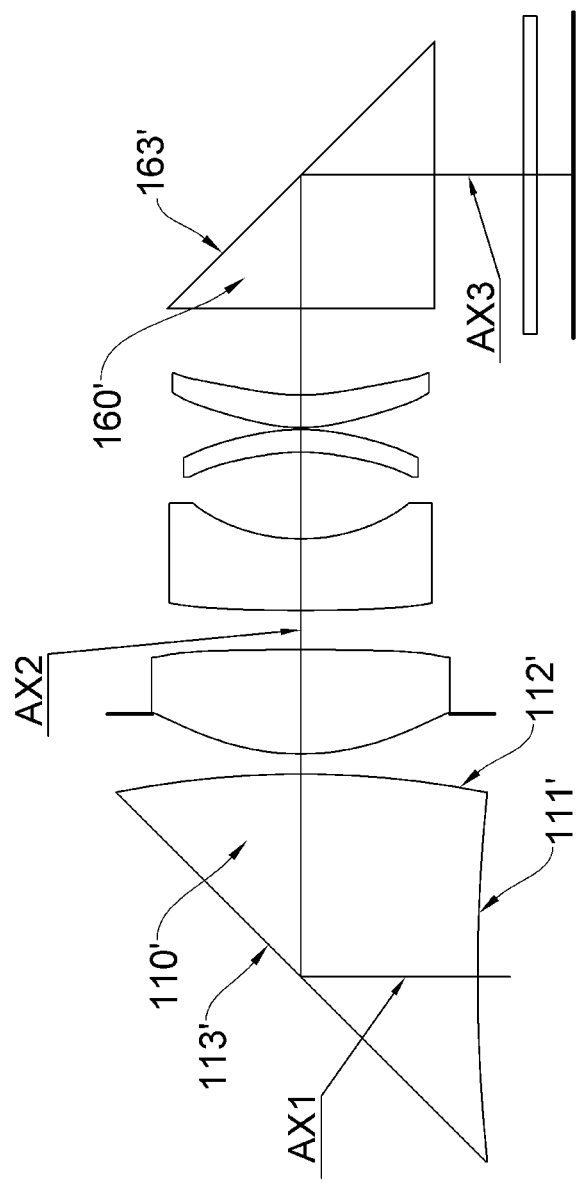
FIG. 13B is a schematic view of an imaging apparatus including two reflective surfaces according to the 1st embodiment of the present disclosure as an example.

Please refer to FIG. 13B, which is a schematic view of an imaging apparatus including two reflective surfaces according to the 1st embodiment of the present disclosure as an example. As shown, the first optical element 110' is a prism including a reflective surface 113' such that an optical axis AX1 and an optical axis AX2 will form an angle of 90 degrees. The prism 160' includes a reflective surface 163' such that the optical axis AX2 and an optical axis AX3 will form an angle of 90 degrees. The reflective surface 113' of the first optical element 110' in the imaging apparatus is disposed to be perpendicular with the reflective surface 163' of the prism 160' such that the optical axis AX1 is in parallel with the optical axis AX3 and light will travel in an opposite direction along the optical axis AX1 and AX3.

Figure 14:
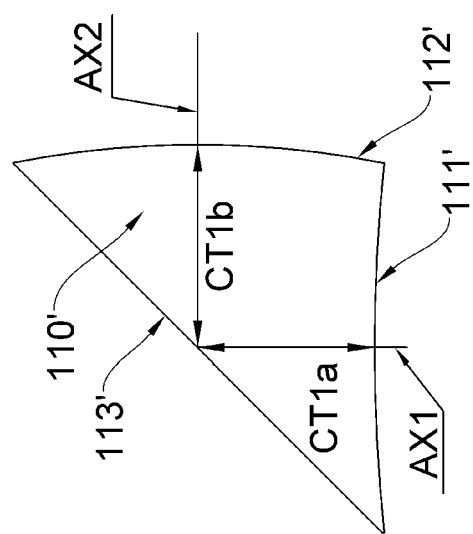
FIG. 14 is a schematic view showing the parameter CT1 of a first optical element with a reflective surface according to the 1st embodiment of the present disclosure as an example.

Please refer to FIG. 14, which is a schematic view showing the parameter CTT of a first optical element with a reflective surface according to the 1st embodiment of the present disclosure as an example. As shown, the length between the object side surface 111' of the first optical element 110' and the reflective surface 113' of the first optical element 110' along the optical axis AX1 is CT1a, the length between the reflective surface 113' of the first optical element 110' and the image side surface 112' of the first optical element 110' is along the optical axis AX2 is CT1b, the axial thickness of the first optical element 110' along the optical path is CT1, and the following condition is satisfied: $CT1=CT1a+CT1b$.

Each of the aforementioned features of the imaging optical lens assembly can be utilized in numerous combinations, so as to achieve the corresponding effects.

According to the imaging optical lens assembly of the present disclosure, the object side and the image side is defined along the optical path. The parameters such as ΣCT, which is a sum of axial thicknesses of the first optical element, the second optical element, the third optical element, the fourth optical element, and the fifth optical element along the optical path, and CT1, which is the axial thickness of the first optical element along the optical path, are calculated along the optical path when the optical axis is folded. In the imaging optical lens assembly of the present disclosure, parameters such as f, Fno, BL, and Y2R1 are calculated in a configuration with an object distance at infinity.

According to the imaging optical lens assembly of the present disclosure, the optical elements thereof can be made of glass or plastic material. When the optical elements are made of glass material, the distribution of the refractive power of the lens system may be more flexible to design and reduce the effect of external environmental temperature on imaging. Technologies such as grinding or molding can be used for producing glass optical elements. When the optical elements are made of plastic material, the manufacturing cost can be effectively reduced. Furthermore, surfaces of each optical element can be arranged to be spherical or aspheric (ASP). Arranging the spherical surfaces can reduce difficulties in manufacturing while arranging the aspheric surfaces can have more control variables for eliminating aberrations and to further decrease the required quantity of optical elements, the total track length of the imaging optical lens assembly can be effectively reduced. Process such as plastic injection molding or molded glass lens can be used for making the aspheric surfaces. The optical element in the present disclosure may be made of cyclo olefin polymer material and the cyclo olefin polymer may be a copolymer.

According to the imaging optical lens assembly of the present disclosure, if a surface of an optical element is aspheric, it means that the surface has an aspheric shape throughout its optical effective area, or a portion(s) thereof.

According to the imaging optical lens assembly of the present disclosure, additives may be selectively added to the material of any one (or more) optical element to change the transmittance of said optical element in a particular wavelength range of light, so as to further reduce stray light and chromatic aberrations. For example, an additive that can filter off light in the wavelength range of 600-800 nm may be added to reduce extra red or infrared light, or an additive that can filter off light in the wavelength range of 350-450 nm may be added to reduce blue or ultraviolet light in the optical elements. Thus, the additives can prevent unwanted disrupting light in particular wavelength ranges affecting the final image. In addition, additives may be evenly mixed in the plastic material for manufacturing optical elements with an injection molding process.

According to the imaging optical lens assembly of the present disclosure, the imaging optical lens assembly can include at least one stop, such as an aperture stop, a glare stop or a field stop, so as to favorably reduce the amount of stray light and thereby improving the image quality.

According to the imaging optical lens assembly of the present disclosure, an aperture stop can be configured as a front stop or a middle stop. The front stop disposed between an imaged object and the first optical element can provide a longer distance between an exit pupil of the imaging optical lens assembly and the image surface so that the generated telecentric effect can improve the image-sensing efficiency of an image sensor, such as a CCD or CMOS sensor. The middle stop disposed between the first optical element and the image surface is favorable for enlarging the field of view of the imaging optical lens assembly, thereby providing the imaging optical lens assembly with the advantage of a wide-angle lens.

Figure 15:
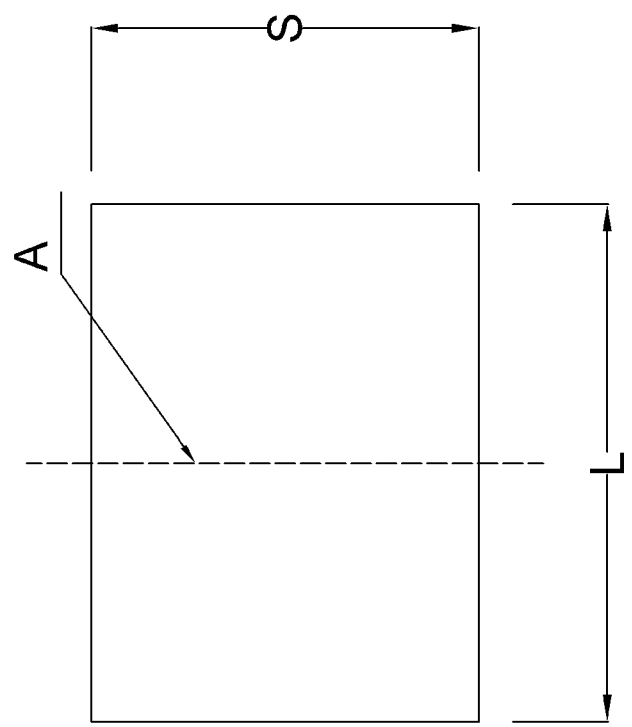
FIG. 15 is a schematic view showing a long side and a short side of an image sensor according to the imaging sensor of the present disclosure.

Please refer to FIG. 15, which is a schematic view showing a long side and a short side of an image sensor according to the imaging sensor of the present disclosure. As shown, the long side of the image sensor 185 is L and the short side of the image sensor 185 is S. The sectional view drawings of the image sensor illustrated in each embodiment of the present disclosure are drawn along the broken line A shown herewith.

An aperture control unit may be disposed in the imaging optical lens assembly of the present disclosure. The aperture control unit may be a mechanical part or optical moderation part, in which the size and shape of the aperture may be controlled by electricity or electronic signals. The mechanical part may include moving parts such as blades, shielding sheets, etc. The optical moderation part may include shielding materials such as filters, electrochromic materials, liquid crystal layers, etc. The aperture control unit can control the amount of incoming light and exposure time so as to further improve the image quality. Meanwhile, the aperture control unit may represent the aperture in the present disclosure that can adjust the image properties such as depth of field or exposure speed by changing the f-number of the imaging optical lens assembly.

According to the imaging optical lens assembly of the present disclosure, when the optical element has a convex surface and the region of convex shape is not specified, it indicates that the surface can be convex in the paraxial region thereof. When the optical element has a concave surface and the region of concave shape is not specified, it indicates that the surface can be concave in the paraxial region thereof. Likewise, when the region of refractive power or focal length of an optical element is not specified, it indicates that the region of refractive power or focal length of the optical element can be in the paraxial region thereof.

According to the imaging optical lens assembly of the present disclosure, the image surface of the imaging optical lens assembly, based on the corresponding image sensor, can be a plane or a curved surface with an arbitrary curvature, especially a curved surface being concave facing towards the object side. Meanwhile, the imaging optical lens assembly of the present disclosure may optionally include one or more image correction components (such as a field flattener) between the image surface and the optical element closest to the image surface for the purpose of image corrections (such as field curvature correction). The optical properties of the image correction components such as curvatures, thicknesses, indices, positions and shapes (convex or concave, spherical or aspheric, diffractive surface and Fresnel surface, etc.) can be adjusted according to the requirement of the imaging apparatus. Preferably, an image correction component may be a thin plano-concave component with a surface being concave toward the object side arranged near the image surface.

In the imaging optical lens assembly of the present disclosure, at least one reflective element capable of folding the optical path such as a prism or a reflective mirror can be alternatively disposed on the optical path between the object and the image surface so as to provide the imaging optical lens assembly with even more flexibilities in configurations such that the miniaturization of the electronic device will not be restricted by the total length of the imaging optical lens assembly.

According to the above description of the present disclosure, the following specific embodiments are provided for further explanation.

1st Embodiment

Figure 1B:
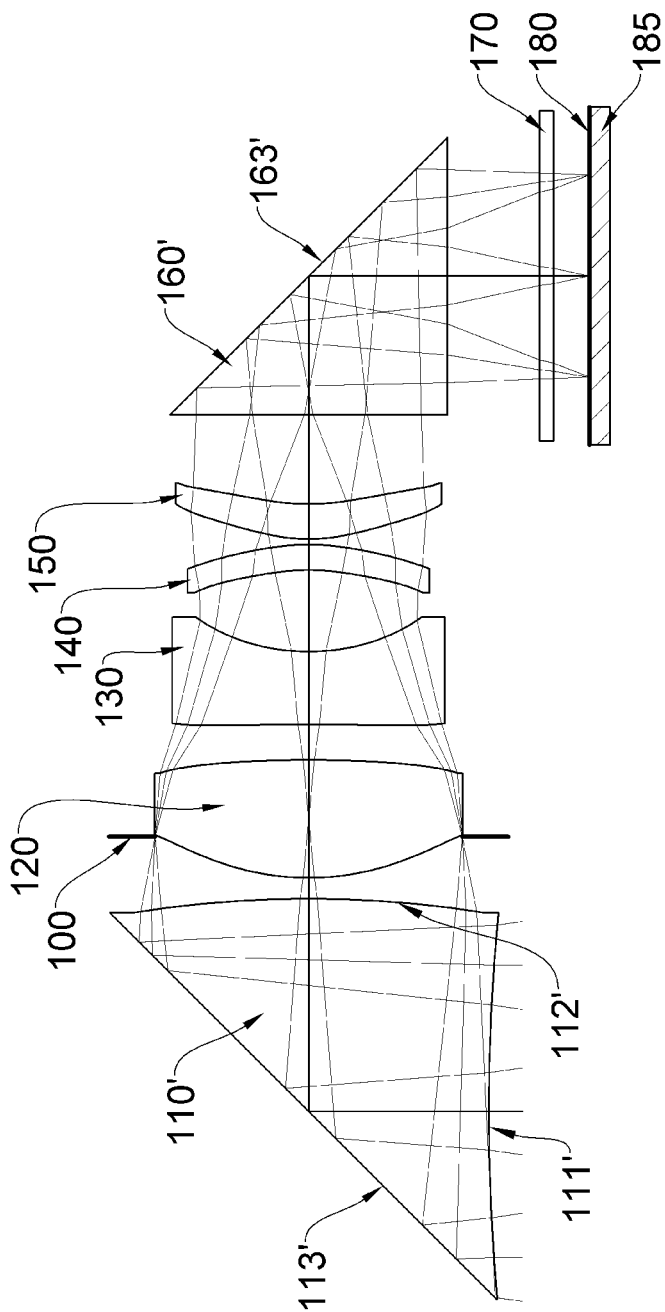
FIG. 1B is a schematic view of an imaging apparatus with reflective surfaces equivalent to the 1st embodiment of the present disclosure.
Figure 1C:
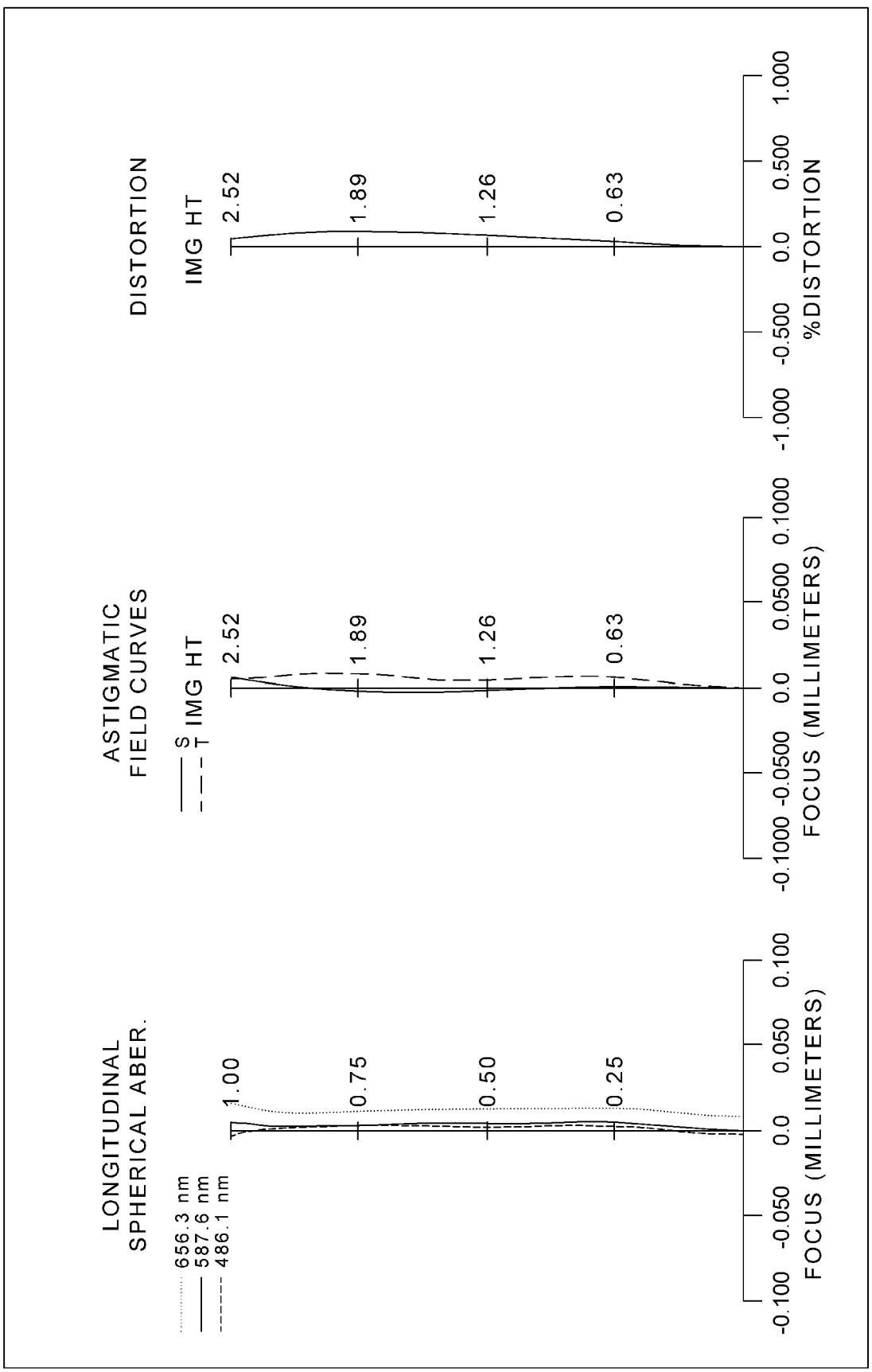
FIG. 1C shows longitudinal spherical aberration curves, astigmatic field curves and a distortion curve of the imaging apparatus according to the 1st embodiment.

FIG. 1A is a schematic view of an imaging apparatus according to the 1st embodiment of the present disclosure. FIG. 1B is a schematic view of an imaging apparatus with reflective surfaces equivalent to the 1st embodiment of the present disclosure. FIG. 1C shows, in order from left to right, longitudinal spherical aberration curves, astigmatic field curves and a distortion curve of the imaging apparatus according to the 1st embodiment.

In FIG. 1A, the imaging apparatus includes an imaging optical lens assembly (not otherwise herein labeled) of the present disclosure and an image sensor 185. The imaging optical lens assembly includes, in order from an object side to an image side along an optical path, a first optical element 110, an aperture stop 100, a second optical element 120, a third optical element 130, a fourth optical element 140, a fifth optical element 150, a prism 160, a filter 170, and an image surface 180. There is no additional optical element inserted between the first optical element 110 and the fifth optical element 150. There are air gaps between paraxial regions of the first optical element 110, the second optical element 120, the third optical element 130, the fourth optical element 140, and the fifth optical element 150.

The first optical element 110 with positive refractive power has an object-side surface 111 being concave in the paraxial region thereof, and an image-side surface 112 being convex in the paraxial region thereof. Both the object-side surface 111 and the image-side surface 112 are spherical. The first optical element 110 is made of plastic material.

The second optical element 120 with positive refractive power has an object-side surface 121 being convex in the paraxial region thereof, and an image-side surface 122 being convex in the paraxial region thereof. Both the object-side surface 121 and the image-side surface 122 are aspheric. The second optical element 120 is made of plastic material.

The third optical element 130 with negative refractive power has an object-side surface 131 being concave in the paraxial region thereof, and an image-side surface 132 being concave in the paraxial region thereof. Both the object-side surface 131 and the image-side surface 132 are aspheric. The third optical element 130 is made of plastic material.

The fourth optical element 140 with negative refractive power has an object-side surface 141 being concave in the paraxial region thereof, and an image-side surface 142 being convex in the paraxial region thereof. Both the object-side surface 141 and the image-side surface 142 are aspheric. The fourth optical element 140 is made of plastic material.

The fifth optical element 150 with positive refractive power has an object-side surface 151 being convex in the paraxial region thereof, and an image-side surface 152 being concave in the paraxial region thereof. Both the object-side surface 151 and the image-side surface 152 are aspheric. The fifth optical element 150 is made of plastic material.

The prism 160 is disposed between the fifth optical element 150 and the filter 170. The prism 160 is made of glass material. The filter 170 is disposed between the prism 160 and the image surface 180. The filter 170 is made of glass material and does not affect the focal length of the imaging optical lens assembly. The image sensor 185 is disposed on the image surface 180 of the imaging optical lens assembly.

FIG. 1B is a schematic view of an imaging apparatus with reflective surfaces equivalent to the 1st embodiment of the present disclosure. In FIG. 1B, a first optical element 110' is a prism including a reflective surface 113' so as to fold the optical path by 90 degrees. An object-side surface 111' of the first optical element 110' corresponds to the object-side surface 111 of the first optical element 110 and an image-side surface 112' of the first optical element 110' corresponds to the image-side surface 112 of the first optical element 110 such that the overall optical properties of the first optical element 110' are equivalent to those of the first optical element 110 shown in FIG. TA. A prism 160' includes a reflective surface 163' such that the overall optical properties of the prism 160' are equivalent to those of the prism 160 shown in FIG. TA. According to the aforementioned configuration, an imaging apparatus equivalent to the 1st embodiment with the optical path being folded can be obtained.

The detailed optical data of the 1st embodiment are shown in TABLE 1, wherein the units of the curvature radius, the thickness and the focal length are expressed in mm, f is a focal length of the imaging optical lens assembly, Fno is an f-number of the imaging optical lens assembly, HFOV is a half of the maximal field of view, and surfaces #0 to #16 refer to the surfaces in order from the object side to the image side. The aspheric surface data are shown in TABLE 2, wherein k is the conic coefficient in the equation of the aspheric surface profiles, and A4-A20 refer to the 4th to 20th order aspheric coefficients.

Further, it should be noted that the tables shown in each of the following embodiments are associated with the schematic view and diagrams of longitudinal spherical aberration curves, astigmatic field curves and a distortion curve for the respective embodiment. Also, the definitions of the parameters presented in later tables are the same as those of the parameters presented in TABLE 1 and TABLE 2 for the 1st embodiment. Explanations in this regard will not be provided again.

TABLE 1

(1st Embodiment)
f = 10.49 mm, Fno = 2.40, HFOV = 13.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Optical element 1* | −30.914 | SPH | 5.868 | Plastic | 1.686 | 18.4 | 42.90 |
| 2 | | −16.242 | SPH | 0.927 | | | | |
| 3 | Ape. Stop | Plano | | −0.617 | | | | |
| 4 | Optical element 2 | 3.842 | ASP | 1.759 | Plastic | 1.544 | 56.0 | 6.13 |
| 5 | | −21.252 | ASP | 0.530 | | | | |
| 6 | Optical element 3 | −59.946 | ASP | 1.082 | Plastic | 1.642 | 22.5 | −4.54 |
| 7 | | 3.086 | ASP | 1.218 | | | | |
| 8 | Optical element 4 | −3.053 | ASP | 0.381 | Plastic | 1.686 | 18.4 | −262.30 |
| 9 | | −3.264 | ASP | 0.082 | | | | |
| 10 | Optical element 5 | 2.379 | ASP | 0.524 | Plastic | 1.544 | 56.0 | 14.04 |
| 11 | | 3.186 | ASP | 1.338 | | | | |
| 12 | Prism | Plano | | 4.140 | Glass | 1.954 | 32.3 | — |
| 13 | | Plano | | 1.375 | | | | |
| 14 | Filter | Plano | | 0.210 | Glass | 1.563 | 51.3 | — |
| 15 | | Plano | | 0.534 | | | | |
| 16 | Image Surface | Plano | | — | | | | |

Remark: Reference wavelength is d-line 587.6 nm.
*The effective radius of Surface 10 is 1.985 mm.
*Optical element 1 is a prism with refractive power.

TABLE 2

| Aspheric Coefficient | | | | |
|---|---|---|---|---|
| Surface # | 4 | 5 | 6 | 7 |
| k= | 0.0000E+00 | 0.0000E+00 | 0.0000E+00 | 0.0000E+00 |
| A4= | −1.6139E−03 | −3.0101E−03 | −4.1234E−03 | −5.8851E−03 |
| A6= | −1.6334E−04 | 1.3228E−03 | 4.9644E−03 | 5.5604E−03 |
| A8= | −4.1899E−05 | −6.9909E−04 | −2.1329E−03 | −1.8184E−03 |
| A10= | −3.5063E−06 | 1.8677E−04 | 6.8168E−04 | 1.3269E−04 |
| A12= | 7.4190E−07 | −3.3845E−05 | −1.4285E−04 | 2.3745E−04 |
| A14= | −2.4116E−07 | 3.5826E−06 | 1.7964E−05 | −1.0708E−04 |
| A16= | 1.4625E−08 | −1.6481E−07 | −9.8643E−07 | 1.5230E−05 |

| Surface # | 8 | 9 | 10 | 11 |
|---|---|---|---|---|
| k= | 0.0000E+00 | 0.0000E+00 | 0.0000E+00 | 0.0000E+00 |
| A4= | 7.8194E−02 | 4.4869E−02 | −7.2100E−02 | −5.5604E−02 |
| A6= | −5.6127E−02 | −2.1430E−02 | 2.9415E−02 | 2.0032E−02 |
| A8= | 3.8309E−02 | 1.1308E−02 | −1.4423E−02 | −7.4416E−03 |
| A10= | −2.1108E−02 | −5.7119E−03 | 5.0439E−03 | 1.1612E−03 |
| A12= | 7.6860E−03 | 2.0261E−03 | −1.1096E−03 | 5.8174E−04 |
| A14= | −1.6247E−03 | −4.1972E−04 | 1.4058E−04 | −4.1237E−04 |
| A16= | 1.4891E−04 | 3.7972E−05 | −8.4341E−06 | 1.1732E−04 |
| A18= | | | 1.4536E−07 | −1.7064E−05 |
| A20= | | | | 1.0595E−06 |

The equation of the aspheric surface profiles is expressed as follows:

$$X(Y) = (Y^2/R)/(1 + sqrt(1 - (1+k)*(Y/R)^2)) + \sum_i (Ai)*(Y^i)$$

where:

X is the relative distance between a point on the aspheric surface spaced at a distance Y from the optical axis and the tangential plane at the aspheric surface vertex on the optical axis;

Y is the vertical distance from the point on the aspheric surface profile to the optical axis;

R is the curvature radius;

k is the conic coefficient; and

Ai is the i-th aspheric coefficient.

In the 1st embodiment, the focal length of the imaging optical lens assembly is f, the f-number of the imaging optical lens assembly is Fno, and the half of the maximal field of view of the imaging optical lens assembly is HFOV. These parameters have the following values: f=10.49 mm; Fno=2.40; and HFOV=13.5 degrees.

In the 1st embodiment, a maximum vertical distance between a point on an effective optical region of the object-side surface 121 of the second optical element 120 and an optical axis is Y2R1, and it satisfies the condition: Y2R1=2.30.

In the 1st embodiment, a maximum vertical distance between a point on an effective optical region of the image-side surface 152 of the fifth optical element 150 and the optical axis is Y5R2, and it satisfies the condition: Y5R2=1.96.

In the 1st embodiment, an Abbe number of the first optical element 110 is V1, a refractive index of the first optical element 110 is N1, and they satisfy the condition: V1/N1=10.90.

In the 1st embodiment, an Abbe number of the second optical element 120 is V2, a refractive index of the second optical element 120 is N2, and they satisfy the condition: V2/N2=36.26.

In the 1st embodiment, an Abbe number of the third optical element 130 is V3, a refractive index of the third optical element 130 is N3, and they satisfy the condition: V3/N3=13.70.

In the 1st embodiment, an Abbe number of the fourth optical element 140 is V4, a refractive index of the fourth optical element 140 is N4, and they satisfy the condition: V4/N4=10.90.

In the 1st embodiment, an Abbe number of the fifth optical element 150 is V5, a refractive index of the fifth optical element 150 is N5, and they satisfy the condition: V5/N5=36.26.

In the 1st embodiment, the glass transition temperature of the material of the first optical element 110 is Tg1, and it satisfies the condition: Tg1=153 (° C.).

In the 1st embodiment, the glass transition temperature of the material of the first optical element 110 is Tg1, the refractive index of the first optical element 110 is N1, and they satisfy the condition: Tg1/N1=90.74.

In the 1st embodiment, the maximum vertical distance between a point on the effective optical region of the object-side surface 121 of the second optical element 120 and the optical axis is Y2R1, the maximum vertical distance between a point on the effective optical region of the image-side surface 152 of the fifth optical element 150 and the optical axis is Y5R2, and they satisfy the condition: Y2R1/Y5R2=1.17.

In the 1st embodiment, an axial thickness of the second optical element 120 along the optical path is CT2, an axial thickness of the third optical element 130 along the optical path is CT3, and they satisfy the condition: CT2/CT3=1.63.

In the 1st embodiment, the axial thickness of the second optical element 120 along the optical path is CT2, the axial thickness of the third optical element 130 along the optical path is CT3, an axial thickness of the fourth optical element 140 along the optical path is CT4, an axial thickness of the fifth optical element 150 along the optical path is CT5, and they satisfy the condition: (CT2+CT3)/(CT4+CT5)=3.14.

In the 1st embodiment, a sum of axial thicknesses of the first optical element 110, the second optical element 120, the third optical element 130, the fourth optical element 140, and the fifth optical element 150 along the optical path is ΣCT, an axial thickness of the first optical element 110 along the optical path is CT1, and they satisfy the condition: ΣCT/CT1=1.64.

In the 1st embodiment, an axial distance between the object-side surface 121 of the second optical element 120 and the image-side surface 152 of the fifth optical element 150 along the optical path is Dr3r10, an axial distance between the image-side surface 152 of the fifth optical element 150 and the image surface 180 along the optical path is BL, and they satisfy the condition: Dr3r10/BL=0.73.

In the 1st embodiment, the focal length of the imaging optical lens assembly is f, a curvature radius of the object-side surface 111 of the first optical element 110 is R1, a curvature radius of the image-side surface 112 of the first optical element 110 is R2, and they satisfy the condition: |f/R1|+|f/R2|=0.98.

In the 1st embodiment, the focal length of the imaging optical lens assembly is f, a curvature radius of the object-side surface 121 of the second optical element 120 is R3, a curvature radius of the image-side surface 122 of the third optical element 130 is R6, and they satisfy the condition: (f/R3)+(f/R6)=6.13.

In the 1st embodiment, the focal length of the imaging optical lens assembly is f, a curvature radius of the object-side surface 151 of the fifth optical element 150 is R9, a curvature radius of the image-side surface 152 of the fifth optical element 150 is R10, and they satisfy the condition: (f/R9)+(f/R10)=7.70.

In the 1st embodiment, a focal length of the first optical element 110 is f1, a focal length of the second optical element 120 is f2, and they satisfy the condition: |f2/f1|=0.14.

In the 1st embodiment, the focal length of the second optical element 120 is f2, a focal length of the fourth optical element 140 is f4, and they satisfy the condition: |f2/f4|=0.02.

In the 1st embodiment, the focal length of the second optical element 120 is f2, a focal length of the fifth optical element 150 is f5, and they satisfy the condition: |f2/f5|=0.44.

In the 1st embodiment, the focal length of the first optical element 110 is f1, a focal length of the third optical element 130 is f3, and they satisfy the condition: |f3/f1|=0.11.

In the 1st embodiment, the focal length of the second optical element 120 is f2, a focal length of the third optical element 130 is f3, and they satisfy the condition: |f3/f2|=0.74.

In the 1st embodiment, the focal length of the third optical element 130 is f3, the focal length of the fourth optical element 140 is f4, and they satisfy the condition: |f3/f4|=0.02.

In the 1st embodiment, the focal length of the third optical element 130 is f3, the focal length of the fifth optical element 150 is f5, and they satisfy the condition: |f3/f5|=0.32.

In the 1st embodiment, the focal length of the imaging optical lens assembly is f, the focal length of the first optical element 110 is f1, and they satisfy the condition: f/f1=0.24.

In the 1st embodiment, the focal length of the imaging optical lens assembly is f, the focal length of the second optical element 120 is f2, the focal length of the third optical element 130 is f3, and they satisfy the condition: |f/f2|+|f/f3|=4.02.

2nd Embodiment

Figure 2A:
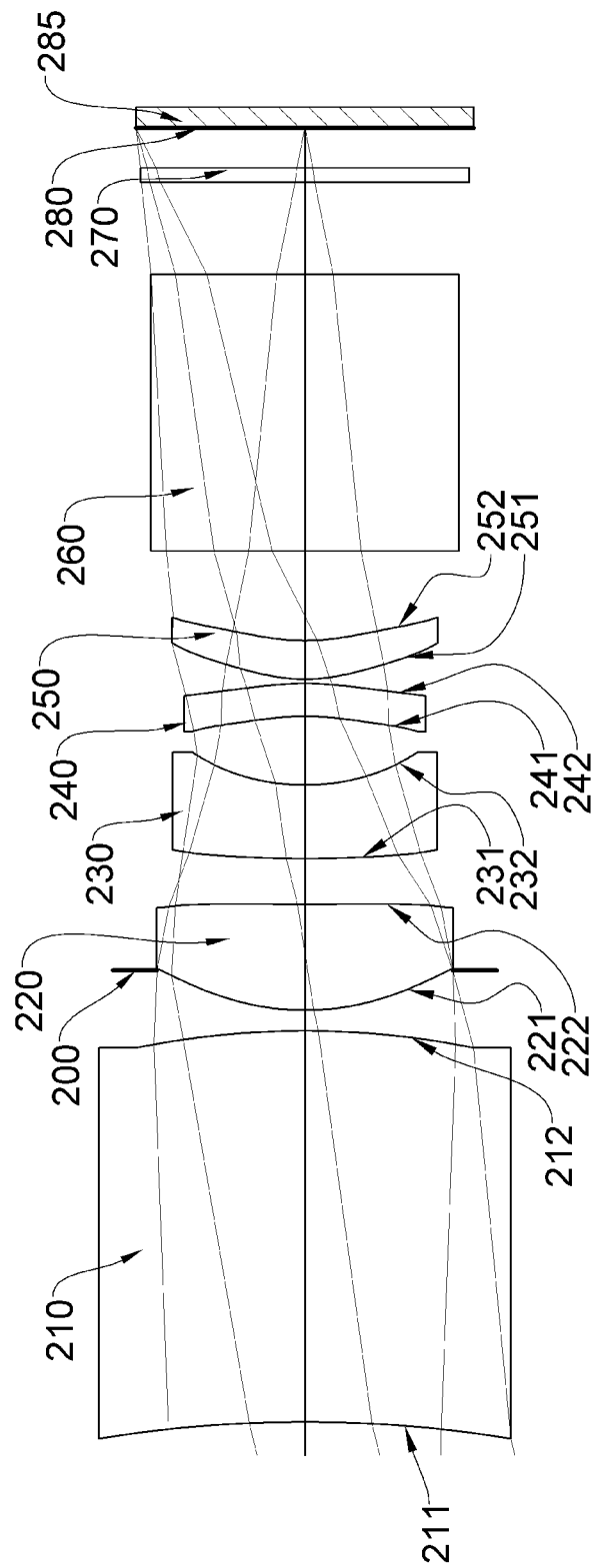
FIG. 2A is a schematic view of an imaging apparatus in a first zoom state according to the 2nd embodiment of the present disclosure.
Figure 2B:
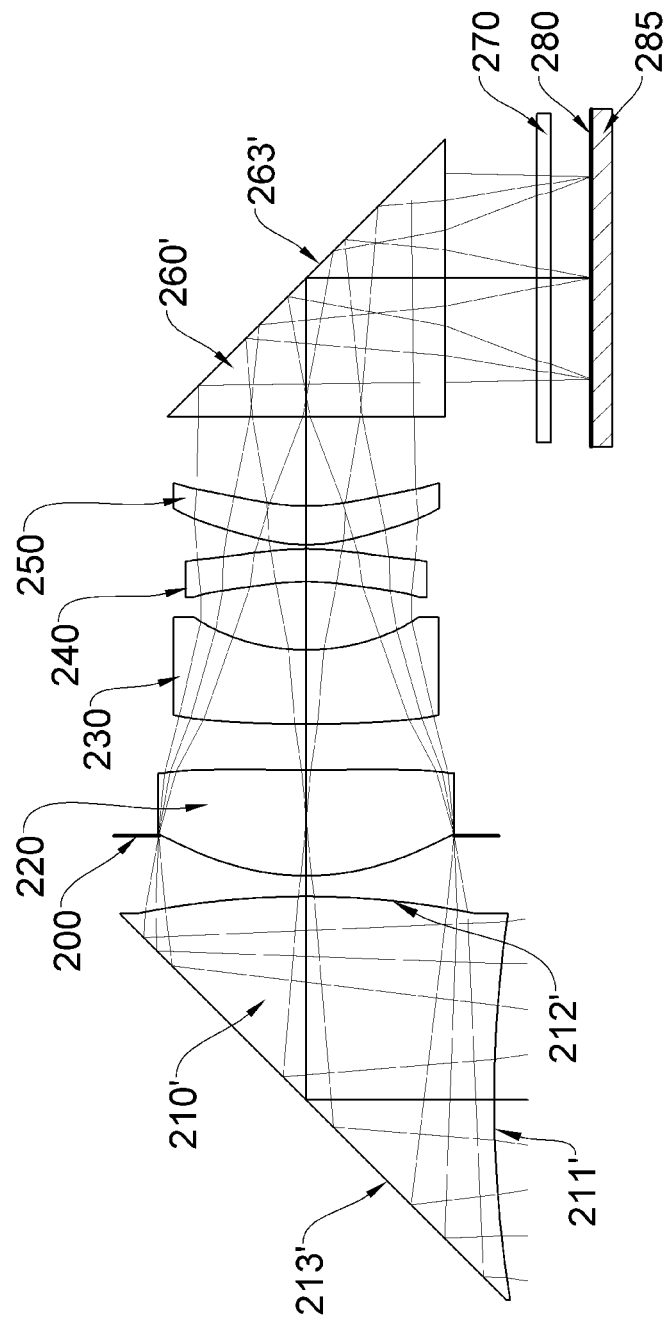
FIG. 2B is a schematic view of an imaging apparatus with reflective surfaces in a first zoom state equivalent to the 2nd embodiment of the present disclosure.
Figure 2C:
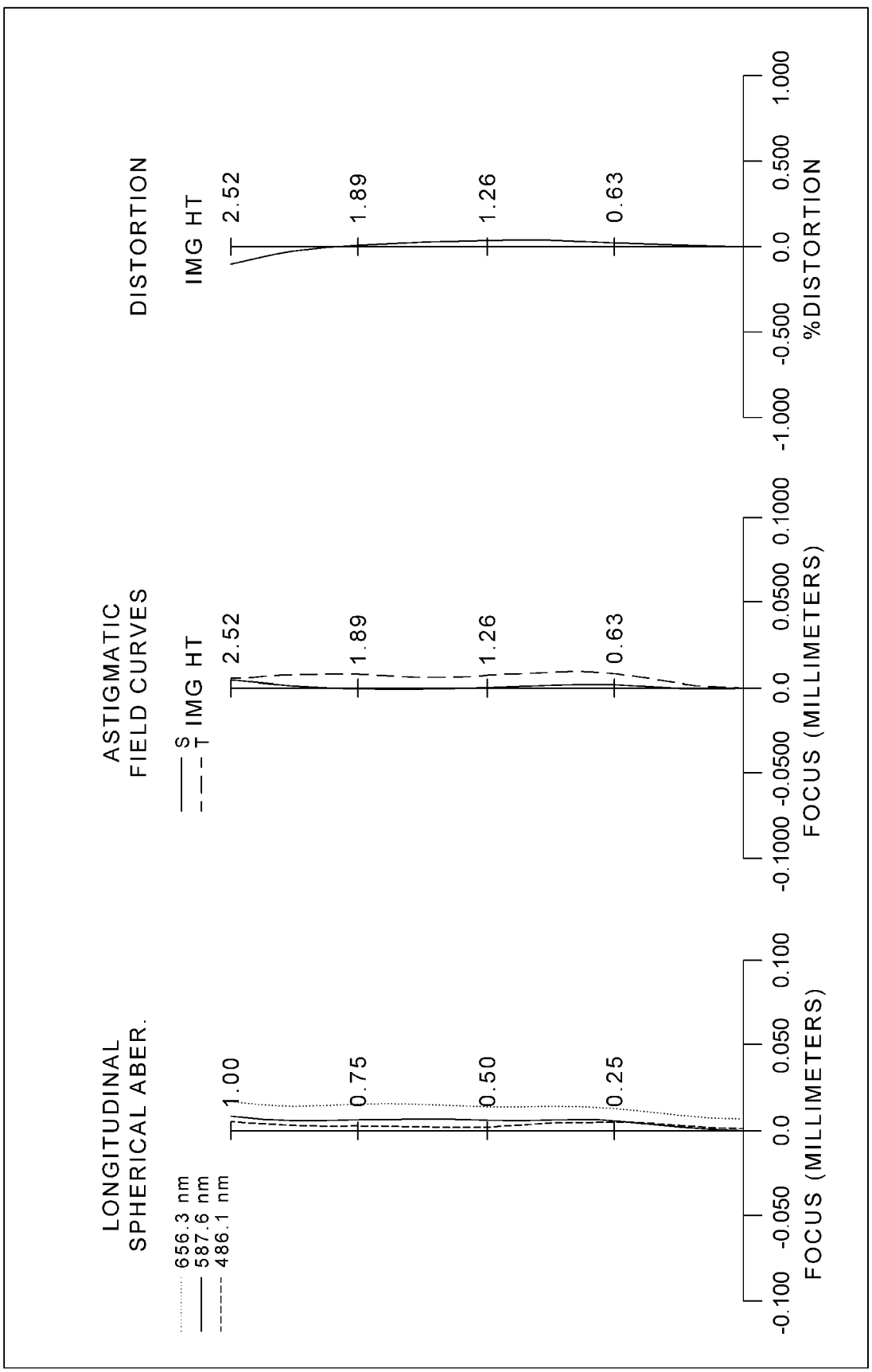
FIG. 2C shows longitudinal spherical aberration curves, astigmatic field curves and a distortion curve of the imaging apparatus in the first zoom state according to the 2nd embodiment.

FIG. 2A is a schematic view of an imaging apparatus in a first zoom state according to the 2nd embodiment of the present disclosure. FIG. 2B is a schematic view of an imaging apparatus with reflective surfaces in a first zoom state equivalent to the 2nd embodiment of the present disclosure. FIG. 2C shows, in order from left to right, longitudinal spherical aberration curves, astigmatic field curves and a distortion curve of the imaging apparatus in the first zoom state according to the 2nd embodiment.

In FIG. 2A, the imaging apparatus includes an imaging optical lens assembly (not otherwise herein labeled) of the present disclosure and an image sensor 285. The imaging optical lens assembly includes, in order from an object side to an image side along an optical path, a first optical element 210, an aperture stop 200, a second optical element 220, a third optical element 230, a fourth optical element 240, a fifth optical element 250, a prism 260, a filter 270, and an image surface 280. There is no additional optical element inserted between the first optical element 210 and the fifth optical element 250. There are air gaps between paraxial regions of the first optical element 210, the second optical element 220, the third optical element 230, the fourth optical element 240, and the fifth optical element 250.

The first optical element 210 with positive refractive power has an object-side surface 211 being concave in the paraxial region thereof, and an image-side surface 212 being convex in the paraxial region thereof. The object-side surface 211 is spherical and the image-side surface 212 is aspheric. The first optical element 210 is made of plastic material. In one embodiment of the present disclosure, the first optical element 210 is made of cyclo olefin polymer material and the cyclo olefin polymer may be a copolymer.

The second optical element 220 with positive refractive power has an object-side surface 221 being convex in the paraxial region thereof, and an image-side surface 222 being concave in the paraxial region thereof. Both the object-side surface 221 and the image-side surface 222 are aspheric. The second optical element 220 is made of plastic material.

The third optical element 230 with negative refractive power has an object-side surface 231 being convex in the paraxial region thereof, and an image-side surface 232 being concave in the paraxial region thereof. Both the object-side surface 231 and the image-side surface 232 are aspheric. The third optical element 230 is made of plastic material.

The fourth optical element 240 with negative refractive power has an object-side surface 241 being concave in the paraxial region thereof, and an image-side surface 242 being convex in the paraxial region thereof. Both the object-side surface 241 and the image-side surface 242 are aspheric. The fourth optical element 240 is made of plastic material.

The fifth optical element 250 with positive refractive power has an object-side surface 251 being convex in the paraxial region thereof, and an image-side surface 252 being concave in the paraxial region thereof. Both the object-side surface 251 and the image-side surface 252 are aspheric. The fifth optical element 250 is made of plastic material.

The prism 260 is disposed between the fifth optical element 250 and the filter 270. The prism 260 is made of glass material. The filter 270 is disposed between the prism 260 and the image surface 280. The filter 270 is made of glass material and will not affect the focal length of the imaging optical lens assembly. The image sensor 285 is disposed on the image surface 280 of the imaging optical lens assembly.

FIG. 2B is a schematic view of an imaging apparatus with reflective surfaces in a first zoom state equivalent to the 2nd embodiment of the present disclosure. In FIG. 2B, a first optical element 210' is a prism including a reflective surface 213' so as to fold the optical path by 90 degrees. An object-side surface 211' of the first optical element 210' corresponds to the object-side surface 211 of the first optical element 210 and an image-side surface 212' of the first optical element 210' corresponds to the image-side surface 212 of the first optical element 210 such that the overall optical properties of the first optical element 210' are equivalent to those of the first optical element 210 shown in FIG. 2A. A prism 260' includes a reflective surface 263' such that the overall optical properties of the prism 260' are equivalent to those of the prism 260 shown in FIG. 2A. According to the aforementioned configuration, an imaging apparatus equivalent to the 2nd embodiment with the optical path being folded can be obtained.

Figure 2D:
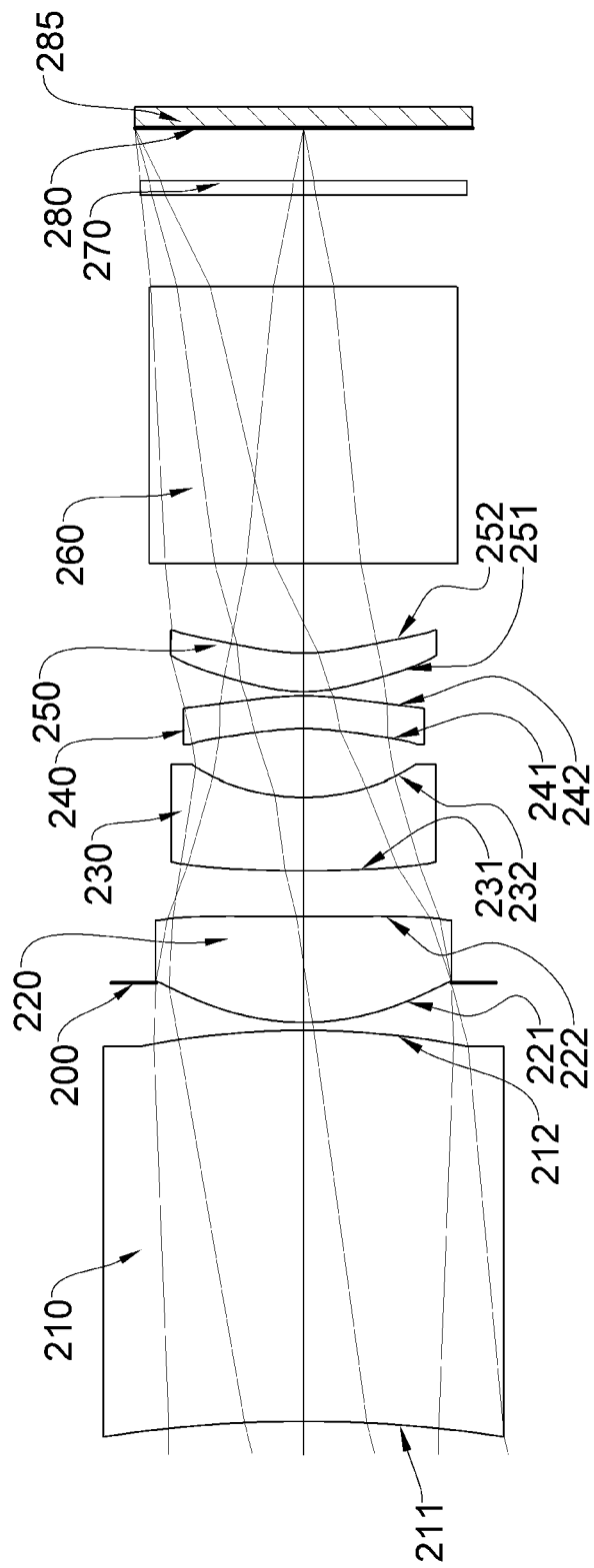
FIG. 2D is a schematic view of the imaging apparatus in a second zoom state according to the 2nd embodiment of the present disclosure.
Figure 2E:
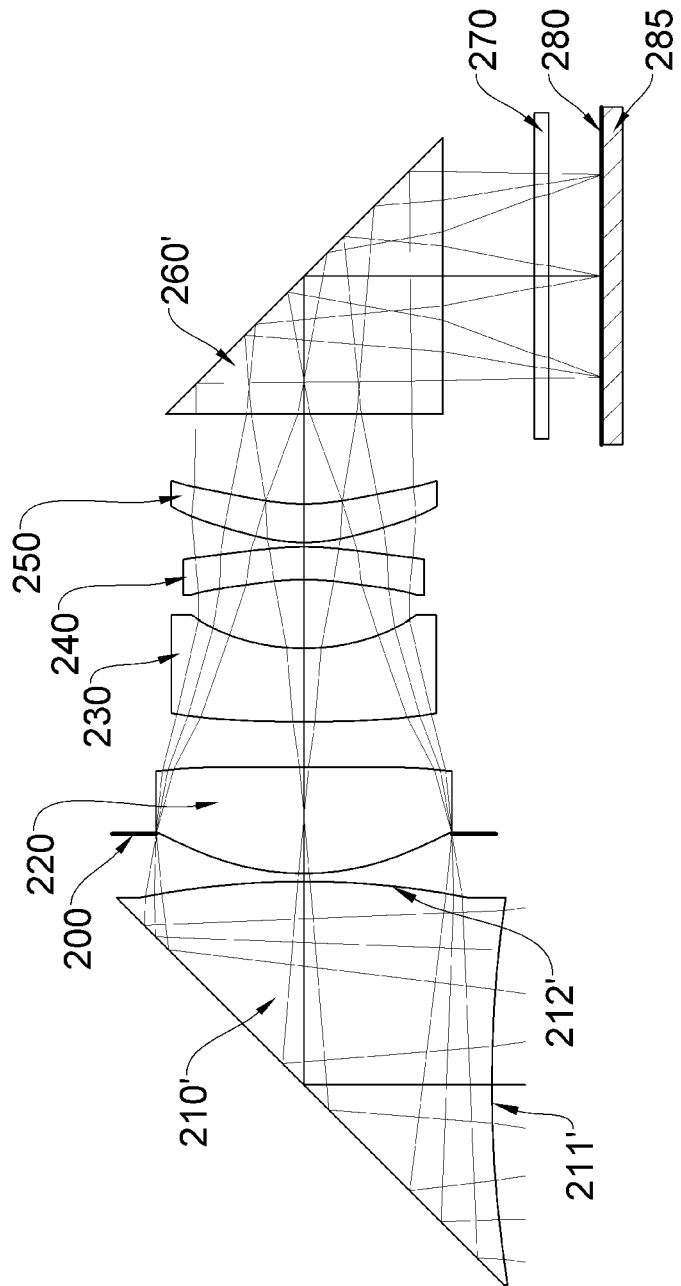
FIG. 2E is a schematic view of the imaging apparatus with reflective surfaces in a second zoom state equivalent to the 2nd embodiment of the present disclosure.
Figure 2F:
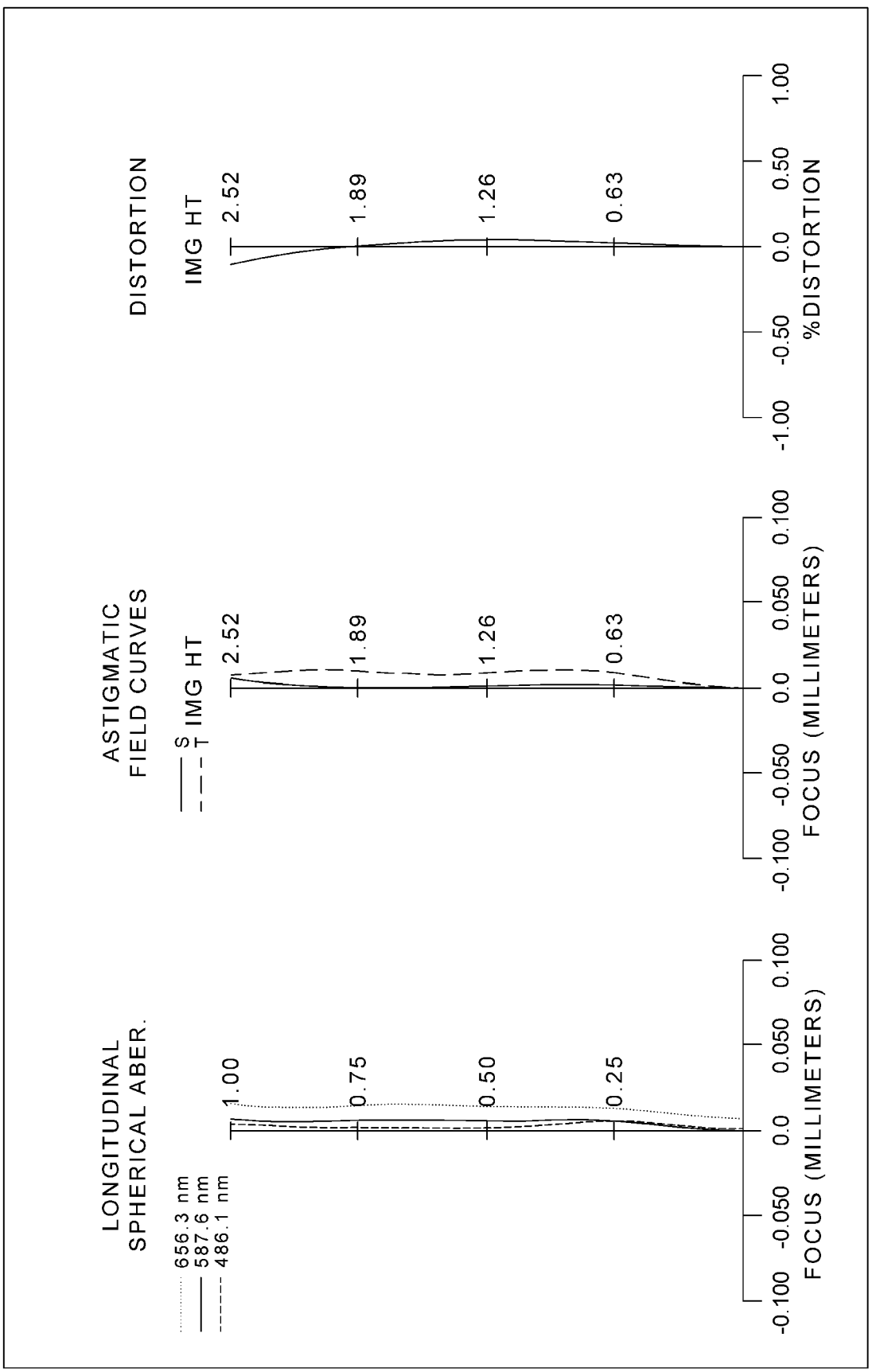
FIG. 2F shows longitudinal spherical aberration curves, astigmatic field curves and a distortion curve of the imaging apparatus in the second zoom state according to the 2nd embodiment.

FIG. 2D is a schematic view of an imaging apparatus in a second zoom state according to the 2nd embodiment of the present disclosure. FIG. 2E is a schematic view of an imaging apparatus with reflective surfaces in a second zoom state equivalent to the 2nd embodiment of the present disclosure. FIG. 2F shows, in order from left to right, longitudinal spherical aberration curves, astigmatic field curves and a distortion curve of the imaging apparatus in a second zoom state according to the 2nd embodiment. The imaging apparatus according to the 2nd embodiment changes from the first zoom state into the second zoom state by changing the distance between the image-side surface 212 of the first optical element 210 and the stop 200 from 0.904 mm to 0.714 mm, and changing the distance between the filter 270 and the image surface 280 from 0.598 mm to 0.788 mm. As such, an axial distance between the image-side surface 212 of the first optical element 210 and the image surface 280 along the optical path remains the same while focusing. The configuration of the rest optical elements of the 2nd embodiment in the second zoom state is the same as that in the first zoom state. FIG. 2E is a schematic view of an imaging apparatus with reflective surfaces in a second zoom state equivalent to the 2nd embodiment of the present disclosure. All the descriptions thereto are the same as the aforementioned zoom state and explanations in this regard will not be provided again.

The detailed optical data of the 2nd embodiment are shown in TABLE 3, and the aspheric surface data are shown in TABLE 4.

TABLE 3

(2nd Embodiment)
First zoom state: f = 10.38 mm, Fno = 2.55, HFOV = 13.7 deg.
Second zoom state: f = 10.35 mm, Fno = 2.60, HFOV = 13.4 deg.

| Surface # | | Curvature Radius | | Thickness (First zoom state) | Thickness (Second zoom state) | Material | Index | Abbe # | Focal Length |
|---|---|---|---|---|---|---|---|---|---|
| 0 | Object | Plano | | Infinity | 600.0 | | | | |
| 1 | Optical element 1* | −19.074 | SPH | 5.843 | | Plastic | 1.534 | 55.9 | 54.73 |
| 2 | | −12.771 | ASP | 0.904 | 0.714 | | | | |
| 3 | Ape. Stop | Plano | | −0.594 | | | | | |
| 4 | Optical element 2 | 3.794 | ASP | 1.582 | | Plastic | 1.544 | 55.9 | 7.21 |
| 5 | | 100.000 | ASP | 0.684 | | | | | |
| 6 | Optical element 3 | 18.803 | ASP | 1.099 | | Plastic | 1.614 | 26.0 | −6.50 |
| 7 | | 3.219 | ASP | 1.018 | | | | | |
| 8 | Optical element 4 | −3.642 | ASP | 0.490 | | Plastic | 1.686 | 18.4 | −40.80 |
| 9 | | −4.415 | ASP | 0.064 | | | | | |
| 10 | Optical element 5 | 2.351 | ASP | 0.577 | | Plastic | 1.544 | 55.9 | 14.81 |
| 11 | | 3.033 | ASP | 1.338 | | | | | |
| 12 | Prism | Plano | | 4.140 | | Glass | 1.954 | 32.3 | — |
| 13 | | Plano | | 1.375 | | | | | |
| 14 | Filter | Plano | | 0.210 | | Glass | 1.563 | 51.3 | — |
| 15 | | Plano | | 0.598 | 0.788 | | | | |
| 16 | Image Surface | Plano | | — | — | | | | |

Remark: Reference wavelength is d-line 587.6 nm.
*The effective radius of Surface 10 is 1.985 mm.
*Optical element 1 is a prism with refractive power.

TABLE 4

Aspheric Coefficient

| Surface # | 2 | 4 | 5 | 6 | 7 |
|---|---|---|---|---|---|
| k= | 0.0000E+00 | 0.0000E+00 | 0.0000E+00 | 0.0000E+00 | 0.0000E+00 |
| A4= | −5.0167E−05 | −1.3739E−03 | −1.7721E−03 | −1.6829E−03 | −1.6715E−03 |
| A6= | −3.5273E−06 | −1.3570E−04 | 1.8560E−04 | 1.6036E−03 | 1.3321E−03 |
| A8= | −1.3777E−07 | −6.4731E−05 | −2.8763E−04 | −4.5085E−04 | 6.3870E−04 |
| A10= | 5.3086E−08 | 7.5881E−06 | 9.1091E−05 | 1.5540E−04 | −6.1978E−04 |
| A12= | | −1.8108E−06 | −2.2286E−05 | −4.3274E−05 | 2.9519E−04 |
| A14= | | 4.1514E−08 | 3.0150E−06 | 7.6155E−06 | −8.0019E−05 |
| A16= | | 1.2734E−09 | −1.6488E−07 | −5.1565E−07 | 9.5880E−06 |

| Surface # | 8 | 9 | 10 | 11 |
|---|---|---|---|---|
| k= | 0.0000E+00 | 0.0000E+00 | 0.0000E+00 | 0.0000E+00 |
| A4= | 7.4592E−02 | 4.2680E−02 | −6.8981E−02 | −5.5188E−02 |
| A6= | −5.2622E−02 | −2.4390E−02 | 1.9708E−02 | 1.7917E−02 |
| A8= | 3.5656E−02 | 1.8643E−02 | −2.7607E−03 | −7.3365E−03 |
| A10= | −1.8202E−02 | −1.0354E−02 | −2.0918E−03 | 3.2472E−03 |

TABLE 4-continued

| Aspheric Coefficient | | | | |
|---|---|---|---|---|
| A12= | 5.8590E−03 | 3.4443E−03 | 1.4220E−03 | −1.4208E−03 |
| A14= | −1.0612E−03 | −6.1799E−04 | −3.8141E−04 | 5.0089E−04 |
| A16= | 7.9763E−05 | 4.5452E−05 | 4.9320E−05 | −1.1300E−04 |
| A18= | | | −2.5847E−06 | 1.4027E−05 |
| A20= | | | | −7.2918E−07 |

In the 2nd embodiment, the equation of the aspheric surface profiles of the aforementioned optical elements is the same as the equation of the 1st embodiment. Also, the definitions of these parameters shown in table below are the same as those stated in the 1st embodiment with corresponding values for the 2nd embodiment, so an explanation in this regard will not be provided again.

Moreover, these parameters can be calculated from TABLE 3 and TABLE 4 and satisfy the conditions stated in table below.

| 2nd Embodiment | | | |
|---|---|---|---|
| f [mm] | 10.38 | ΣCT/CT1 | 1.64 |
| Fno | 2.55 | Dr3r10/BL | 0.72 |
| HFOV [deg.] | 13.7 | \|f/R1\| + \|f/R2\| | 1.36 |
| Y2R1 | 2.21 | (f/R3) + (f/R6) | 5.96 |
| Y5R2 | 1.96 | (f/R9) + (f/R10) | 7.84 |
| V1/N1 | 36.46 | \|f2/f1\| | 0.13 |
| V2/N2 | 36.23 | \|f2/f4\| | 0.18 |
| V3/N3 | 16.09 | \|f2/f5\| | 0.49 |
| V4/N4 | 10.90 | \|f3/f1\| | 0.12 |
| V5/N5 | 36.23 | \|f3/f2\| | 0.90 |
| Tg1 (° C.) | 143.00 | \|f3/f4\| | 0.16 |
| Tg1/N1 | 93.23 | \|f3/f5\| | 0.44 |
| Y2R1/Y5R2 | 1.13 | f/f1 | 0.19 |
| CT2/CT3 | 1.44 | \|f/f2\| + \|f/f3\| | 3.03 |
| (CT2 + CT3)/(CT4 + CT5) | 2.51 | | |

3rd Embodiment

Figure 3A:
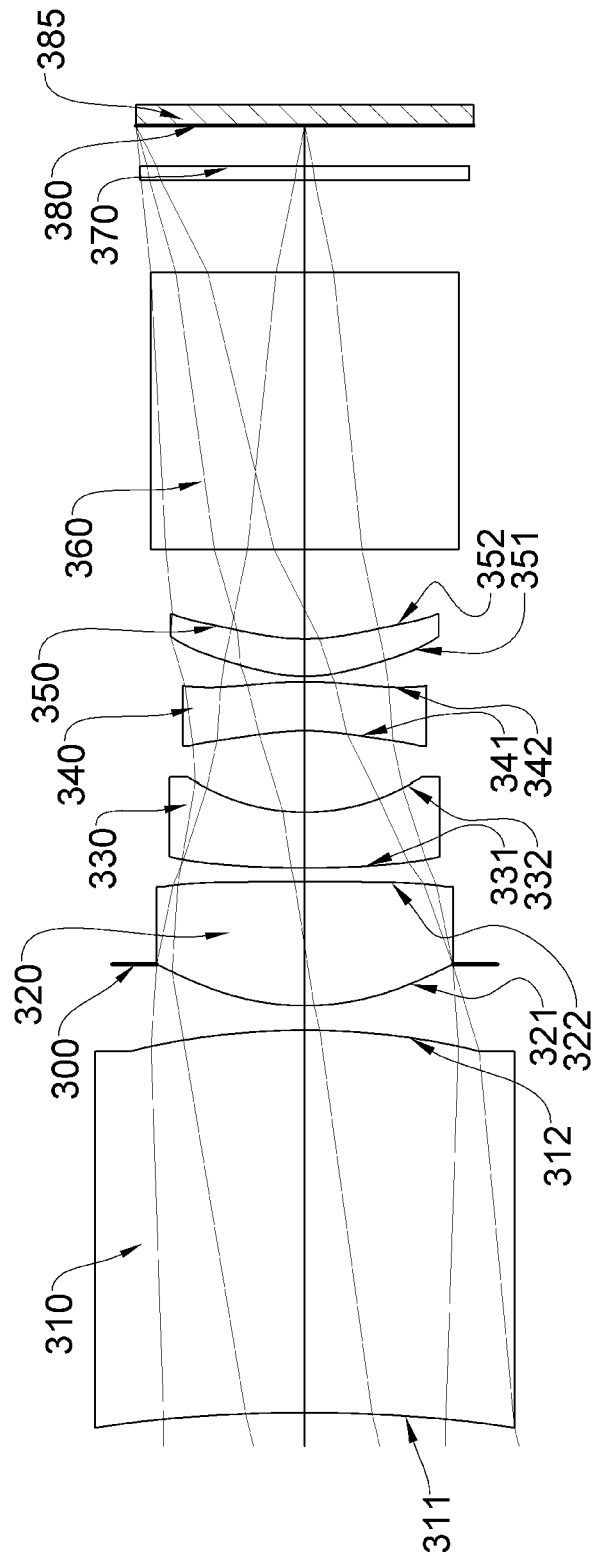
FIG. 3A is a schematic view of an imaging apparatus in a first zoom state according to the 3rd embodiment of the present disclosure.
Figure 3B:
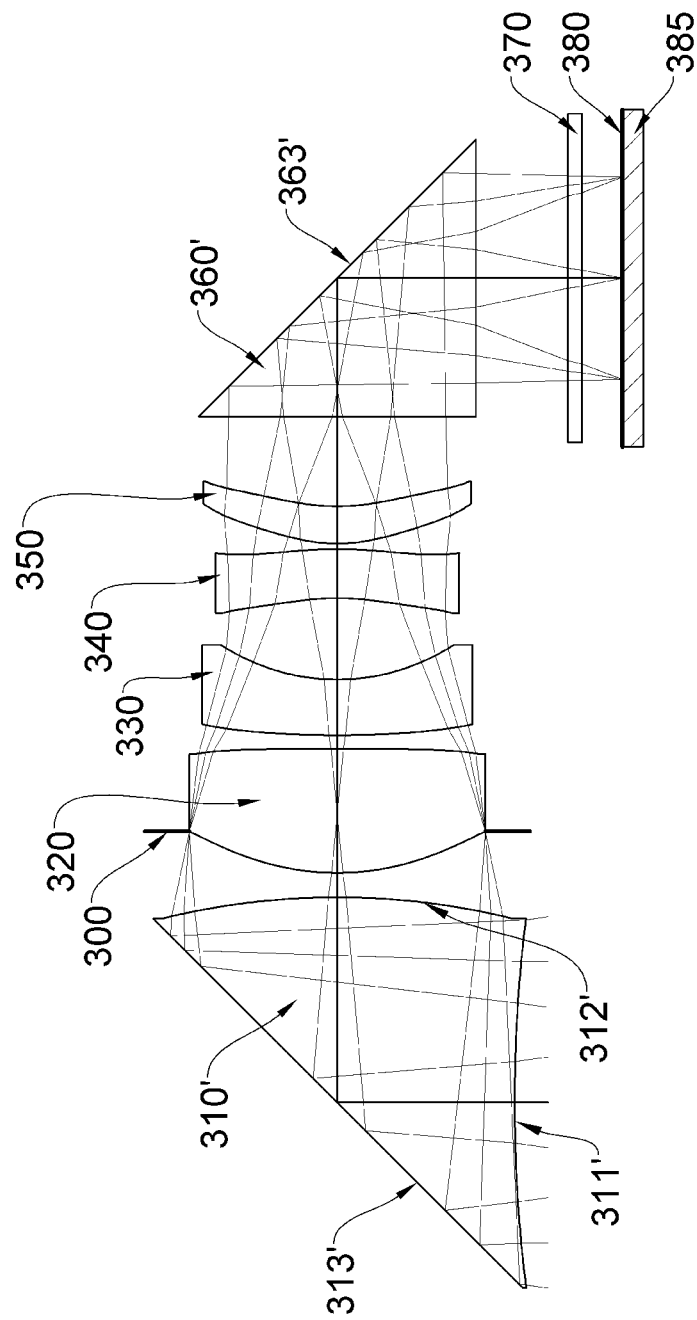
FIG. 3B is a schematic view of an imaging apparatus with reflective surfaces in a first zoom state equivalent to the 3rd embodiment of the present disclosure.
Figure 3C:
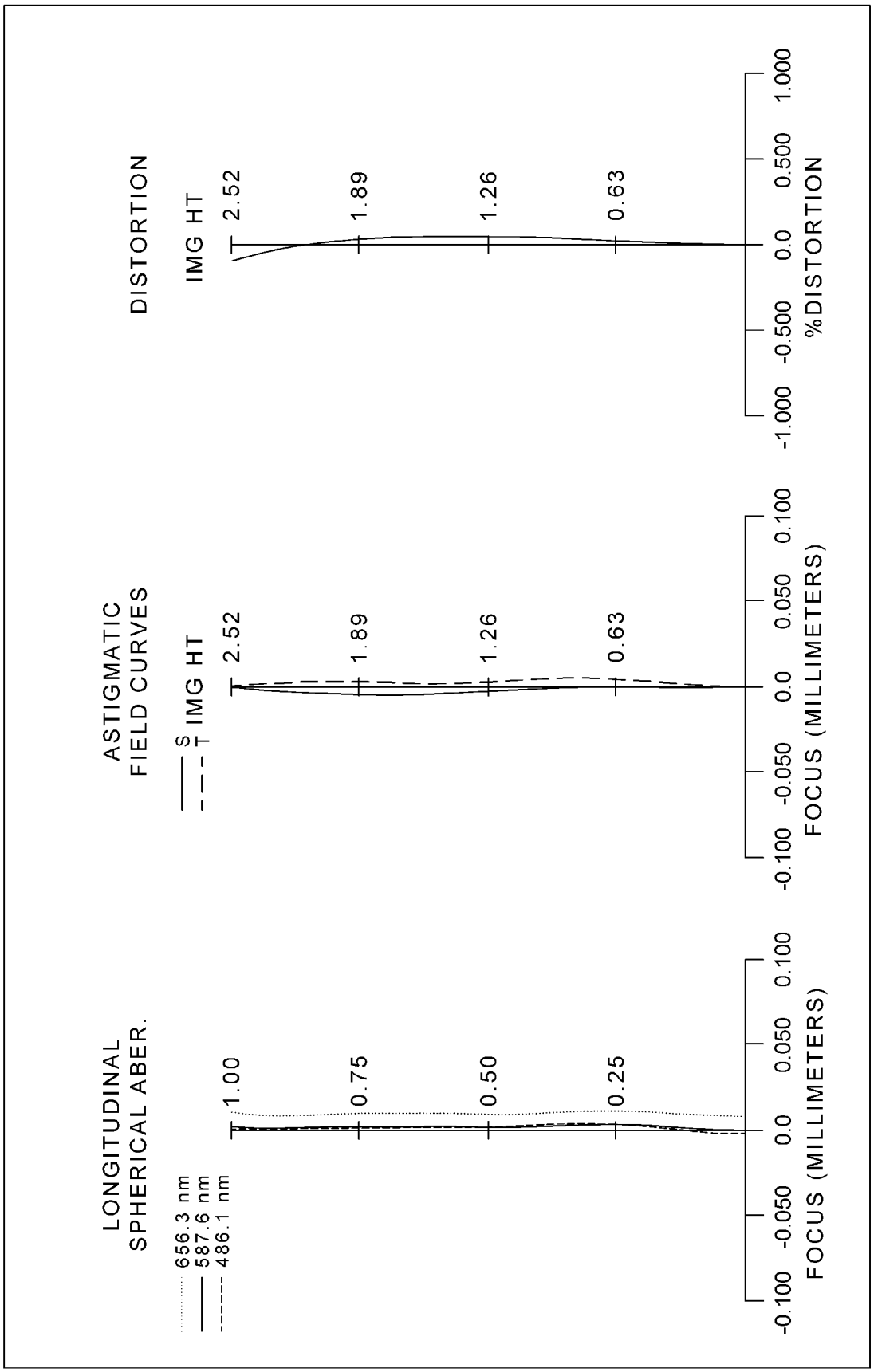
FIG. 3C shows longitudinal spherical aberration curves, astigmatic field curves and a distortion curve of the imaging apparatus in the first zoom state according to the 3rd embodiment.

FIG. 3A is a schematic view of an imaging apparatus in a first zoom state according to the 3rd embodiment of the present disclosure. FIG. 3B is a schematic view of an imaging apparatus with reflective surfaces in a first zoom state equivalent to the 3rd embodiment of the present disclosure. FIG. 3C shows, in order from left to right, longitudinal spherical aberration curves, astigmatic field curves and a distortion curve of the imaging apparatus in the first zoom state according to the 3rd embodiment.

In FIG. 3A, the imaging apparatus includes an imaging optical lens assembly (not otherwise herein labeled) of the present disclosure and an image sensor 385. The imaging optical lens assembly includes, in order from an object side to an image side along an optical path, a first optical element 310, an aperture stop 300, a second optical element 320, a third optical element 330, a fourth optical element 340, a fifth optical element 350, a prism 360, a filter 370, and an image surface 380. There is no additional optical element inserted between the first optical element 310 and the fifth optical element 350. There are air gaps between paraxial regions of the first optical element 310, the second optical element 320, the third optical element 330, the fourth optical element 340, and the fifth optical element 350.

The first optical element 310 with positive refractive power has an object-side surface 311 being concave in the paraxial region thereof, and an image-side surface 312 being convex in the paraxial region thereof. Both the object-side surface 311 and the image-side surface 312 are aspheric. The first optical element 310 is made of plastic material. In one embodiment of the present disclosure, the first optical element 310 is made of cyclo olefin polymer material and the cyclo olefin polymer may be a copolymer.

The second optical element 320 with positive refractive power has an object-side surface 321 being convex in the paraxial region thereof, and an image-side surface 322 being convex in the paraxial region thereof. Both the object-side surface 321 and the image-side surface 322 are aspheric. The second optical element 320 is made of plastic material.

The third optical element 330 with negative refractive power has an object-side surface 331 being convex in the paraxial region thereof, and an image-side surface 332 being concave in the paraxial region thereof. Both the object-side surface 331 and the image-side surface 332 are aspheric. The third optical element 330 is made of plastic material.

The fourth optical element 340 with negative refractive power has an object-side surface 341 being concave in the paraxial region thereof, and an image-side surface 342 being convex in the paraxial region thereof. Both the object-side surface 341 and the image-side surface 342 are aspheric. The fourth optical element 340 is made of plastic material.

The fifth optical element 350 with positive refractive power has an object-side surface 351 being convex in the paraxial region thereof, and an image-side surface 352 being concave in the paraxial region thereof. Both the object-side surface 351 and the image-side surface 352 are aspheric. The fifth optical element 350 is made of plastic material.

The prism 360 is disposed between the fifth optical element 350 and the filter 370. The prism 360 is made of glass material. The filter 370 is disposed between the prism 360 and the image surface 380. The filter 370 is made of glass material and does not affect the focal length of the imaging optical lens assembly. The image sensor 385 is disposed on the image surface 380 of the imaging optical lens assembly.

FIG. 3B is a schematic view of an imaging apparatus with reflective surfaces in a first zoom state equivalent to the 3rd embodiment of the present disclosure. In FIG. 3B, a first optical element 310' is a prism including a reflective surface 313' so as to fold the optical path by 90 degrees. An object-side surface 311' of the first optical element 310' corresponds to the object-side surface 311 of the first optical element 310 and an image-side surface 312' of the first optical element 310' corresponds to the image-side surface 312 of the first optical element 310 such that the overall optical properties of the first optical element 310' are equivalent to those of the first optical element 310 shown in FIG. 3A. A prism 360' includes a reflective surface 363' such that the overall optical properties of the prism 360' are equivalent to those of the prism 360 shown in FIG. 3A. According to the aforementioned configuration, an imaging apparatus equivalent to the 3rd embodiment with the optical path being folded can be obtained.

Figure 3D:
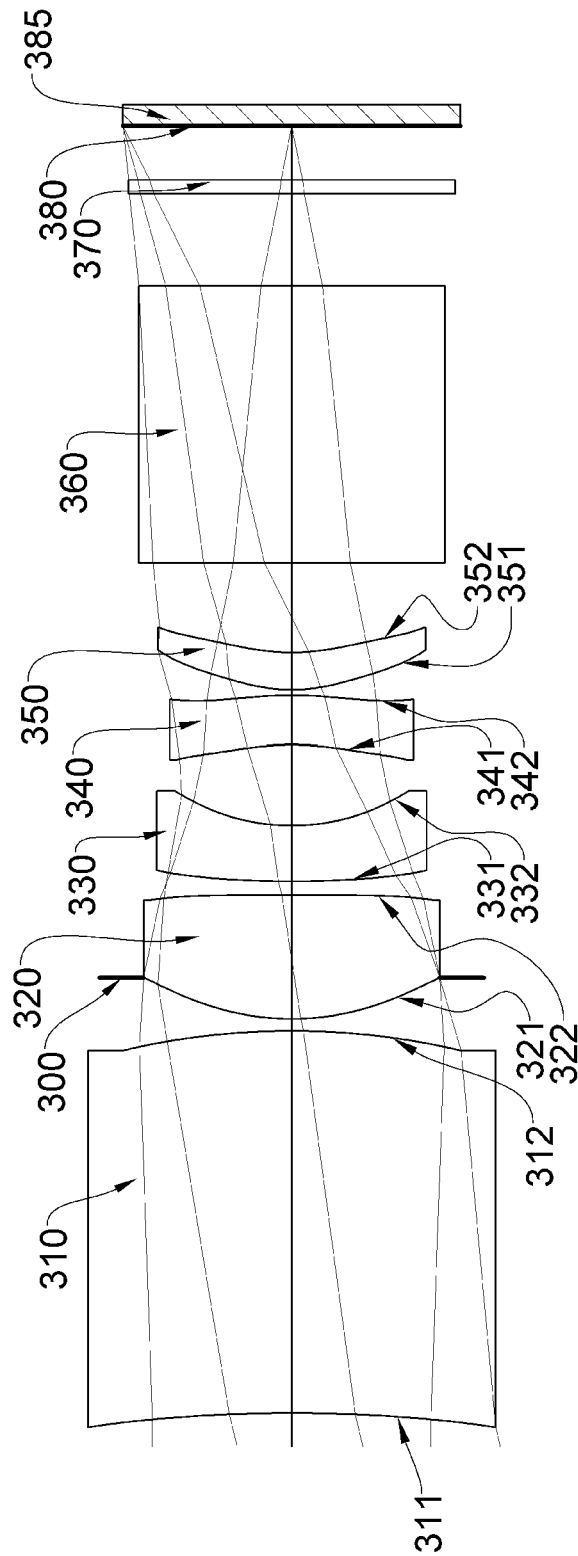
FIG. 3D is a schematic view of the imaging apparatus in a second zoom state according to the 3rd embodiment of the present disclosure.
Figure 3E:
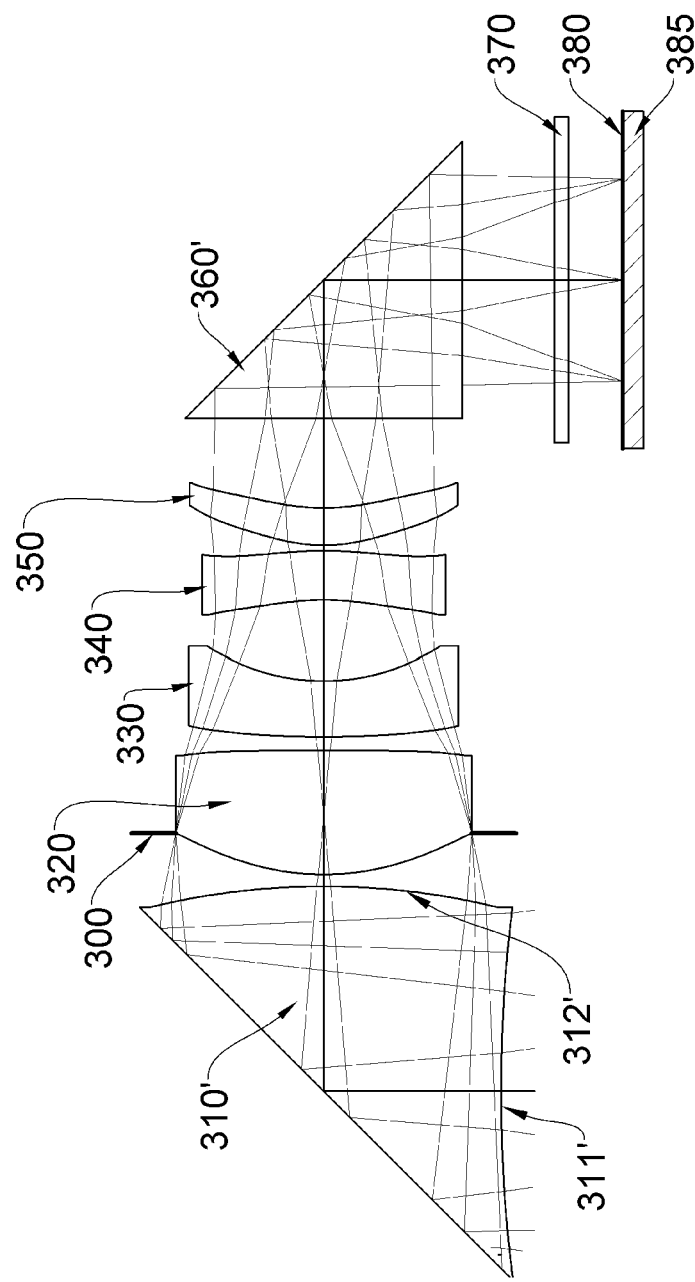
FIG. 3E is a schematic view of the imaging apparatus with reflective surfaces in a second zoom state equivalent to the 3rd embodiment of the present disclosure.
Figure 3F:
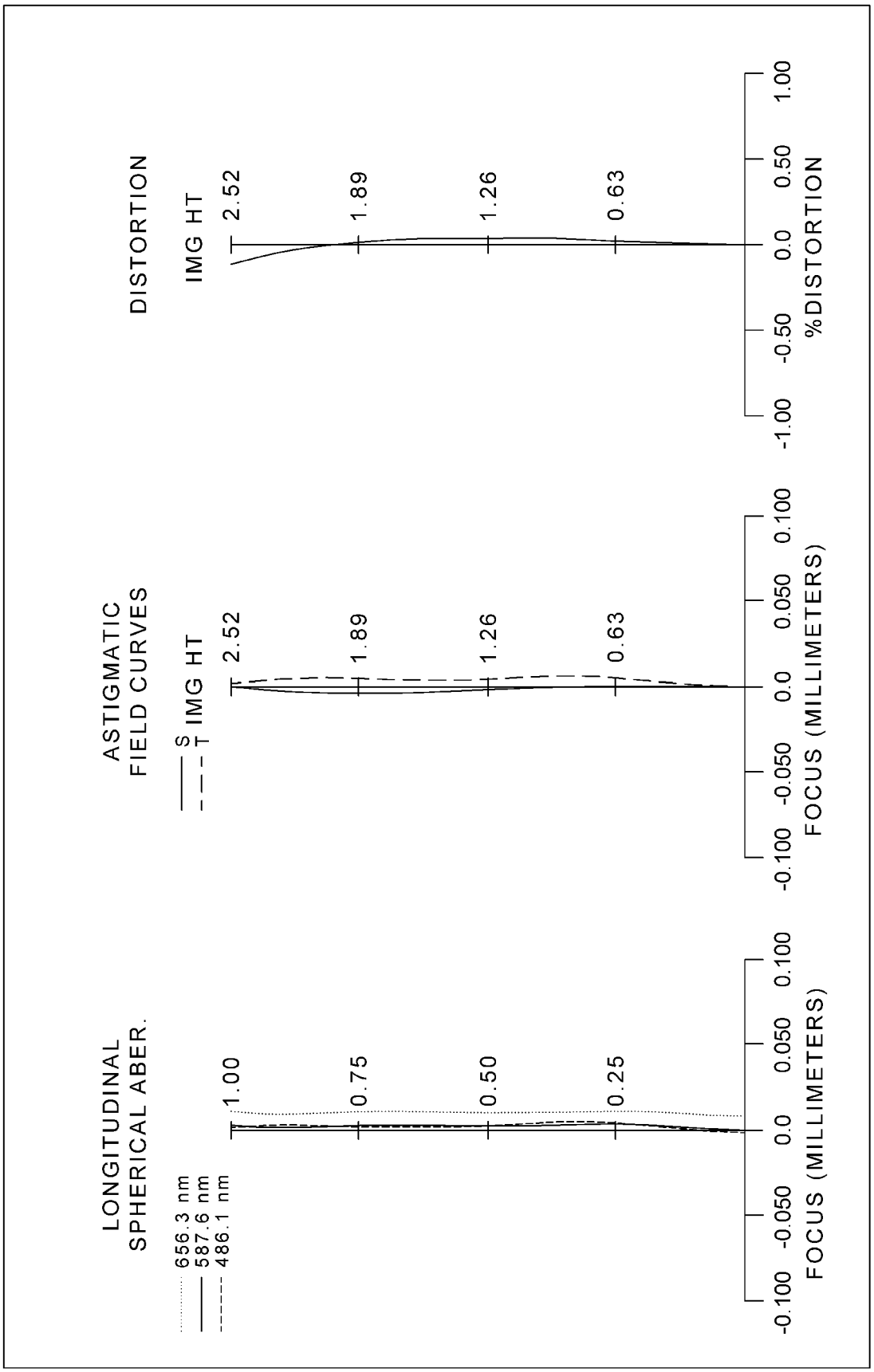
FIG. 3F shows longitudinal spherical aberration curves, astigmatic field curves and a distortion curve of the imaging apparatus in the second zoom state according to the 3rd embodiment.

FIG. 3D is a schematic view of an imaging apparatus in a second zoom state according to the 3rd embodiment of the present disclosure. FIG. 3E is a schematic view of an imaging apparatus with reflective surfaces in a second zoom state equivalent to the 3rd embodiment of the present disclosure. FIG. 3F shows, in order from left to right, longitudinal spherical aberration curves, astigmatic field curves and a distortion curve of the imaging apparatus in a second zoom state according to the 3rd embodiment. The imaging apparatus according to the 3rd embodiment changes from the first zoom state into the second zoom state by changing the distance between the image-side surface 312 of the first optical element 310 and the stop 300 from 0.984 mm to 0.797 mm, and changing the distance between the filter 370 and the image surface 380 from 0.601 mm to 0.808 mm. The configuration of the rest optical elements of the 3rd embodiment in the second zoom state is the same as that in the first zoom state. FIG. 3E is a schematic view of an imaging apparatus with reflective surfaces in a second zoom state equivalent to the 3rd embodiment of the present disclosure. All the descriptions thereto are the same as the aforementioned zoom state and explanations in this regard will not be provided again.

The detailed optical data of the 3rd embodiment are shown in TABLE 5, and the aspheric surface data are shown in TABLE 6.

TABLE 5

(3rd Embodiment)
First zoom state: f = 10.53 mm, Fno = 2.50, HFOV = 13.5 deg.
Second zoom state: f = 10.50 mm, Fno = 2.56, HFOV = 13.2 deg.

| Surface # | | Curvature Radius | | Thickness (First zoom state) | Thickness (Second zoom state) | Material | Index | Abbe # | Focal Length |
|---|---|---|---|---|---|---|---|---|---|
| 0 | Object | Plano | | Infinity | 600.0 | | | | |
| 1 | Optical element 1* | −23.932 | ASP | 5.713 | | Plastic | 1.544 | 55.9 | 33.41 |
| 2 | | −11.199 | ASP | 0.984 | 0.797 | | | | |
| 3 | Ape. Stop | Plano | | −0.618 | | | | | |
| 4 | Optical element 2 | 3.821 | ASP | 1.852 | | Plastic | 1.544 | 55.9 | 6.89 |
| 5 | | −169.338 | ASP | 0.204 | | | | | |
| 6 | Optical element 3 | 15.079 | ASP | 0.833 | | Plastic | 1.584 | 28.2 | −7.09 |
| 7 | | 3.183 | ASP | 1.206 | | | | | |
| 8 | Optical element 4 | −3.600 | ASP | 0.733 | | Plastic | 1.614 | 25.9 | −18.29 |
| 9 | | −5.709 | ASP | 0.082 | | | | | |
| 10 | Optical element 5 | 2.308 | ASP | 0.557 | | Plastic | 1.544 | 55.9 | 14.87 |
| 11 | | 2.954 | ASP | 1.338 | | | | | |
| 12 | Prism | Plano | | 4.140 | | Glass | 1.954 | 32.3 | — |
| 13 | | Plano | | 1.375 | | | | | |
| 14 | Filter | Plano | | 0.210 | | Glass | 1.563 | 51.3 | — |
| 15 | | Plano | | 0.601 | 0.808 | | | | |
| 16 | Image Surface | Plano | | — | — | | | | |

Remark: Reference wavelength is d-line 587.6 nm.
*The effective radius of Surface 10 is 2.000 mm.
*Optical element 1 is a prism with refractive power.

TABLE 6

Aspheric Coefficient

| Surface # | 1 | 2 | 4 | 5 | 6 |
|---|---|---|---|---|---|
| k = | 0.0000E+00 | 0.0000E+00 | 0.0000E+00 | 0.0000E+00 | 0.0000E+00 |
| A4 = | −1.2858E−04 | −1.4894E−04 | −1.6833E−03 | −5.4941E−03 | −4.4471E−03 |
| A6 = | −7.0247E−06 | 3.0183E−07 | −1.0053E−04 | 5.5321E−03 | 8.0666E−03 |
| A8 = | 4.1766E−07 | −2.2551E−07 | −4.2023E−05 | −3.3157E−03 | −4.8352E−03 |
| A10 = | −2.0709E−08 | 1.3673E−08 | −3.3913E−07 | 9.8694E−04 | 1.5220E−03 |
| A12 = | | | −4.8326E−07 | −1.7112E−04 | −2.6318E−04 |
| A14 = | | | −5.0200E−08 | 1.6742E−05 | 2.4921E−05 |
| A16 = | | | 9.4946E−09 | −7.1950E−07 | −1.0110E−06 |

| Surface # | 7 | 8 | 9 | 10 | 11 |
|---|---|---|---|---|---|
| k = | 0.0000E+00 | 0.0000E+00 | 0.0000E+00 | 0.0000E+00 | 0.0000E+00 |
| A4 = | 8.2367E−05 | 6.4215E−02 | 3.5542E−02 | −5.7791E−02 | −5.0129E−02 |
| A6 = | 2.6250E−03 | −3.5027E−02 | −1.7889E−02 | 6.8938E−03 | 1.2994E−02 |
| A8 = | −1.9407E−03 | 1.8978E−02 | 1.2832E−02 | 2.7970E−03 | −6.2309E−03 |
| A10 = | 2.3966E−04 | −8.0846E−03 | −6.3162E−03 | −2.9436E−03 | 3.6243E−03 |
| A12 = | 1.7336E−04 | 2.3229E−03 | 2.1228E−03 | 1.3626E−03 | −1.6634E−03 |
| A14 = | −5.9445E−05 | −3.8390E−04 | −4.1349E−04 | −3.5533E−04 | 5.4840E−04 |
| A16 = | 4.4446E−06 | 2.3891E−05 | 3.2895E−05 | 4.8899E−05 | −1.1653E−04 |
| A18 = | | | | −2.8321E−06 | 1.4112E−05 |
| A20 = | | | | | −7.3911E−07 |

In the 3rd embodiment, the equation of the aspheric surface profiles of the aforementioned optical elements is the same as the equation of the 1st embodiment. Also, the definitions of these parameters shown in table below are the same as those stated in the 1 st embodiment with corresponding values for the 3rd embodiment, so an explanation in this regard will not be provided again.

Moreover, these parameters can be calculated from TABLE 5 and TABLE 6 and satisfy the conditions stated in table below.

| 3rd Embodiment | | | |
|---|---|---|---|
| f [mm] | 10.53 | ΣCT/CT1 | 1.70 |
| Fno | 2.50 | Dr3r10/BL | 0.71 |
| HFOV [deg.] | 13.5 | |f/R1| + |f/R2| | 1.38 |
| Y2R1 | 2.21 | (f/R3) + (f/R6) | 6.07 |
| Y5R2 | 1.97 | (f/R9) + (f/R10) | 8.13 |
| V1/N1 | 36.26 | |f2/f1| | 0.21 |
| V2/N2 | 36.26 | |f2/f4| | 0.38 |
| V3/N3 | 17.83 | |f2/f5| | 0.46 |
| V4/N4 | 16.09 | |f3/f1| | 0.21 |
| V5/N5 | 36.26 | |f3/f2| | 1.03 |
| Tg1 (° C.) | 137.00 | |f3/f4| | 0.39 |
| Tg1/N1 | 88.73 | |f3/f5| | 0.48 |
| Y2R1/Y5R2 | 1.12 | f/f1 | 0.32 |
| CT2/CT3 | 2.22 | |f/f2| + |f/f3| | 3.01 |
| (CT2 + CT3)/(CT4 + CT5) | 2.08 | | |

4th Embodiment

Figure 4A:
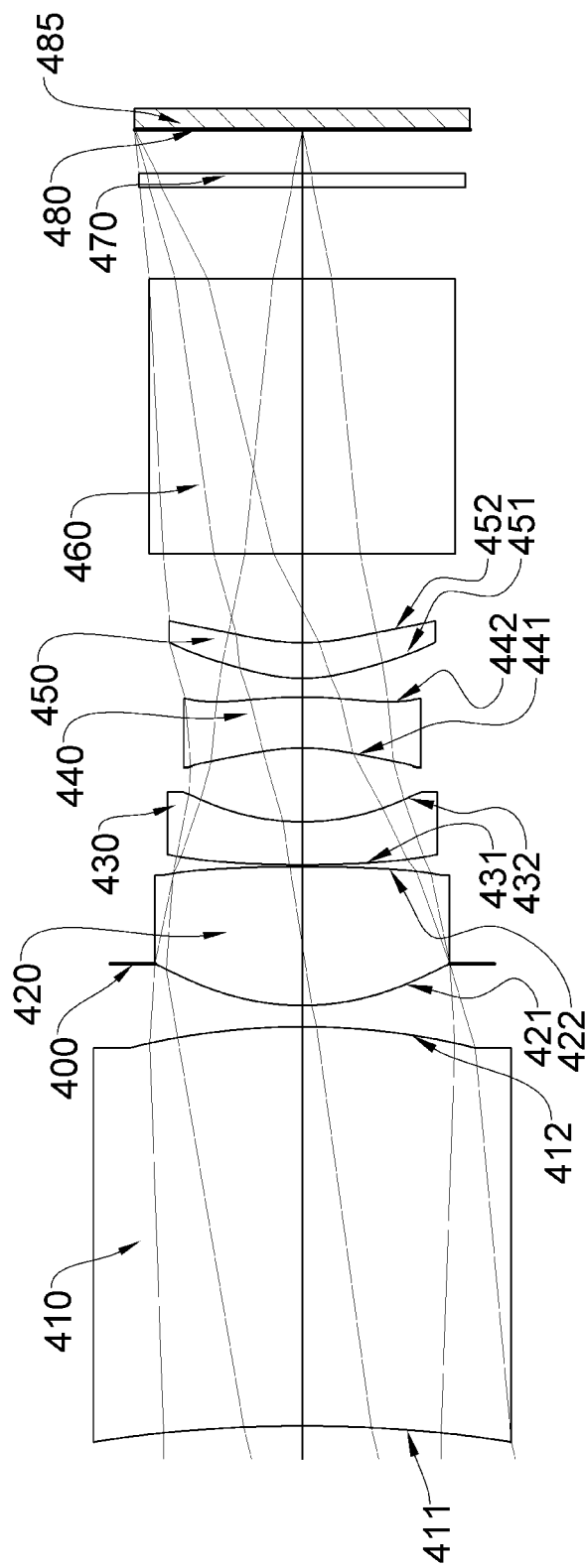
FIG. 4A is a schematic view of an imaging apparatus in a first zoom state according to the 4th embodiment of the present disclosure.
Figure 4B:
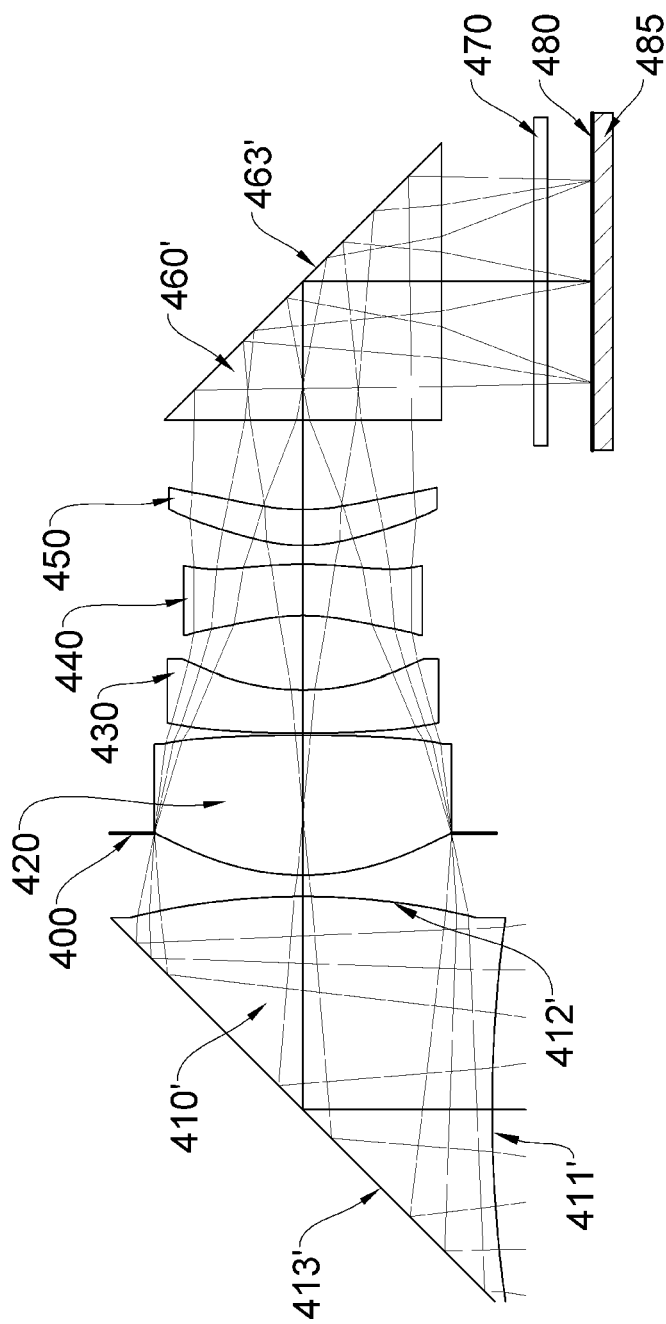
FIG. 4B is a schematic view of an imaging apparatus with reflective surfaces in a first zoom state equivalent to the 4th embodiment of the present disclosure.
Figure 4C:
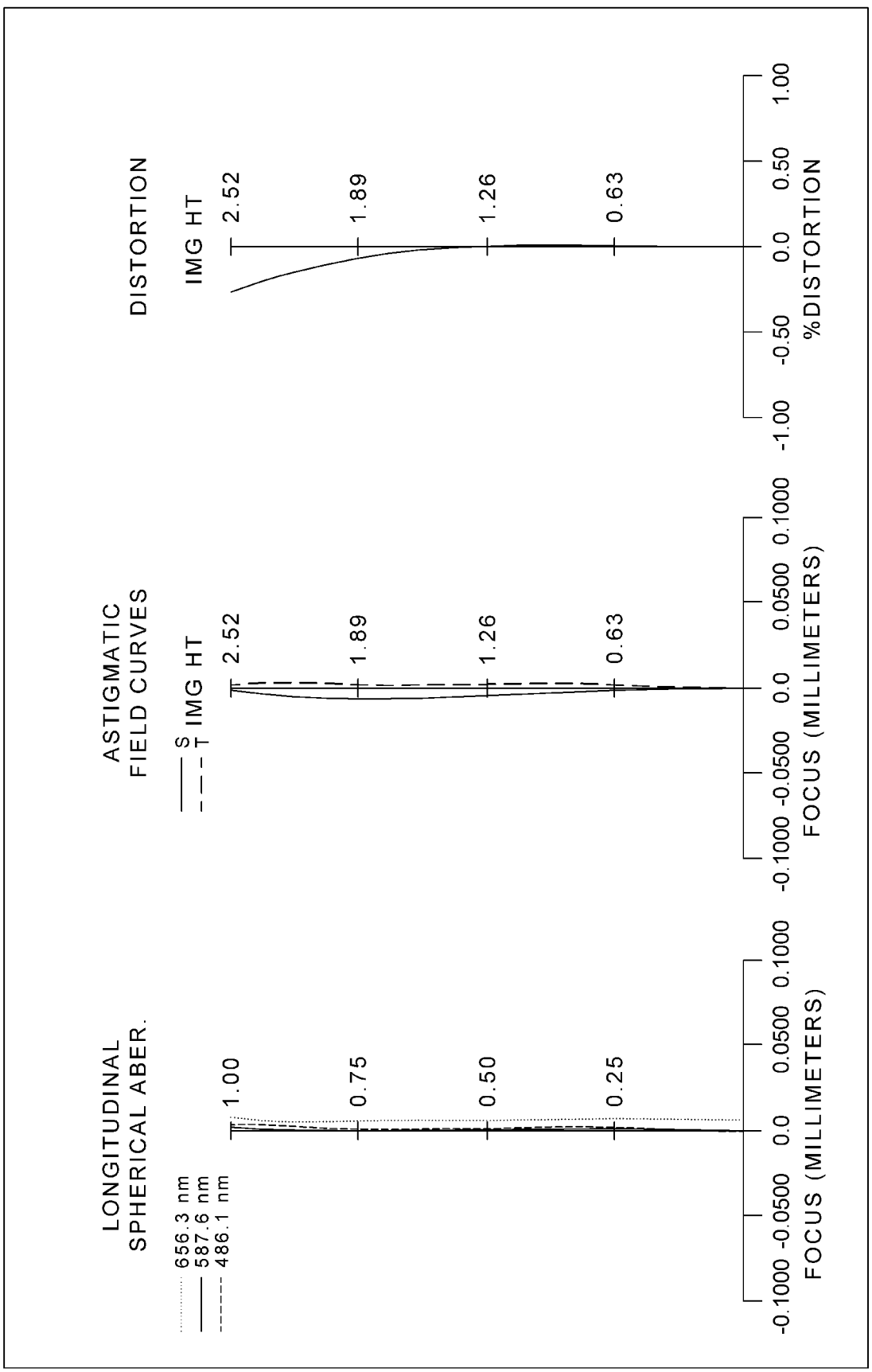
FIG. 4C shows longitudinal spherical aberration curves, astigmatic field curves and a distortion curve of the imaging apparatus in the first zoom state according to the 4th embodiment.

FIG. 4A is a schematic view of an imaging apparatus in a first zoom state according to the 4th embodiment of the present disclosure. FIG. 4B is a schematic view of an imaging apparatus with reflective surfaces in a first zoom state equivalent to the 4th embodiment of the present disclosure. FIG. 4C shows, in order from left to right, longitudinal spherical aberration curves, astigmatic field curves and a distortion curve of the imaging apparatus in a first zoom state according to the 4th embodiment.

In FIG. 4A, the imaging apparatus includes an imaging optical lens assembly (not otherwise herein labeled) of the present disclosure and an image sensor 485. The imaging optical lens assembly includes, in order from an object side to an image side along an optical path, a first optical element 410, an aperture stop 400, a second optical element 420, a third optical element 430, a fourth optical element 440, a fifth optical element 450, a prism 460, a filter 470, and an image surface 480. There is no additional optical element inserted between the first optical element 410 and the fifth optical element 450. There are air gaps between paraxial regions of the first optical element 410, the second optical element 420, the third optical element 430, the fourth optical element 440, and the fifth optical element 450.

The first optical element 410 with positive refractive power has an object-side surface 411 being concave in the paraxial region thereof, and an image-side surface 412 being convex in the paraxial region thereof. Both the object-side surface 411 and the image-side surface 412 are aspheric. The first optical element 410 is made of plastic material. In one embodiment of the present disclosure, the first optical element 410 is made of cyclo olefin polymer material and the cyclo olefin polymer may be a copolymer.

The second optical element 420 with positive refractive power has an object-side surface 421 being convex in the paraxial region thereof, and an image-side surface 422 being convex in the paraxial region thereof. Both the object-side surface 421 and the image-side surface 422 are aspheric. The second optical element 420 is made of plastic material.

The third optical element 430 with negative refractive power has an object-side surface 431 being convex in the paraxial region thereof, and an image-side surface 432 being concave in the paraxial region thereof. Both the object-side surface 431 and the image-side surface 432 are aspheric. The third optical element 430 is made of plastic material.

The fourth optical element 440 with negative refractive power has an object-side surface 441 being concave in the paraxial region thereof, and an image-side surface 442 being convex in the paraxial region thereof. Both the object-side surface 441 and the image-side surface 442 are aspheric. The fourth optical element 440 is made of plastic material.

The fifth optical element 450 with positive refractive power has an object-side surface 451 being convex in the paraxial region thereof, and an image-side surface 452 being concave in the paraxial region thereof. Both the object-side surface 451 and the image-side surface 452 are aspheric. The fifth optical element 450 is made of plastic material.

The prism 460 is disposed between the fifth optical element 450 and the filter 470. The prism 460 is made of glass material. The filter 470 is disposed between the prism 460 and the image surface 480. The filter 470 is made of glass material and does not affect the focal length of the imaging optical lens assembly. The image sensor 485 is disposed on the image surface 480 of the imaging optical lens assembly.

FIG. 4B is a schematic view of an imaging apparatus with reflective surfaces in a first zoom state equivalent to the 4th embodiment of the present disclosure. In FIG. 4B, a first optical element 410' is a prism including a reflective surface 413' so as to fold the optical path by 90 degrees. An object-side surface 411' of the first optical element 410' corresponds to the object-side surface 411 of the first optical element 410 and an image-side surface 412' of the first optical element 410' corresponds to the image-side surface 412 of the first optical element 410 such that the overall optical properties of the first optical element 410' are equivalent to those of the first optical element 410 shown in FIG. 4A. A prism 460' includes a reflective surface 463' such that the overall optical properties of the prism 460' are equivalent to those of the prism 460 shown in FIG. 4A. According to the aforementioned configuration, an imaging apparatus equivalent to the 4th embodiment with the optical path being folded can be obtained.

Figure 4D:
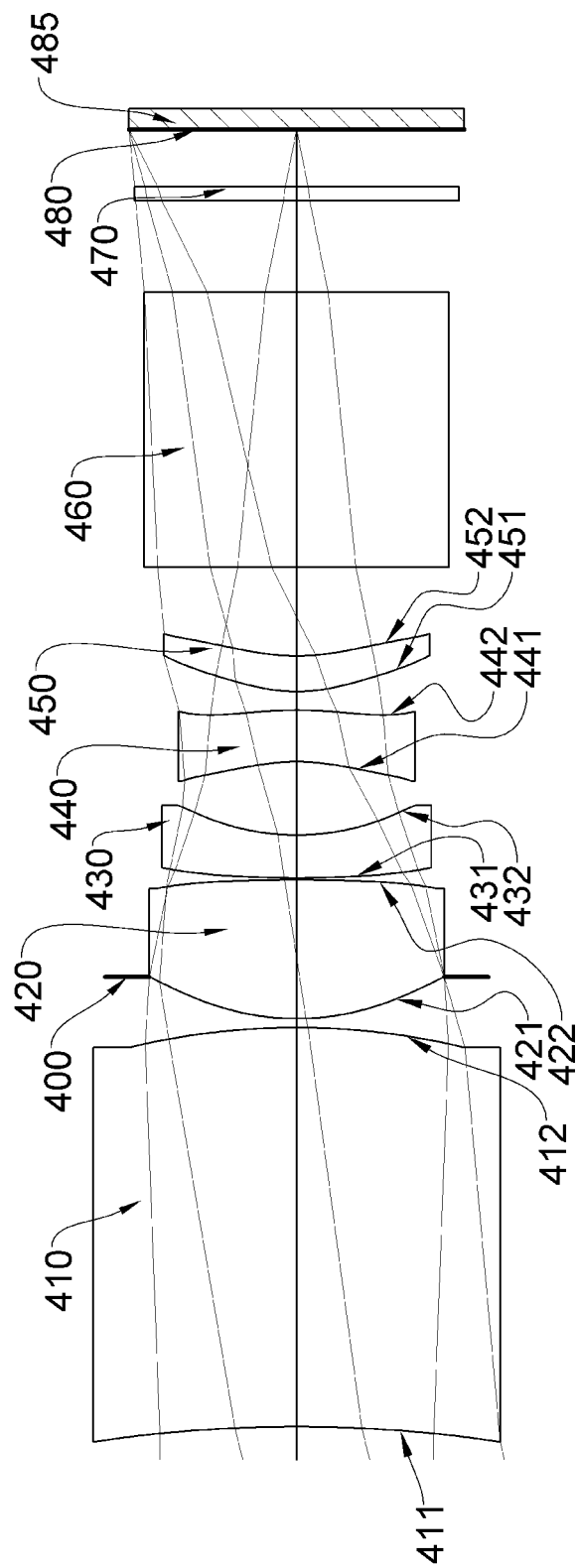
FIG. 4D is a schematic view of an imaging apparatus in a second zoom state according to the 4th embodiment of the present disclosure.
Figure 4E:
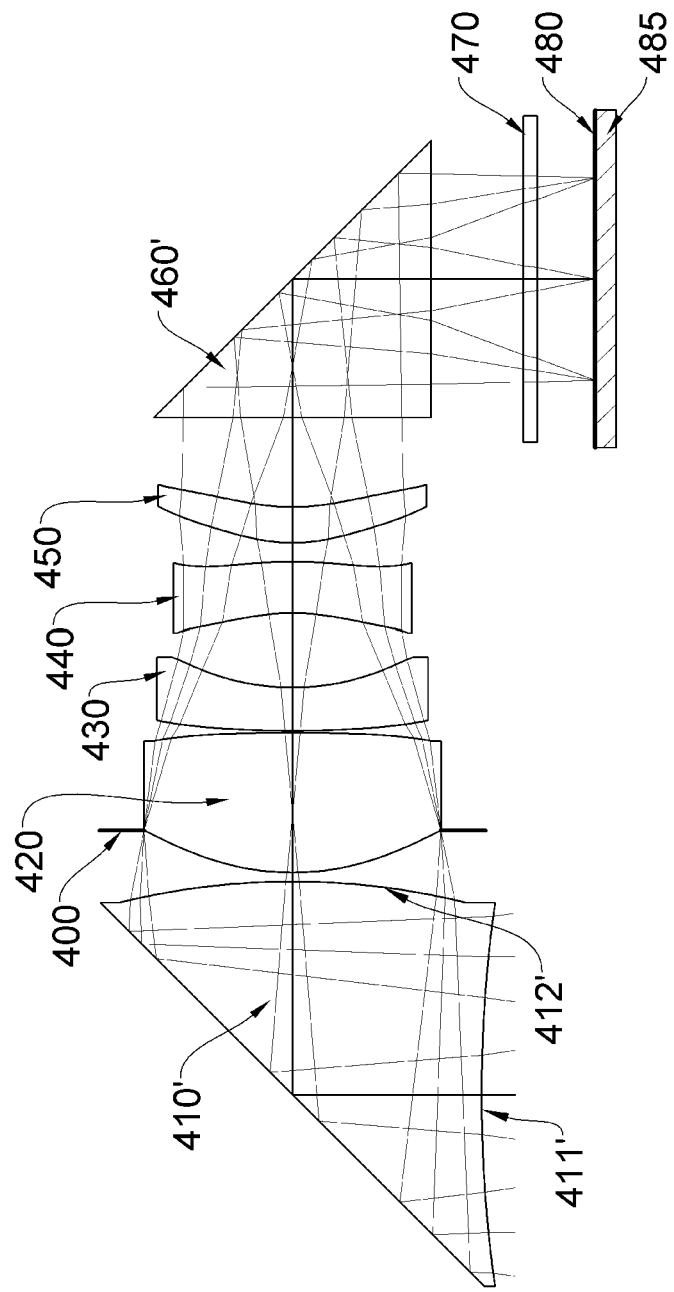
FIG. 4E is a schematic view of an imaging apparatus with reflective surfaces in a second zoom state equivalent to the 4th embodiment of the present disclosure.
Figure 4F:
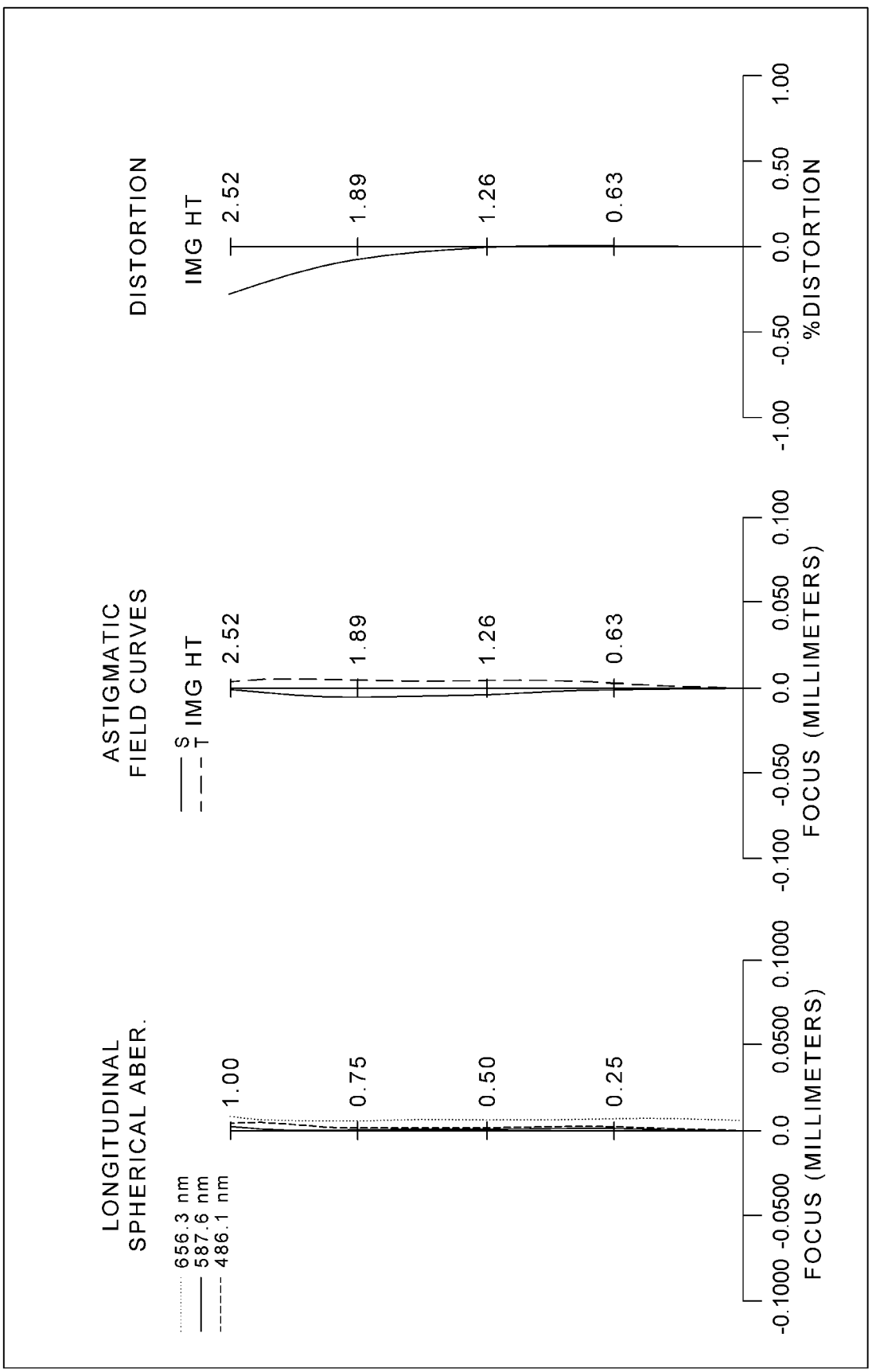
FIG. 4F shows longitudinal spherical aberration curves, astigmatic field curves and a distortion curve of the imaging apparatus in the second zoom state according to the 4th embodiment.

FIG. 4D is a schematic view of an imaging apparatus in a second zoom state according to the 4th embodiment of the present disclosure. FIG. 4E is a schematic view of an imaging apparatus with reflective surfaces in a second zoom state equivalent to the 4th embodiment of the present disclosure. FIG. 4F shows, in order from left to right, longitudinal spherical aberration curves, astigmatic field curves and a distortion curve of the imaging apparatus in a second zoom state according to the 4th embodiment. The imaging apparatus according to the 4th embodiment changes from the first zoom state into the second zoom state by changing the distance between the image-side surface 412 of the first optical element 410 and the stop 400 from 0.948 mm to 0.763 mm, and changing the distance between the filter 470 and the image surface 480 from 0.663 mm to 0.865 mm. The configuration of the rest optical elements of the 4th embodiment in the second zoom state is the same as that in the first zoom state. FIG. 4E is a schematic view of an imaging apparatus with reflective surfaces in a second zoom state equivalent to the 4th embodiment of the present disclosure. All the descriptions thereto are the same as the aforementioned zoom state and explanations in this regard will not be provided again.

The detailed optical data of the 4th embodiment are shown in TABLE 7, and the aspheric surface data are shown in TABLE 8.

TABLE 7

(4th Embodiment)
First zoom state: f = 10.43 mm, Fno = 2.50, HFOV = 13.6 deg.
Second zoom state: f = 10.39 mm, Fno = 2.56, HFOV = 13.4 deg.

| Surface # | | Curvature Radius | | Thickness (First zoom state) | Thickness (Second zoom state) | Material | Index | Abbe # | Focal Length |
|---|---|---|---|---|---|---|---|---|---|
| 0 | Object | Plano | | Infinity | 600.0 | | | | |
| 1 | Optical element 1* | −21.695 | ASP | 6.011 | | Plastic | 1.544 | 55.9 | 33.95 |
| 2 | | −10.946 | ASP | 0.948 | 0.763 | | | | |
| 3 | Ape. Stop | Plano | | −0.628 | | | | | |
| 4 | Optical element 2 | 3.785 | ASP | 2.089 | | Plastic | 1.544 | 55.9 | 6.32 |
| 5 | | −30.183 | ASP | 0.030 | | | | | |
| 6 | Optical element 3 | 16.769 | ASP | 0.646 | | Plastic | 1.583 | 30.2 | −7.99 |
| 7 | | 3.591 | ASP | 1.103 | | | | | |
| 8 | Optical element 4 | −3.118 | ASP | 0.767 | | Plastic | 1.607 | 26.6 | −11.16 |
| 9 | | −6.310 | ASP | 0.281 | | | | | |
| 10 | Optical element 5 | 2.337 | ASP | 0.536 | | Plastic | 1.549 | 55.2 | 14.14 |
| 11 | | 3.071 | ASP | 1.338 | | | | | |
| 12 | Prism | Plano | | 4.140 | | Glass | 1.954 | 32.3 | — |
| 13 | | Plano | | 1.375 | | | | | |
| 14 | Filter | Plano | | 0.210 | | Glass | 1.563 | 51.3 | — |
| 15 | | Plano | | 0.663 | 0.865 | | | | |
| 16 | Image Surface | Plano | | — | — | | | | |

Remark: Reference wavelength is d-line 587.6 nm.
*The effective radius of Surface 10 is 2.000 mm.
*Optical element 1 is a prism with refractive power.

TABLE 8

Aspheric Coefficient

| Surface # | 1 | 2 | 4 | 5 | 6 |
|---|---|---|---|---|---|
| k= | 0.0000E+00 | 0.0000E+00 | 0.0000E+00 | 0.0000E+00 | 0.0000E+00 |
| A4= | −8.7232E−05 | −1.2183E−04 | −1.6154E−03 | −4.9519E−03 | −2.2127E−03 |
| A6= | −7.6923E−06 | 2.9648E−06 | −1.7064E−04 | 3.2596E−03 | 1.5246E−03 |
| A8= | 4.1009E−07 | −8.8828E−07 | −1.8377E−05 | −9.8738E−04 | 7.7536E−04 |
| A10= | −1.9576E−08 | 5.8400E−08 | −1.0344E−05 | −3.5708E−05 | −6.3090E−04 |
| A12= | | | 2.5687E−06 | 5.9619E−05 | 1.6079E−04 |
| A14= | | | −5.0644E−07 | −9.9785E−06 | −1.7931E−05 |
| A16= | | | 3.4181E−08 | 5.5523E−07 | 7.8484E−07 |

| Surface # | 7 | 8 | 9 | 10 | 11 |
|---|---|---|---|---|---|
| k= | 0.0000E+00 | 0.0000E+00 | 0.0000E+00 | 0.0000E+00 | 0.0000E+00 |
| A4= | 2.0304E−03 | 5.5054E−02 | 2.0842E−02 | −5.9226E−02 | −4.1986E−02 |
| A6= | −4.7837E−03 | −2.7792E−02 | −4.8259E−02 | 8.7958E−03 | 3.0320E−03 |
| A8= | 3.4590E−03 | 1.7826E−02 | 7.2056E−03 | 1.0129E−03 | 2.4251E−03 |
| A10= | −1.1726E−03 | −7.8020E−03 | −3.6680E−03 | −1.2775E−03 | −1.5637E−03 |
| A12= | 2.3804E−04 | 2.1331E−03 | 1.1126E−03 | 3.9000E−04 | 5.5845E−04 |
| A14= | −4.6460E−05 | −3.5320E−04 | −2.1507E−04 | −6.0783E−05 | −1.4228E−04 |
| A16= | 3.7398E−06 | 2.3821E−05 | 1.8859E−05 | 3.9708E−06 | 2.7640E−05 |
| A18= | | | | −4.1053E−08 | −3.6741E−06 |
| A20= | | | | | 2.3520E−07 |

In the 4th embodiment, the equation of the aspheric surface profiles of the aforementioned optical elements is the same as the equation of the 1st embodiment. Also, the definitions of these parameters shown in table below are the same as those stated in the 1st embodiment with corresponding values for the 4th embodiment, so an explanation in this regard will not be provided again.

Moreover, these parameters can be calculated from TABLE 7 and TABLE 8 and satisfy the conditions stated in table below.

| 4th Embodiment | | | |
|---|---|---|---|
| f [mm] | 10.43 | ΣCT/CT1 | 1.67 |
| Fno | 2.50 | Dr3r10/BL | 0.71 |
| HFOV [deg.] | 13.6 | |f/R1| + |f/R2| | 1.43 |
| Y2R1 | 2.22 | (f/R3) + (f/R6) | 5.66 |
| Y5R2 | 1.99 | (f/R9) + (f/R10) | 7.86 |
| V1/N1 | 36.23 | |f2/f1| | 0.19 |
| V2/N2 | 36.23 | |f2/f4| | 0.57 |
| V3/N3 | 19.11 | |f2/f5| | 0.45 |
| V4/N4 | 16.57 | |f3/f1| | 0.24 |
| V5/N5 | 35.64 | |f3/f2| | 1.26 |
| Tg1 (° C.) | 145.00 | |f3/f4| | 0.72 |
| Tg1/N1 | 93.93 | |f3/f5| | 0.56 |
| Y2R1/Y5R2 | 1.11 | f/f1 | 0.31 |
| CT2/CT3 | 3.23 | |f/f2| + |f/f3| | 2.95 |
| (CT2 + CT3)/(CT4 + CT5) | 2.10 | | |

5th Embodiment

Figure 5A:
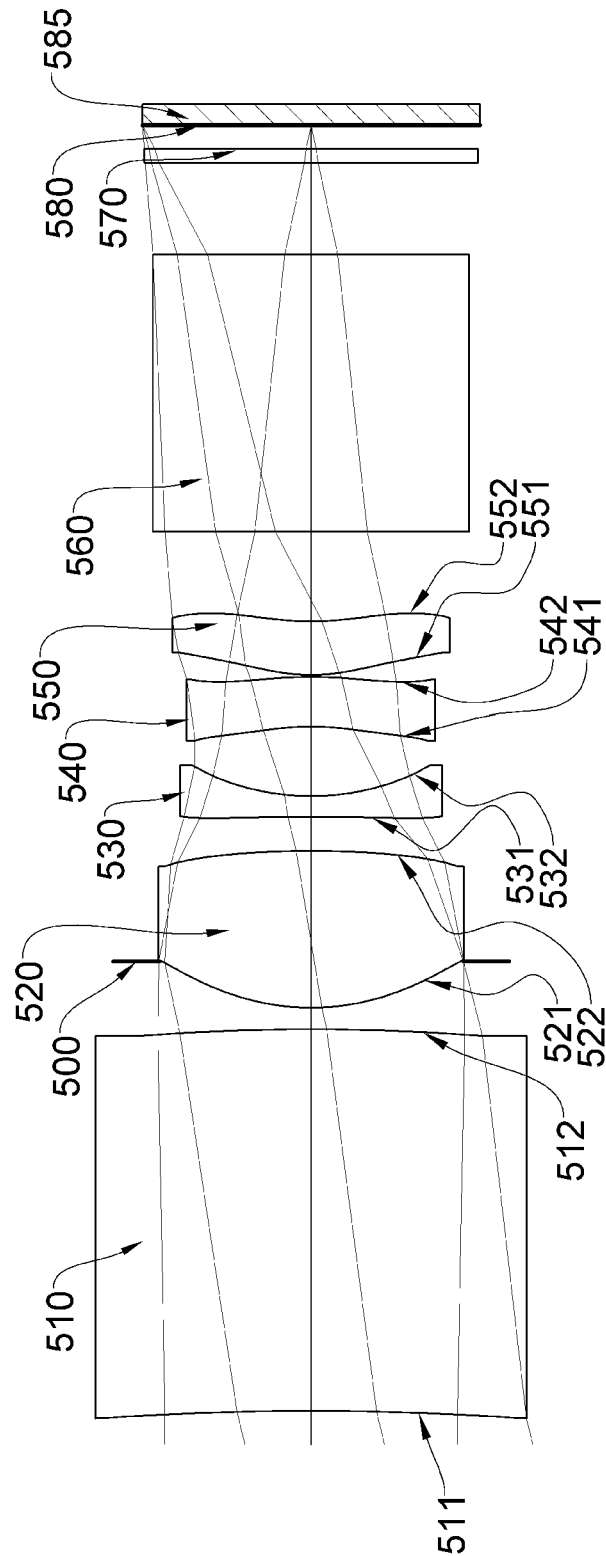
FIG. 5A is a schematic view of an imaging apparatus in a first zoom state according to the 5th embodiment of the present disclosure.
Figure 5B:
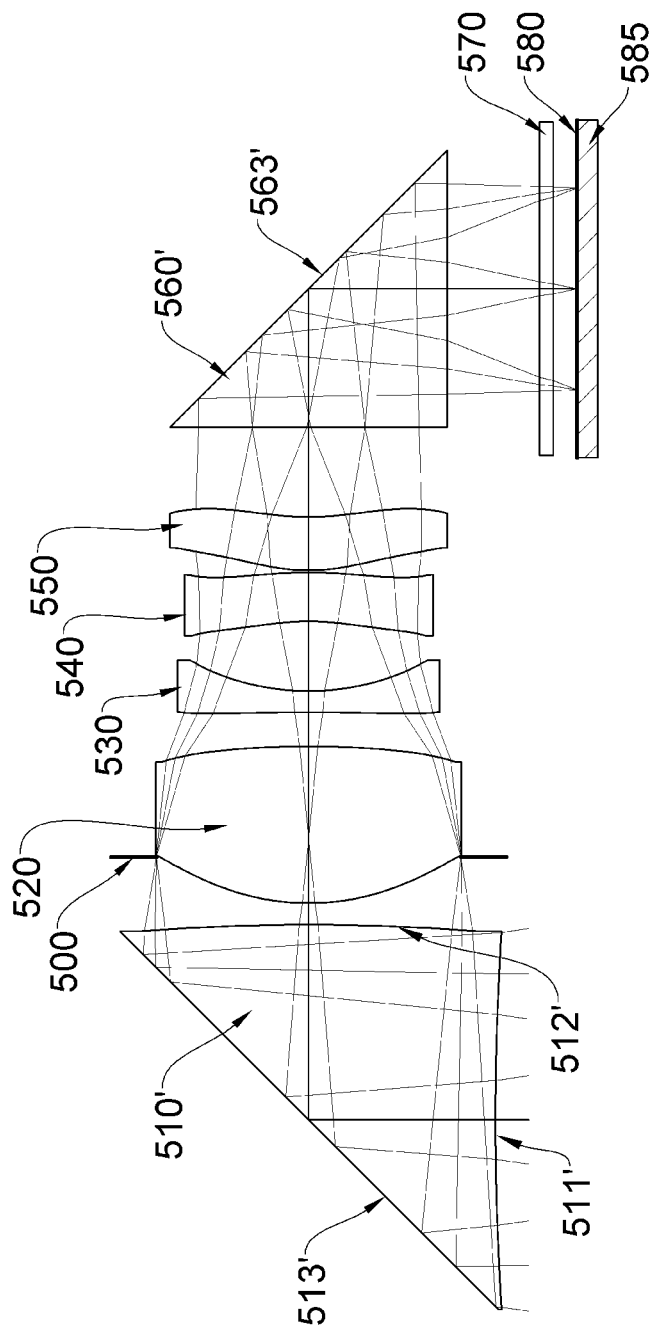
FIG. 5B is a schematic view of an imaging apparatus with reflective surfaces in a first zoom state equivalent to the 5th embodiment of the present disclosure.
Figure 5C:
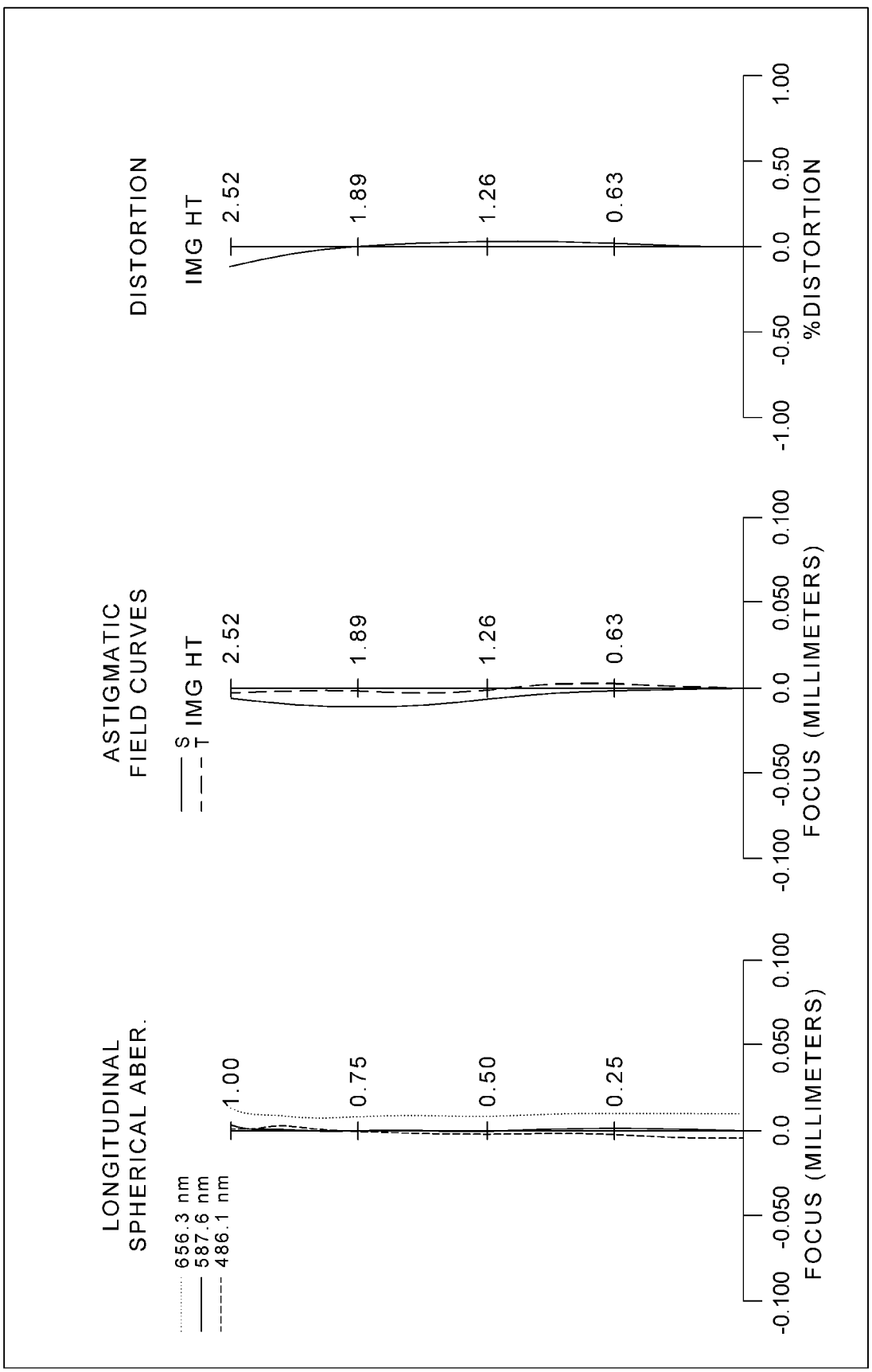
FIG. 5C shows longitudinal spherical aberration curves, astigmatic field curves and a distortion curve of the imaging apparatus in the first zoom state according to the 5th embodiment.

FIG. 5A is a schematic view of an imaging apparatus in a first zoom state according to the 5th embodiment of the present disclosure. FIG. 5B is a schematic view of an imaging apparatus with reflective surfaces in a first zoom state equivalent to the 5th embodiment of the present disclosure. FIG. 5C shows, in order from left to right, longitudinal spherical aberration curves, astigmatic field curves and a distortion curve of the imaging apparatus in a first zoom state according to the 5th embodiment.

In FIG. 5A, the imaging apparatus includes an imaging optical lens assembly (not otherwise herein labeled) of the present disclosure and an image sensor 585. The imaging optical lens assembly includes, in order from an object side to an image side along an optical path, a first optical element 510, an aperture stop 500, a second optical element 520, a third optical element 530, a fourth optical element 540, a fifth optical element 550, a prism 560, a filter 570, and an image surface 580. There is no additional optical element inserted between the first optical element 510 and the fifth optical element 550. There are air gaps between paraxial regions of the first optical element 510, the second optical element 520, the third optical element 530, the fourth optical element 540, and the fifth optical element 550.

The first optical element 510 with positive refractive power has an object-side surface 511 being concave in the paraxial region thereof, and an image-side surface 512 being convex in the paraxial region thereof. The object-side surface 511 is aspheric and the image-side surface 512 is spherical. The first optical element 510 is made of plastic material.

The second optical element 520 with positive refractive power has an object-side surface 521 being convex in the paraxial region thereof, and an image-side surface 522 being convex in the paraxial region thereof. Both the object-side surface 521 and the image-side surface 522 are aspheric. The second optical element 520 is made of plastic material.

The third optical element 530 with negative refractive power has an object-side surface 531 being concave in the paraxial region thereof, and an image-side surface 532 being concave in the paraxial region thereof. Both the object-side surface 531 and the image-side surface 532 are aspheric. The third optical element 530 is made of plastic material.

The fourth optical element 540 with negative refractive power has an object-side surface 541 being concave in the paraxial region thereof, and an image-side surface 542 being convex in the paraxial region thereof. Both the object-side surface 541 and the image-side surface 542 are aspheric. The fourth optical element 540 is made of plastic material.

The fifth optical element 550 with positive refractive power has an object-side surface 551 being convex in the paraxial region thereof, and an image-side surface 552 being concave in the paraxial region thereof. Both the object-side surface 551 and the image-side surface 552 are aspheric. The fifth optical element 550 is made of plastic material.

The prism 560 is disposed between the fifth optical element 550 and the filter 570. The prism 560 is made of glass material. The filter 570 is disposed between the prism 560 and the image surface 580. The filter 570 is made of glass material and does not affect the focal length of the imaging optical lens assembly. The image sensor 585 is disposed on the image surface 580 of the imaging optical lens assembly.

FIG. 5B is a schematic view of an imaging apparatus with reflective surfaces in a first zoom state equivalent to the 5th embodiment of the present disclosure. In FIG. 5B, a first optical element 510' is a prism including a reflective surface 513' so as to fold the optical path by 90 degrees. An object-side surface 511' of the first optical element 510' corresponds to the object-side surface 511 of the first optical element 510 and an image-side surface 512' of the first optical element 510' corresponds to the image-side surface 512 of the first optical element 510 such that the overall optical properties of the first optical element 510' are equivalent to those of the first optical element 510 shown in FIG. 5A. A prism 560' includes a reflective surface 563' such that the overall optical properties of the prism 560' are equivalent to those of the prism 560 shown in FIG. 5A. According to the aforementioned configuration, an imaging apparatus equivalent to the 5th embodiment with the optical path being folded can be obtained.

Figure 5D:
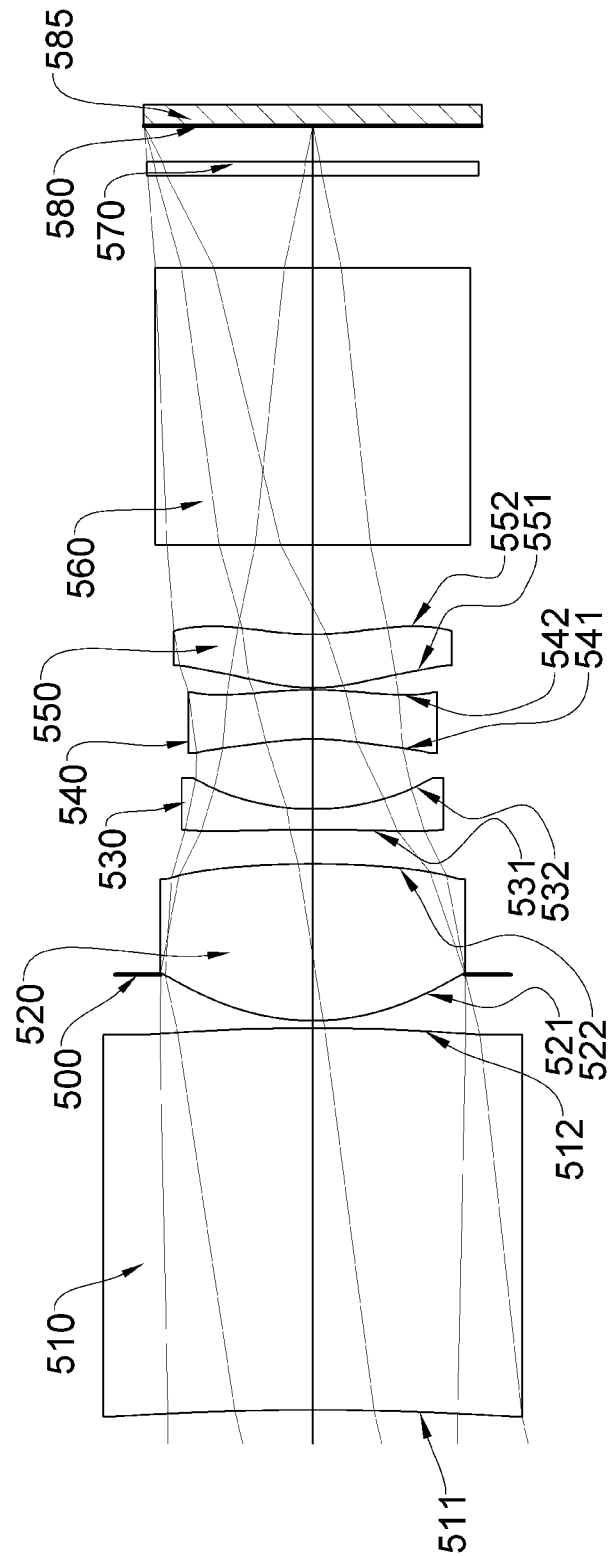
FIG. 5D is a schematic view of an imaging apparatus in a second zoom state according to the 5th embodiment of the present disclosure.
Figure 5E:
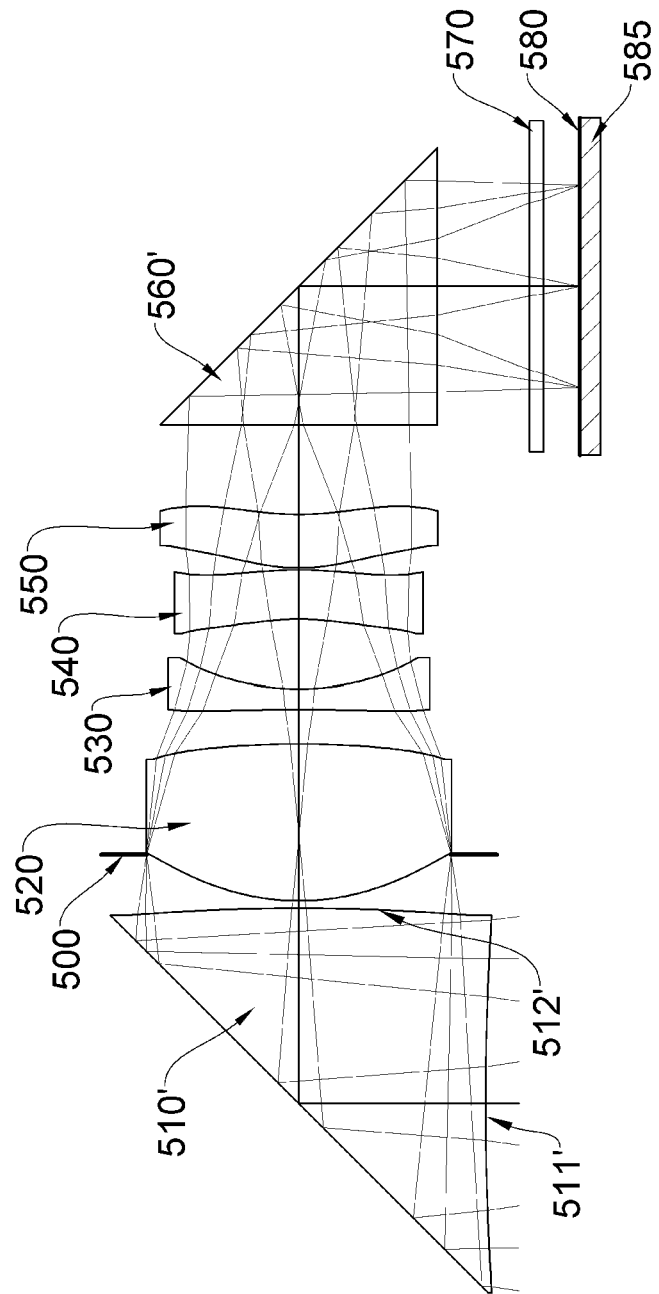
FIG. 5E is a schematic view of an imaging apparatus with reflective surfaces in a second zoom state equivalent to the 5th embodiment of the present disclosure.
Figure 5F:
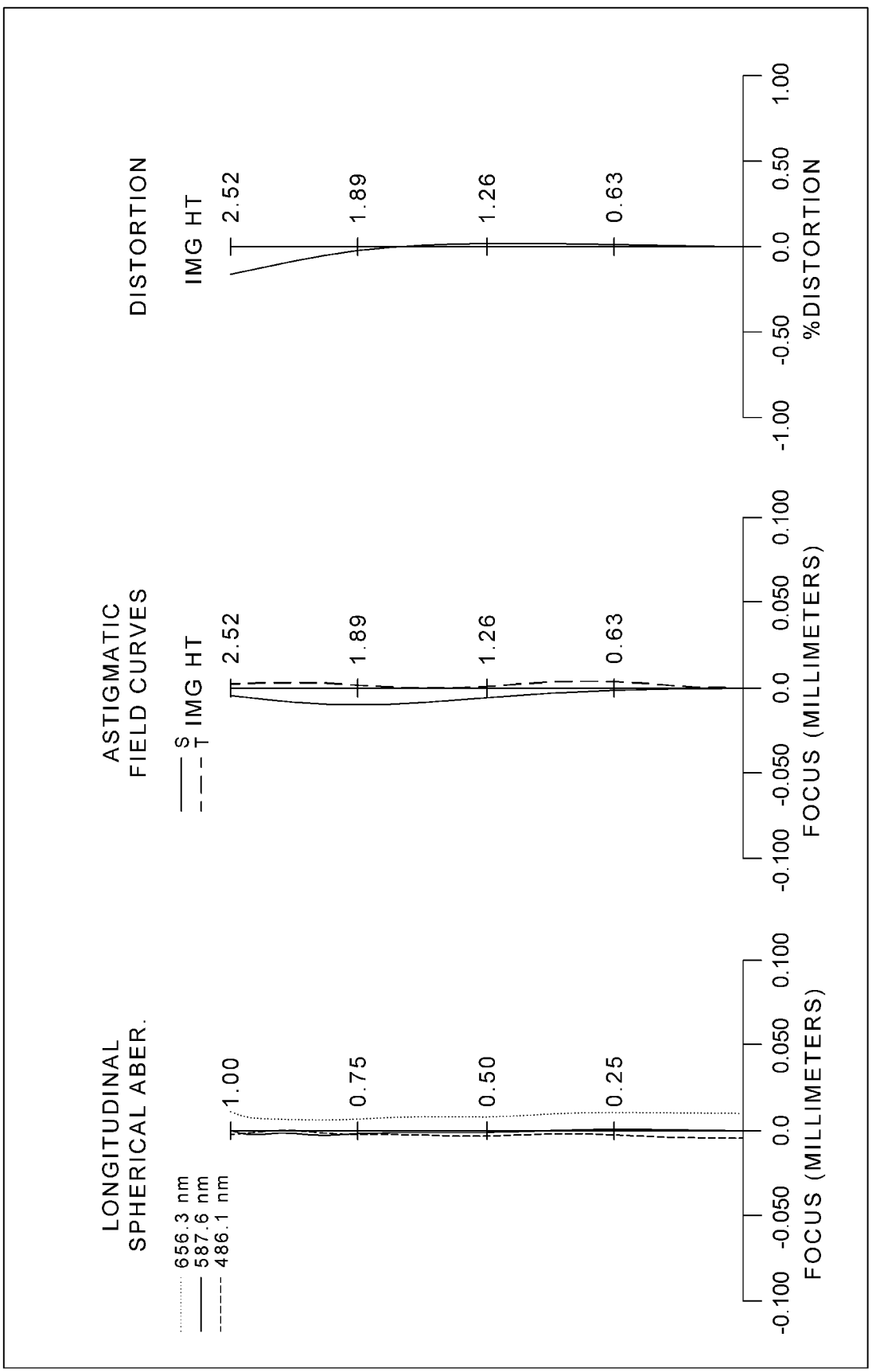
FIG. 5F shows longitudinal spherical aberration curves, astigmatic field curves and a distortion curve of the imaging apparatus in the second zoom state according to the 5th embodiment.

FIG. 5D is a schematic view of an imaging apparatus in a second zoom state according to the 5th embodiment of the present disclosure. FIG. 5E is a schematic view of an imaging apparatus with reflective surfaces in a second zoom state equivalent to the 5th embodiment of the present disclosure. FIG. 5F shows, in order from left to right, longitudinal spherical aberration curves, astigmatic field curves and a distortion curve of the imaging apparatus in a second zoom state according to the 5th embodiment. The imaging apparatus according to the 5th embodiment changes from the first zoom state into the second zoom state by changing the distance between the image-side surface 512 of the first optical element 510 and the stop 500 from 1.008 mm to 0.799 mm, and changing the distance between the filter 570 and the image surface 580 from 0.352 mm to 0.538 mm. The configuration of the rest optical elements of the 5th embodiment in the second zoom state is the same as that in the first zoom state. FIG. 5E is a schematic view of an imaging apparatus with reflective surfaces in a second zoom state equivalent to the 5th embodiment of the present disclosure. All the descriptions thereto are the same as the aforementioned zoom state and explanations in this regard will not be provided again.

The detailed optical data of the 5th embodiment are shown in TABLE 9, and the aspheric surface data are shown in TABLE 10.

TABLE 9

(5th Embodiment)
First zoom state: f = 10.47 mm, Fno = 2.40, HFOV = 13.5 deg.
Second zoom state: f = 10.46 mm, Fno = 2.45, HFOV = 13.3 deg.

| Surface # | | Curvature Radius | | Thickness (First zoom state) | Thickness (Second zoom state) | Material | Index | Abbe # | Focal Length |
|---|---|---|---|---|---|---|---|---|---|
| 0 | Object | Plano | | Infinity | 600.0 | | | | |
| 1 | Optical element 1* | −40.812 | ASP | 5.707 | | Plastic | 1.686 | 18.4 | 163.97 |
| 2 | | −31.652 | SPH | 1.008 | 0.799 | | | | |

TABLE 9-continued (5th Embodiment)
First zoom state: f = 10.47 mm, Fno = 2.40, HFOV = 13.5 deg.
Second zoom state: f = 10.46 mm, Fno = 2.45, HFOV = 13.3 deg.

| Surface # | | Curvature Radius | | Thickness (First zoom state) | Thickness (Second zoom state) | Material | Index | Abbe # | Focal Length |
|---|---|---|---|---|---|---|---|---|---|
| 3 | Ape. Stop | Plano | | −0.688 | | | | | |
| 4 | Optical element 2 | 3.563 | ASP | 2.342 | | Plastic | 1.544 | 56.0 | 5.48 |
| 5 | | −13.967 | ASP | 0.508 | | | | | |
| 6 | Optical element 3 | −51.510 | ASP | 0.310 | | Plastic | 1.607 | 26.6 | −5.49 |
| 7 | | 3.570 | ASP | 1.040 | | | | | |
| 8 | Optical element 4 | −3.638 | ASP | 0.733 | | Plastic | 1.634 | 23.8 | −17.13 |
| 9 | | −5.899 | ASP | 0.030 | | | | | |
| 10 | Optical element 5 | 2.591 | ASP | 0.799 | | Plastic | 1.559 | 40.4 | 11.15 |
| 11 | | 3.946 | ASP | 1.338 | | | | | |
| 12 | Prism | Plano | | 4.140 | | Glass | 1.954 | 32.3 | — |
| 13 | | Plano | | 1.375 | | | | | |
| 14 | Filter | Plano | | 0.210 | | Glass | 1.563 | 51.3 | — |
| 15 | | Plano | | 0.352 | 0.538 | | | | |
| 16 | Image Surface | Plano | | — | — | | | | |

Remark: Reference wavelength is d-line 587.6 nm.
*The effective radius of Surface 10 is 1.985 mm.
*Optical element 1 is a prism with refractive power.

TABLE 10

Aspheric Coefficient

| Surface # | 1 | 4 | 5 | 6 | 7 |
|---|---|---|---|---|---|
| k= | −5.3202E+01 | 0.0000E+00 | 0.0000E+00 | 0.0000E+00 | 0.0000E+00 |
| A4= | 6.8656E−05 | −1.4899E−03 | 9.3459E−04 | −5.5349E−03 | −7.7728E−03 |
| A6= | −6.0984E−06 | −2.2558E−04 | 5.8304E−04 | 1.0542E−02 | 9.8298E−03 |
| A8= | 1.3088E−06 | 3.5033E−05 | −1.7767E−03 | −1.3930E−02 | −1.5897E−02 |
| A10= | −5.8112E−08 | −4.6212E−05 | 1.2164E−03 | 1.2213E−02 | 1.5688E−02 |
| A12= | −3.3641E−08 | 1.6596E−05 | −5.2724E−04 | −6.6634E−03 | −9.4276E−03 |
| A14= | 7.8211E−09 | −3.8303E−06 | 1.4951E−04 | 2.3312E−03 | 3.7037E−03 |
| A16= | −7.6500E−10 | 4.9228E−07 | −2.6772E−05 | −5.1029E−04 | −9.3299E−04 |
| A18= | 3.6761E−11 | −3.3585E−08 | 2.7420E−06 | 6.3729E−05 | 1.3888E−04 |
| A20= | −7.1199E−13 | 8.8512E−10 | −1.2234E−07 | −3.4736E−06 | −9.6159E−06 |

| Surface # | 8 | 9 | 10 | 11 |
|---|---|---|---|---|
| k= | 0.0000E+00 | 0.0000E+00 | 0.0000E+00 | 0.0000E+00 |
| A4= | 7.8329E−02 | 3.8391E−02 | −6.3130E−02 | −4.8517E−02 |
| A6= | −4.6394E−02 | −1.7343E−02 | 1.1099E−02 | 1.3428E−02 |
| A8= | 2.2221E−02 | 5.4628E−03 | −4.2866E−03 | −8.1694E−03 |
| A10= | −6.2202E−03 | 3.3507E−03 | 4.5948E−03 | 5.1692E−03 |
| A12= | −8.2718E−04 | −4.5443E−03 | −3.6241E−03 | −2.5104E−03 |
| A14= | 1.7415E−03 | 2.3495E−03 | 1.6816E−03 | 8.3492E−04 |
| A16= | −7.7487E−04 | −6.3813E−04 | −4.4689E−04 | −1.7532E−04 |
| A18= | 1.6245E−04 | 8.7077E−05 | 6.3051E−05 | 2.0771E−05 |
| A20= | −1.4090E−05 | −4.6601E−06 | −3.6858E−06 | −1.0585E−06 |

In the 5th embodiment, the equation of the aspheric surface profiles of the aforementioned optical elements is the same as the equation of the 1st embodiment. Also, the definitions of these parameters shown in table below are the same as those stated in the 1st embodiment with corresponding values for the 5th embodiment, so an explanation in this regard will not be provided again.

Moreover, these parameters can be calculated from TABLE 9 and TABLE 10 and satisfy the conditions stated in table below.

| 5th Embodiment | | | |
|---|---|---|---|
| f [mm] | 10.47 | ΣCT/CT1 | 1.73 |
| Fno | 2.40 | Dr3r10/BL | 0.78 |
| HFOV [deg.] | 13.5 | |f/R1| + |f/R2| | 0.59 |
| Y2R1 | 2.28 | (f/R3) + (f/R6) | 5.87 |
| Y5R2 | 2.07 | (f/R9) + (f/R10) | 6.70 |
| V1/N1 | 10.90 | |f2/f1| | 0.03 |
| V2/N2 | 36.26 | |f2/f4| | 0.32 |
| V3/N3 | 16.57 | |f2/f5| | 0.49 |
| V4/N4 | 14.59 | |f3/f1| | 0.03 |
| V5/N5 | 25.95 | |f3/f2| | 1.00 |
| Tg1 (° C.) | 153.00 | |f3/f4| | 0.32 |
| Tg1/N1 | 90.74 | |f3/f5| | 0.49 |
| Y2R1/Y5R2 | 1.10 | f/f1 | 0.06 |
| CT2/CT3 | 7.55 | |f/f2| + |f/f3| | 3.82 |
| (CT2 + CT3)/(CT4 + CT5) | 1.73 | | |

6th Embodiment

Figure 6A:
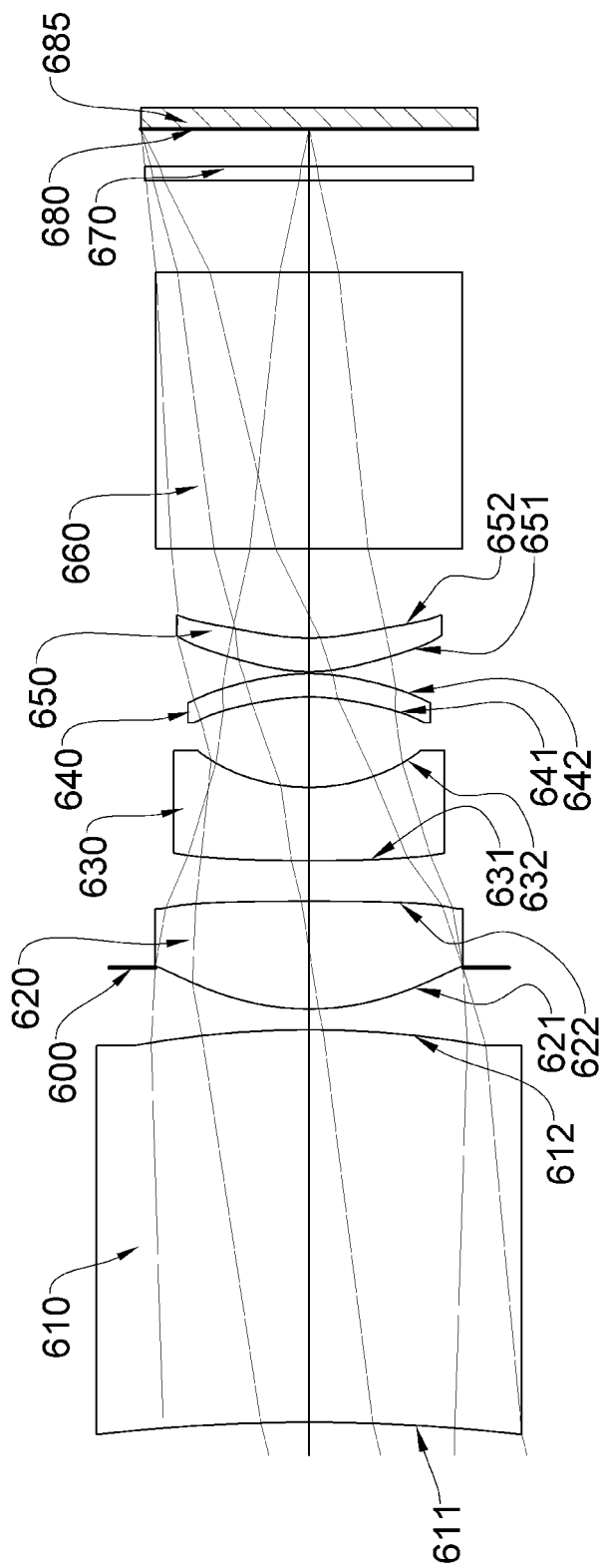
FIG. 6A is a schematic view of an imaging apparatus in a first zoom state according to the 6th embodiment of the present disclosure.
Figure 6B:
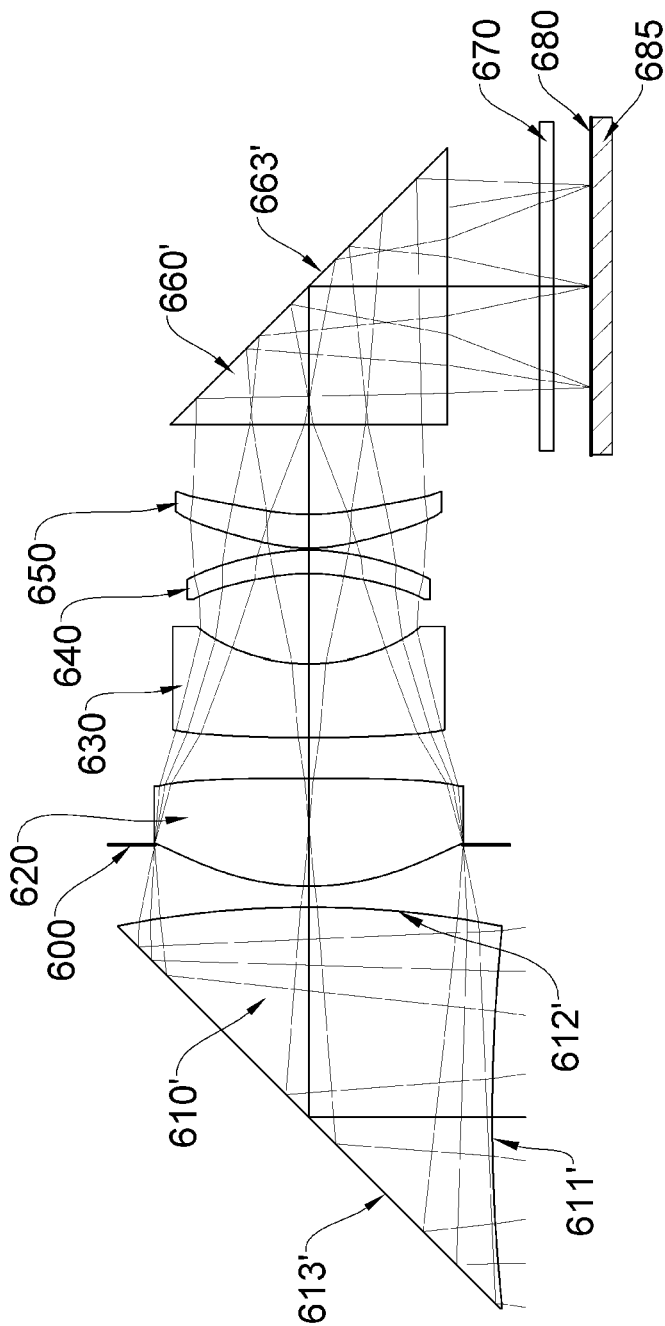
FIG. 6B is a schematic view of an imaging apparatus with reflective surfaces in a first zoom state equivalent to the 6th embodiment of the present disclosure.
Figure 6C:
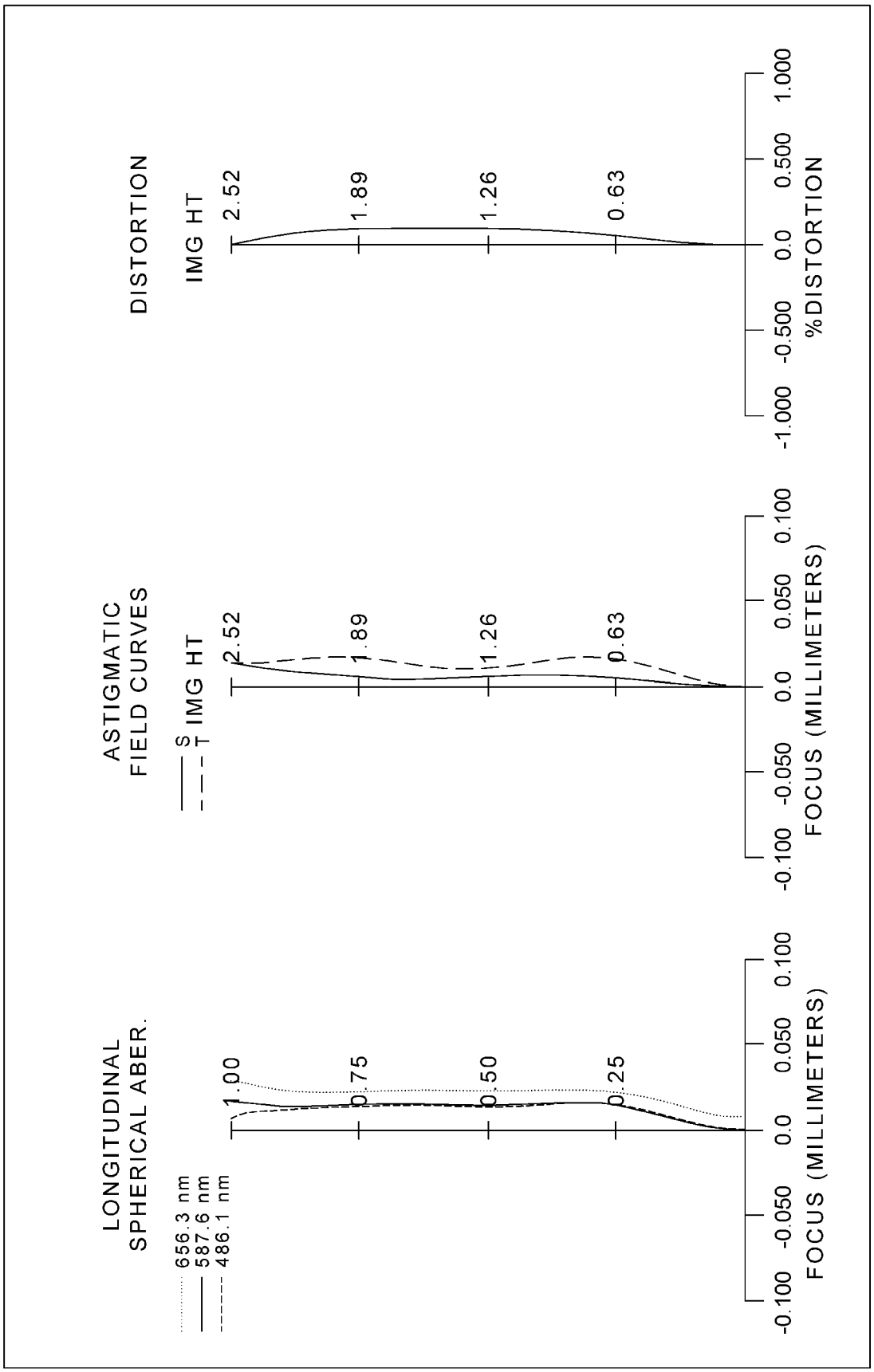
FIG. 6C shows longitudinal spherical aberration curves, astigmatic field curves and a distortion curve of the imaging apparatus in the first zoom state according to the 6th embodiment.

FIG. 6A is a schematic view of an imaging apparatus in a first zoom state according to the 6th embodiment of the present disclosure. FIG. 6B is a schematic view of an imaging apparatus with reflective surfaces in a first zoom state equivalent to the 6th embodiment of the present disclosure. FIG. 6C shows, in order from left to right, longitudinal spherical aberration curves, astigmatic field curves and a distortion curve of the imaging apparatus in a first zoom state according to the 6th embodiment.

In FIG. 6A, the imaging apparatus includes an imaging optical lens assembly (not otherwise herein labeled) of the present disclosure and an image sensor 685. The imaging optical lens assembly includes, in order from an object side to an image side along an optical path, a first optical element 610, an aperture stop 600, a second optical element 620, a third optical element 630, a fourth optical element 640, a fifth optical element 650, a prism 660, a filter 670, and an image surface 680. There is no additional optical element inserted between the first optical element 610 and the fifth optical element 650. There are air gaps between paraxial regions of the first optical element 610, the second optical element 620, the third optical element 630, the fourth optical element 640, and the fifth optical element 650.

The first optical element 610 with positive refractive power has an object-side surface 611 being concave in the paraxial region thereof, and an image-side surface 612 being convex in the paraxial region thereof. Both the object-side surface 611 and the image-side surface 612 are spherical. The first optical element 610 is made of plastic material.

The second optical element 620 with positive refractive power has an object-side surface 621 being convex in the paraxial region thereof, and an image-side surface 622 being convex in the paraxial region thereof. Both the object-side surface 621 and the image-side surface 622 are aspheric. The second optical element 620 is made of plastic material.

The third optical element 630 with negative refractive power has an object-side surface 631 being convex in the paraxial region thereof, and an image-side surface 632 being concave in the paraxial region thereof. Both the object-side surface 631 and the image-side surface 632 are aspheric. The third optical element 630 is made of plastic material.

The fourth optical element 640 with positive refractive power has an object-side surface 641 being concave in the paraxial region thereof, and an image-side surface 642 being convex in the paraxial region thereof. Both the object-side surface 641 and the image-side surface 642 are aspheric. The fourth optical element 640 is made of plastic material.

The fifth optical element 650 with positive refractive power has an object-side surface 651 being convex in the paraxial region thereof, and an image-side surface 652 being concave in the paraxial region thereof. Both the object-side surface 651 and the image-side surface 652 are aspheric. The fifth optical element 650 is made of plastic material.

The prism 660 is disposed between the fifth optical element 650 and the filter 670. The prism 660 is made of glass material. The filter 670 is disposed between the prism 660 and the image surface 680. The filter 670 is made of glass material and does not affect the focal length of the imaging optical lens assembly. The image sensor 685 is disposed on the image surface 680 of the imaging optical lens assembly.

FIG. 6B is a schematic view of an imaging apparatus with reflective surfaces in a first zoom state equivalent to the 6th embodiment of the present disclosure. In FIG. 6B, a first optical element 610' is a prism including a reflective surface 613' so as to fold the optical path by 90 degrees. An object-side surface 611' of the first optical element 610' corresponds to the object-side surface 611 of the first optical element 610 and an image-side surface 612' of the first optical element 610' corresponds to the image-side surface 612 of the first optical element 610 such that the overall optical properties of the first optical element 610' are equivalent to those of the first optical element 610 shown in FIG. 6A. A prism 660' includes a reflective surface 663' such that the overall optical properties of the prism 660' are equivalent to those of the prism 660 shown in FIG. 6A. According to the aforementioned configuration, an imaging apparatus equivalent to the 6th embodiment with the optical path being folded can be obtained.

Figure 6D:
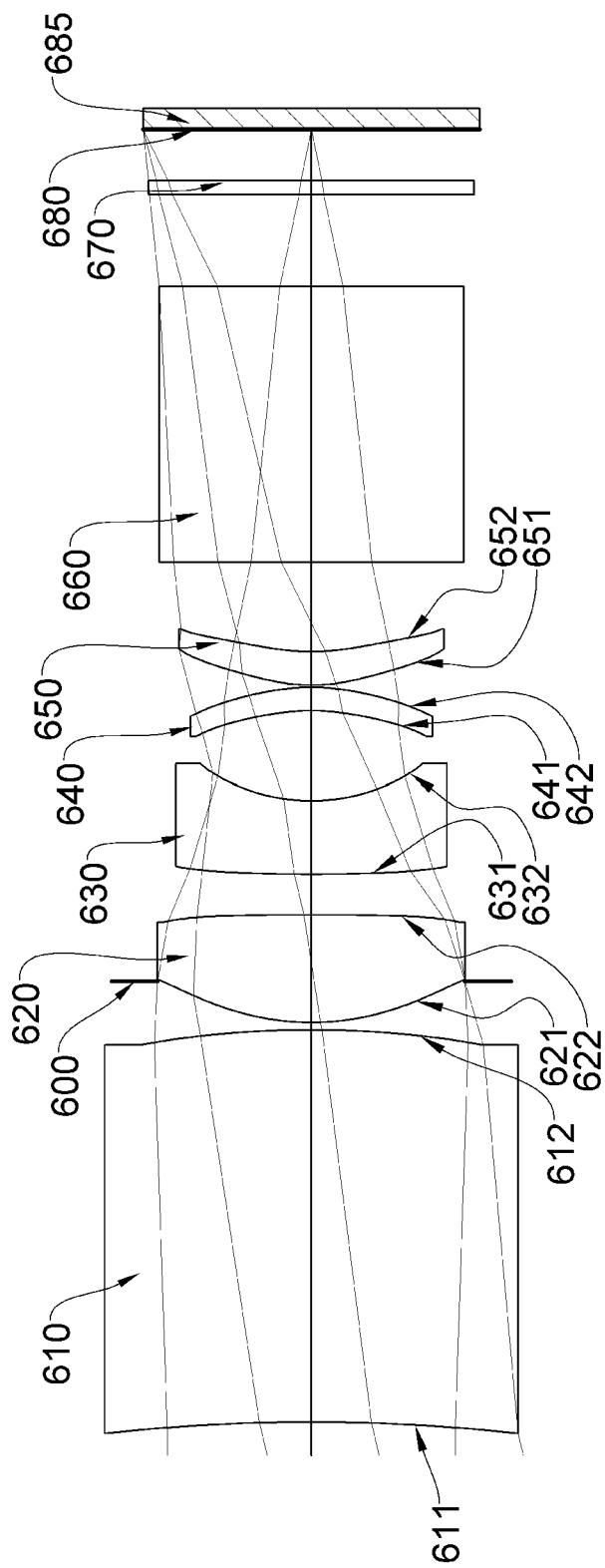
FIG. 6D is a schematic view of an imaging apparatus in a second zoom state according to the 6th embodiment of the present disclosure.
Figure 6E:
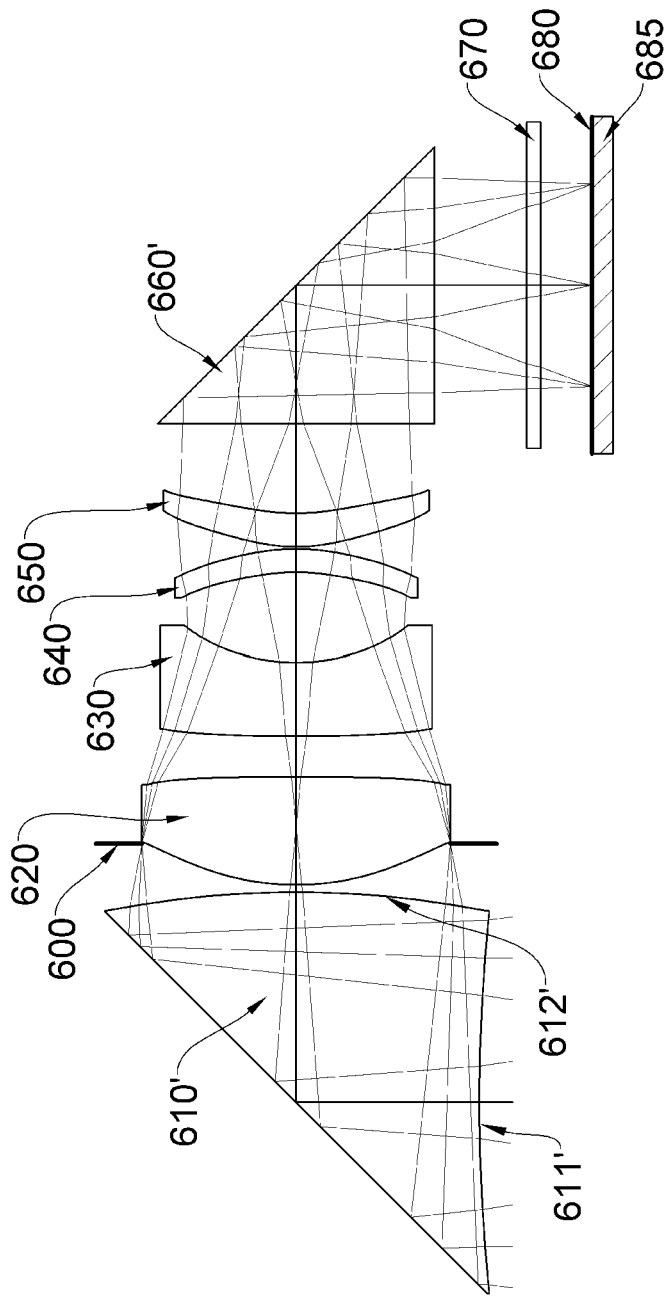
FIG. 6E is a schematic view of an imaging apparatus with reflective surfaces in a second zoom state equivalent to the 6th embodiment of the present disclosure.
Figure 6F:
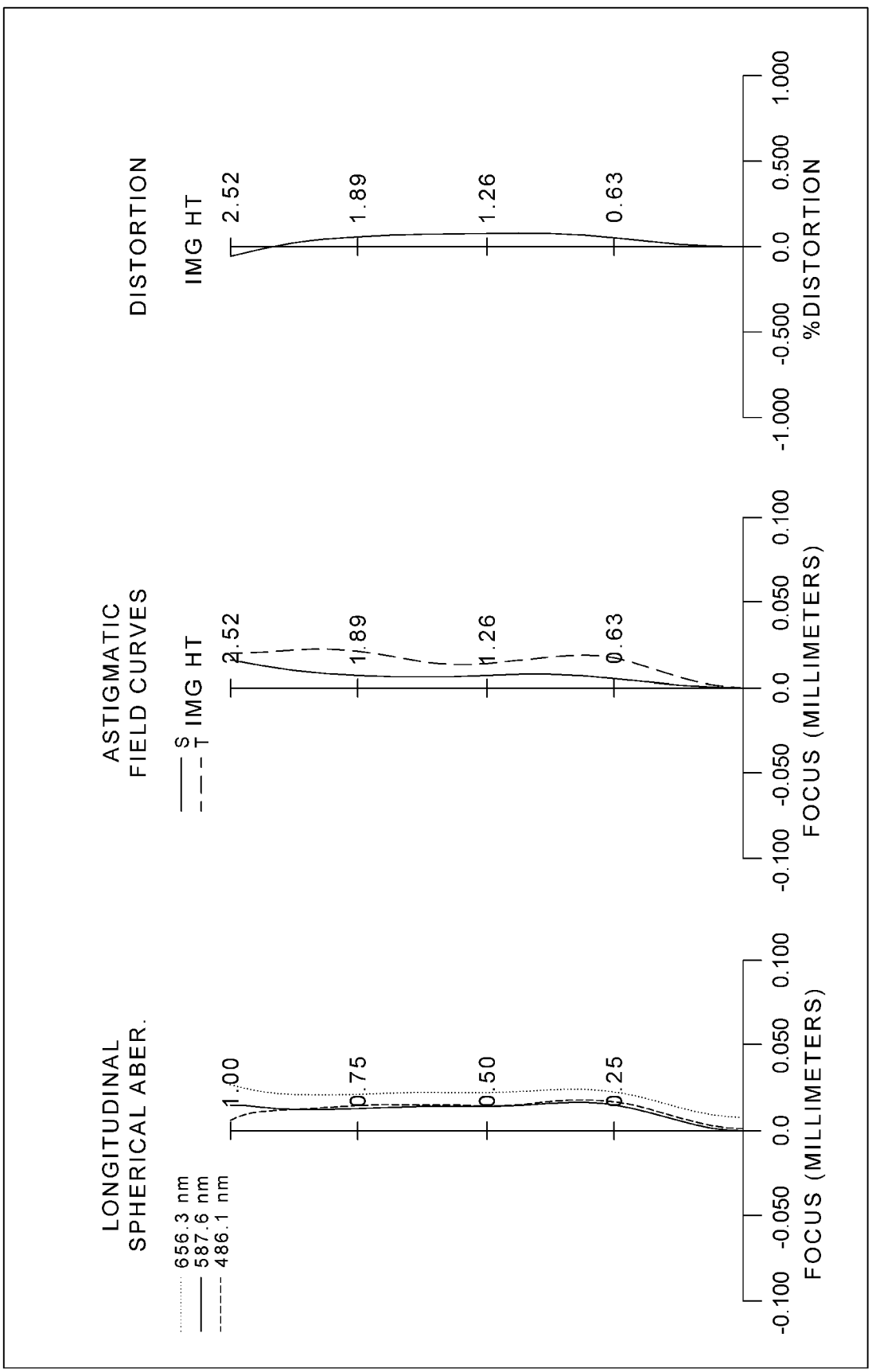
FIG. 6F shows longitudinal spherical aberration curves, astigmatic field curves and a distortion curve of the imaging apparatus in the second zoom state according to the 6th embodiment.

FIG. 6D is a schematic view of an imaging apparatus in a second zoom state according to the 6th embodiment of the present disclosure. FIG. 6E is a schematic view of an imaging apparatus with reflective surfaces in a second zoom state equivalent to the 6th embodiment of the present disclosure. FIG. 6F shows, in order from left to right, longitudinal spherical aberration curves, astigmatic field curves and a distortion curve of the imaging apparatus in a second zoom state according to the 6th embodiment. The imaging apparatus according to the 6th embodiment changes from the first zoom state into the second zoom state by changing the distance between the image-side surface 612 of the first optical element 610 and the stop 600 from 0.927 mm to 0.725 mm, and changing the distance between the filter 670 and the image surface 680 from 0.563 mm to 0.765 mm. As such, an axial distance between the image-side surface 612 of the first optical element 610 and the image surface 680 along the optical path remains the same while performing focusing. The configuration of the rest optical elements of the 6th embodiment in the second zoom state is the same as that in the first zoom state. FIG. 6E is a schematic view of an imaging apparatus with reflective surfaces in a second zoom state equivalent to the 6th embodiment of the present disclosure. All the descriptions thereto are the same as the aforementioned zoom state and explanations in this regard will not be provided again.

The detailed optical data of the 6th embodiment are shown in TABLE 11, and the aspheric surface data are shown in TABLE 12.

TABLE 11

(6th Embodiment)
First zoom state: f = 10.48 mm, Fno = 2.40, HFOV = 13.5 deg.
Second zoom state: f = 10.45 mm, Fno = 2.45, HFOV = 13.3 deg.

| Surface # | | Curvature Radius | | Thickness (First zoom state) | Thickness (Second zoom state) | Material | Index | Abbe # | Focal Length |
|---|---|---|---|---|---|---|---|---|---|
| 0 | Object | Plano | | Infinity | 600.0 | | | | |
| 1 | Optical element 1* | −27.619 | SPH | 5.879 | | Plastic | 1.669 | 19.4 | 38.96 |

TABLE 11-continued (6th Embodiment)
First zoom state: f = 10.48 mm, Fno = 2.40, HFOV = 13.5 deg.
Second zoom state: f = 10.45 mm, Fno = 2.45, HFOV = 13.3 deg.

| Surface # | | Curvature Radius | | Thickness (First zoom state) | Thickness (Second zoom state) | Material | Index | Abbe # | Focal Length |
|---|---|---|---|---|---|---|---|---|---|
| 2 | | −14.554 | SPH | 0.927 | 0.725 | | | | |
| 3 | Ape. Stop | Plano | | −0.617 | | | | | |
| 4 | Optical element 2 | 3.863 | ASP | 1.612 | | Plastic | 1.545 | 56.0 | 6.80 |
| 5 | | −75.676 | ASP | 0.608 | | | | | |
| 6 | Optical element 3 | 25.323 | ASP | 1.100 | | Plastic | 1.660 | 20.4 | −4.93 |
| 7 | | 2.831 | ASP | 1.344 | | | | | |
| 8 | Optical element 4 | −2.908 | ASP | 0.350 | | Plastic | 1.669 | 19.4 | 219.76 |
| 9 | | −2.990 | ASP | 0.030 | | | | | |
| 10 | Optical element 5 | 2.378 | ASP | 0.503 | | Plastic | 1.534 | 55.9 | 15.33 |
| 11 | | 3.105 | ASP | 1.338 | | | | | |
| 12 | Prism | Plano | | 4.140 | | Glass | 1.954 | 32.3 | — |
| 13 | | Plano | | 1.375 | | | | | |
| 14 | Filter | Plano | | 0.210 | | Glass | 1.563 | 51.3 | — |
| 15 | | Plano | | 0.563 | 0.765 | | | | |
| 16 | Image Surface | Plano | | — | — | | | | |

Remark: Reference wavelength is d-line 587.6 nm.
*The effective radius of Surface 10 is 1.985 mm.
*Optical element 1 is a prism with refractive power.

TABLE 12

Aspheric Coefficient

| Surface # | 4 | 5 | 6 | 7 |
|---|---|---|---|---|
| k= | 0.0000E+00 | 0.0000E+00 | 0.0000E+00 | 0.0000E+00 |
| A4= | −1.5176E−03 | −1.3799E−03 | −1.9265E−03 | −4.9813E−03 |
| A6= | −8.0711E−05 | 3.0004E−04 | 2.1969E−03 | 2.2644E−03 |
| A8= | −9.9860E−05 | −3.3927E−04 | −8.3130E−04 | 3.9240E−04 |
| A10= | 2.0118E−05 | 9.6236E−05 | 2.7321E−04 | −8.4994E−04 |
| A12= | −4.4475E−06 | −1.9892E−05 | −6.1741E−05 | 5.3882E−04 |
| A14= | 3.5118E−07 | 2.3741E−06 | 8.8202E−06 | −1.6051E−04 |
| A16= | −1.3616E−08 | −1.1982E−07 | −5.4325E−07 | 2.0207E−05 |

| Surface # | 8 | 9 | 10 | 11 |
|---|---|---|---|---|
| k= | 0.0000E+00 | 0.0000E+00 | 0.0000E+00 | 0.0000E+00 |
| A4= | 8.8332E−02 | 5.5198E−02 | −7.6094E−02 | −6.2248E−02 |
| A6= | −7.6269E−02 | −4.0064E−02 | 3.3482E−02 | 2.9448E−02 |
| A8= | 5.4491E−02 | 2.6210E−02 | −1.6185E−02 | −1.6088E−02 |
| A10= | −2.8826E−02 | −1.2808E−02 | 5.7992E−03 | 6.8450E−03 |
| A12= | 9.8841E−03 | 4.0520E−03 | −1.4176E−03 | −1.9414E−03 |
| A14= | −1.9543E−03 | −7.3353E−04 | 2.2873E−04 | 3.1780E−04 |
| A16= | 1.6860E−04 | 5.7844E−05 | −2.2569E−05 | −1.3352E−05 |
| A18= | | | 1.0791E−06 | −4.0422E−06 |
| A20= | | | | 5.1083E−07 |

In the 6th embodiment, the equation of the aspheric surface profiles of the aforementioned optical elements is the same as the equation of the 1st embodiment. Also, the definitions of these parameters shown in table below are the same as those stated in the 1st embodiment with corresponding values for the 6th embodiment, so an explanation in this regard will not be provided again.

Moreover, these parameters can be calculated from TABLE 11 and TABLE 12 and satisfy the conditions stated in table below.

| 6th Embodiment | | | |
|---|---|---|---|
| f [mm] | 10.48 | ΣCT/CT1 | 1.61 |
| Fno | 2.40 | Dr3r10/BL | 0.73 |
| HFOV [deg.] | 13.5 | |f/R1| + |f/R2| | 1.10 |
| Y2R1 | 2.31 | (f/R3) + (f/R6) | 6.42 |
| Y5R2 | 1.95 | (f/R9) + (f/R10) | 7.79 |
| V1/N1 | 11.65 | |f2/f1| | 0.17 |
| V2/N2 | 36.24 | |f2/f4| | 0.03 |
| V3/N3 | 12.29 | |f2/f5| | 0.44 |
| V4/N4 | 11.65 | |f3/f1| | 0.13 |
| V5/N5 | 36.46 | |f3/f2| | 0.72 |
| Tg1 (° C.) | 142.00 | |f3/f4| | 0.02 |
| Tg1/N1 | 85.08 | |f3/f5| | 0.32 |
| Y2R1/Y5R2 | 1.18 | f/f1 | 0.27 |
| CT2/CT3 | 1.47 | |f/f2| + |f/f3| | 3.67 |
| (CT2 + CT3)/(CT4 + CT5) | 3.18 | | |

7th Embodiment

Figure 7A:
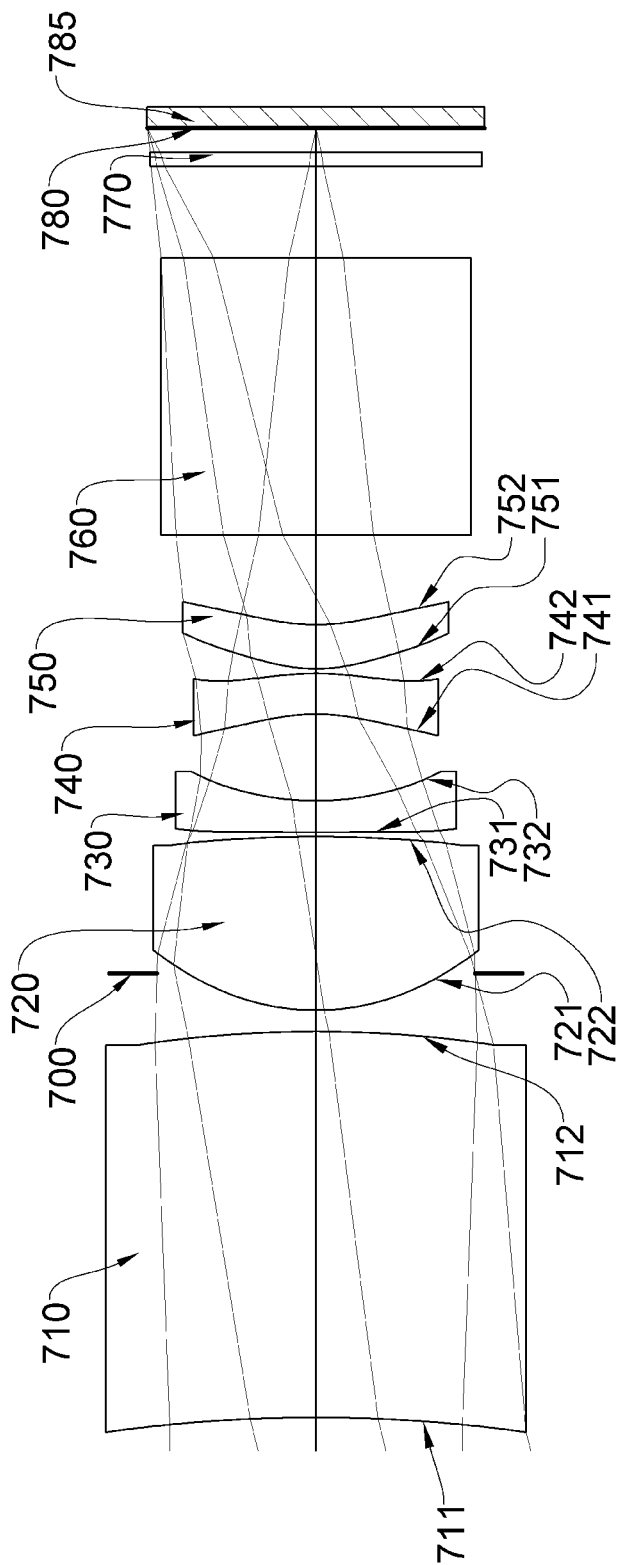
FIG. 7A is a schematic view of an imaging apparatus in a first zoom state according to the 7th embodiment of the present disclosure.
Figure 7B:
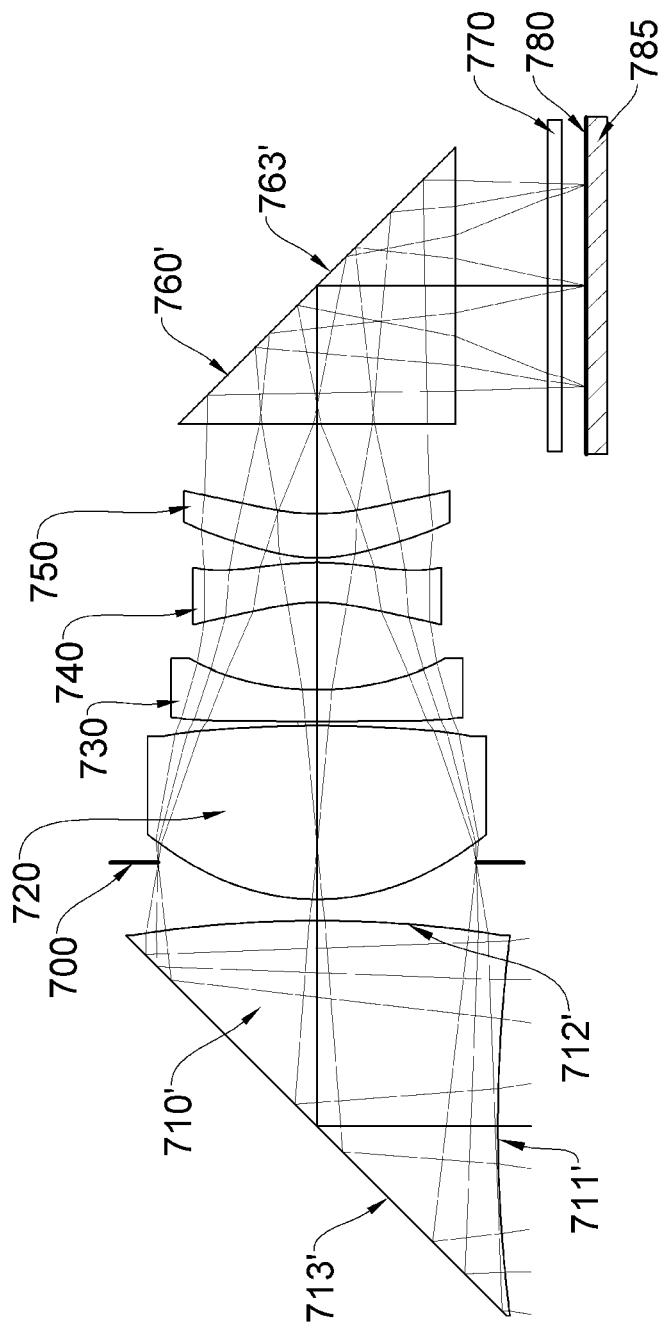
FIG. 7B is a schematic view of an imaging apparatus with reflective surfaces in a first zoom state equivalent to the 7th embodiment of the present disclosure.
Figure 7C:
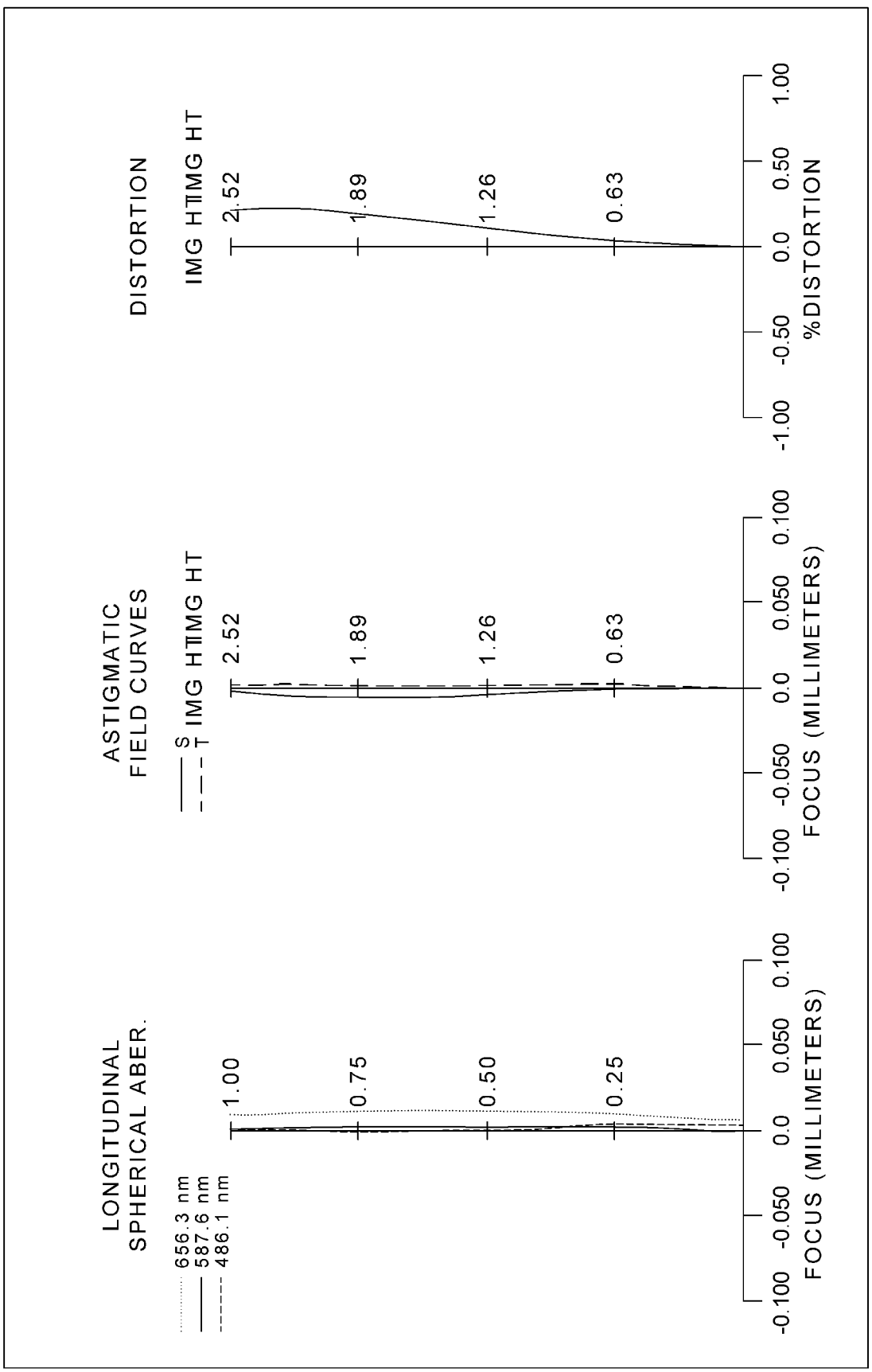
FIG. 7C shows longitudinal spherical aberration curves, astigmatic field curves and a distortion curve of the imaging apparatus in the first zoom state according to the 7th embodiment.

FIG. 7A is a schematic view of an imaging apparatus in a first zoom state according to the 7th embodiment of the present disclosure. FIG. 7B is a schematic view of an imaging apparatus with reflective surfaces in a first zoom state equivalent to the 7th embodiment of the present disclosure. FIG. 7C shows, in order from left to right, longitudinal spherical aberration curves, astigmatic field curves and a distortion curve of the imaging apparatus in a first zoom state according to the 7th embodiment.

In FIG. 7A, the imaging apparatus includes an imaging optical lens assembly (not otherwise herein labeled) of the present disclosure and an image sensor 785. The imaging optical lens assembly includes, in order from an object side to an image side along an optical path, a first optical element 710, an aperture stop 700, a second optical element 720, a third optical element 730, a fourth optical element 740, a fifth optical element 750, a prism 760, a filter 770, and an image surface 780. There is no additional optical element inserted between the first optical element 710 and the fifth optical element 750. There are air gaps between paraxial regions of the first optical element 710, the second optical element 720, the third optical element 730, the fourth optical element 740, and the fifth optical element 750.

The first optical element 710 with positive refractive power has an object-side surface 711 being concave in the paraxial region thereof, and an image-side surface 712 being convex in the paraxial region thereof. Both the object-side surface 711 and the image-side surface 712 are aspheric. The first optical element 710 is made of plastic material.

The second optical element 720 with positive refractive power has an object-side surface 721 being convex in the paraxial region thereof, and an image-side surface 722 being convex in the paraxial region thereof. Both the object-side surface 721 and the image-side surface 722 are aspheric. The second optical element 720 is made of plastic material.

The third optical element 730 with negative refractive power has an object-side surface 731 being convex in the paraxial region thereof, and an image-side surface 732 being concave in the paraxial region thereof. Both the object-side surface 731 and the image-side surface 732 are aspheric. The third optical element 730 is made of plastic material.

The fourth optical element 740 with negative refractive power has an object-side surface 741 being concave in the paraxial region thereof, and an image-side surface 742 being convex in the paraxial region thereof. Both the object-side surface 741 and the image-side surface 742 are aspheric. The fourth optical element 740 is made of plastic material.

The fifth optical element 750 with positive refractive power has an object-side surface 751 being convex in the paraxial region thereof, and an image-side surface 752 being concave in the paraxial region thereof. Both the object-side surface 751 and the image-side surface 752 are aspheric. The fifth optical element 750 is made of plastic material.

The prism 760 is disposed between the fifth optical element 750 and the filter 770. The prism 760 is made of glass material. The filter 770 is disposed between the prism 760 and the image surface 780. The filter 770 is made of glass material and does not affect the focal length of the imaging optical lens assembly. The image sensor 785 is disposed on the image surface 780 of the imaging optical lens assembly.

FIG. 7B is a schematic view of an imaging apparatus with reflective surfaces in a first zoom state equivalent to the 7th embodiment of the present disclosure. In FIG. 7B, a first optical element 710' is a prism including a reflective surface 713' so as to fold the optical path by 90 degrees. An object-side surface 711' of the first optical element 710' corresponds to the object-side surface 711 of the first optical element 710 and an image-side surface 712' of the first optical element 710' corresponds to the image-side surface 712 of the first optical element 710 such that the overall optical properties of the first optical element 710' are equivalent to those of the first optical element 710 shown in FIG. 7A. A prism 760' includes a reflective surface 763' such that the overall optical properties of the prism 760' are equivalent to those of the prism 760 shown in FIG. 7A. According to the aforementioned configuration, an imaging apparatus equivalent to the 7th embodiment with the optical path being folded can be obtained.

Figure 7D:
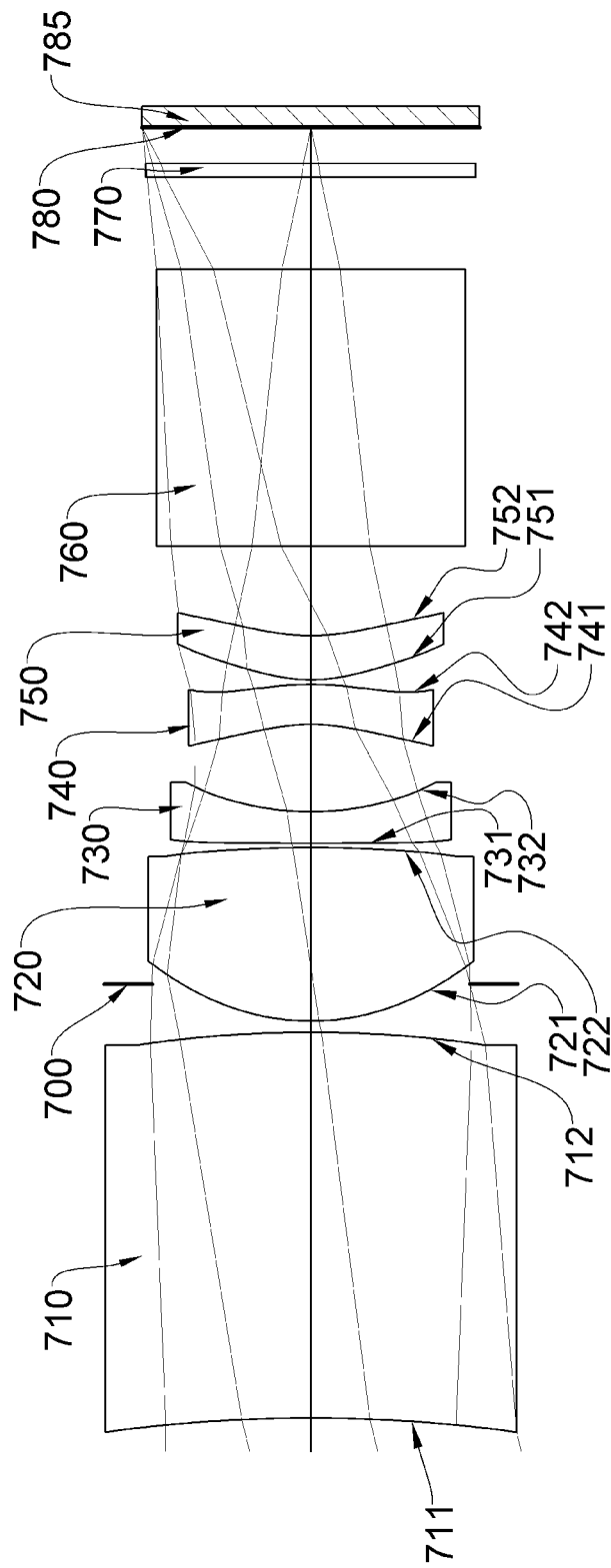
FIG. 7D is a schematic view of an imaging apparatus in a second zoom state according to the 7th embodiment of the present disclosure.
Figure 7E:
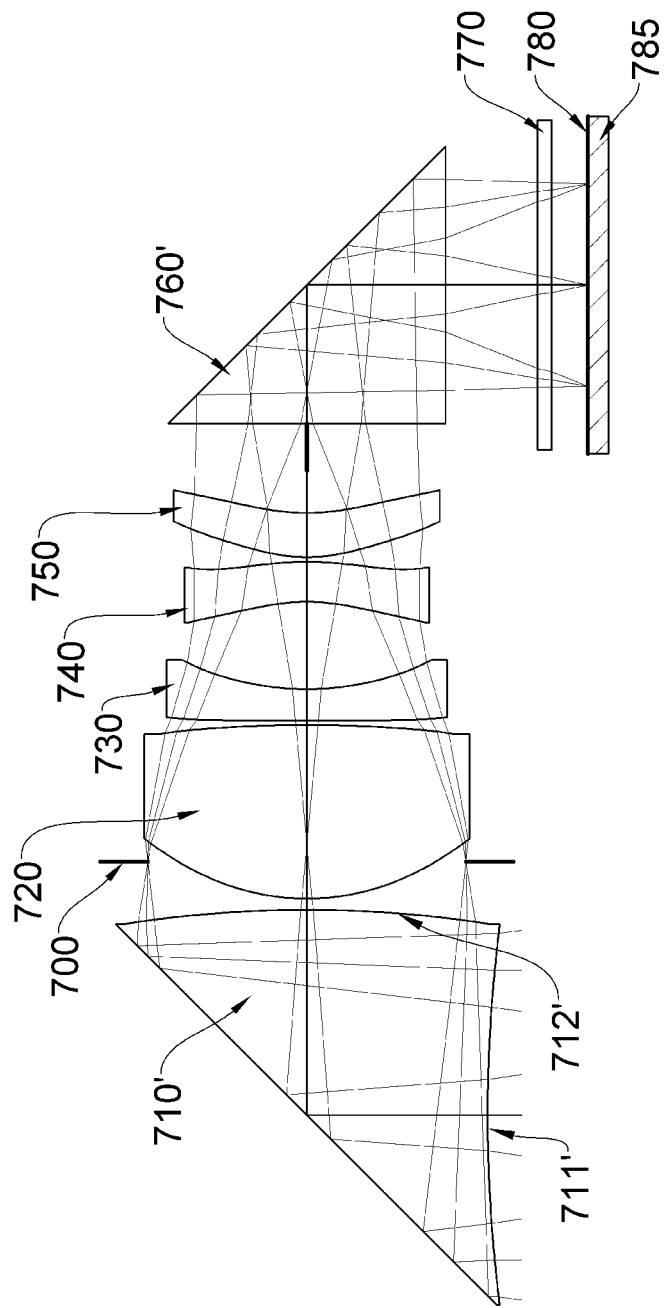
FIG. 7E is a schematic view of an imaging apparatus with reflective surfaces in a second zoom state equivalent to the 7th embodiment of the present disclosure.
Figure 7F:
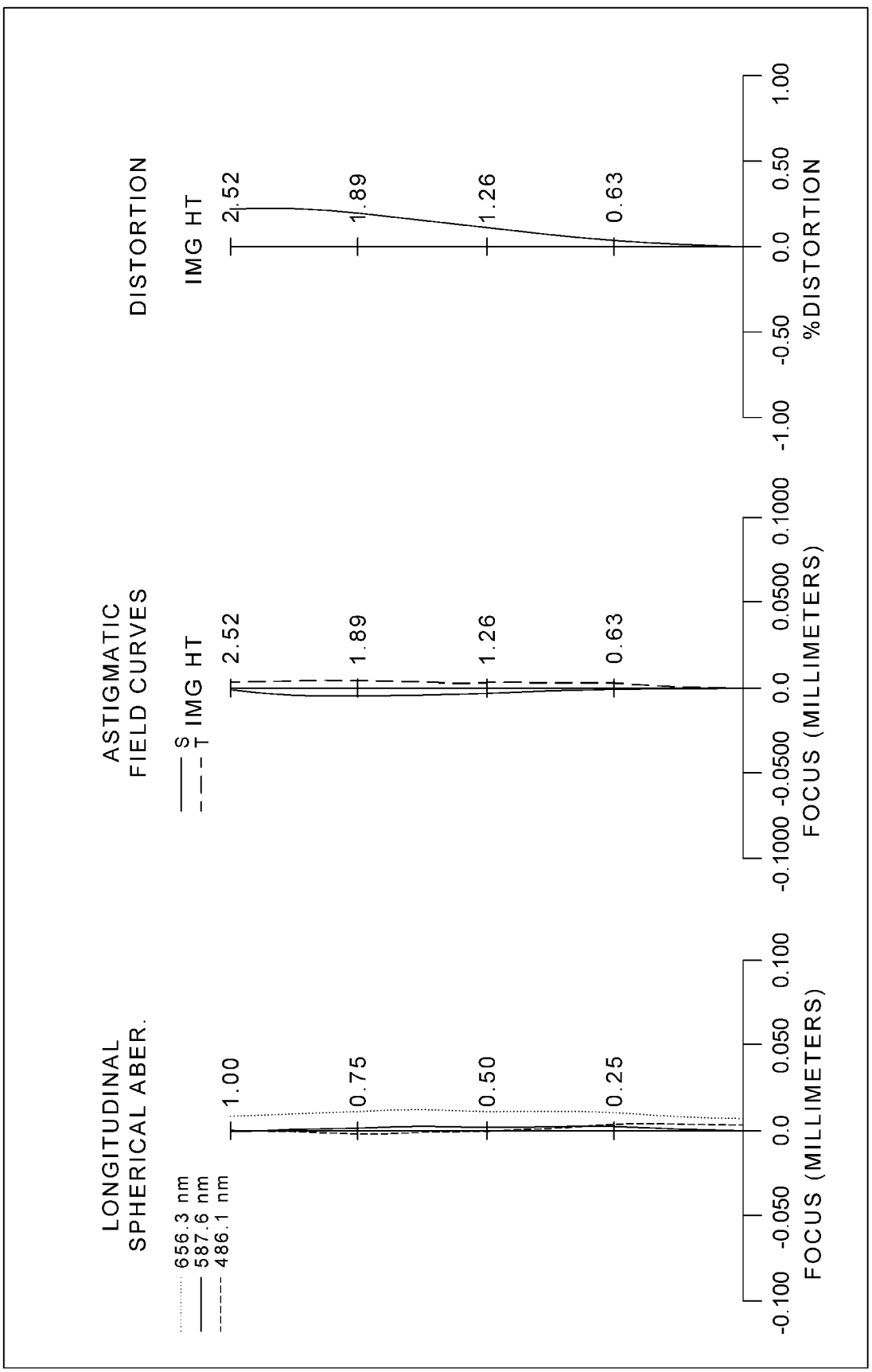
FIG. 7F shows longitudinal spherical aberration curves, astigmatic field curves and a distortion curve of the imaging apparatus in the second zoom state according to the 7th embodiment.

FIG. 7D is a schematic view of an imaging apparatus in a second zoom state according to the 7th embodiment of the present disclosure. FIG. 7E is a schematic view of an imaging apparatus with reflective surfaces in a second zoom state equivalent to the 7th embodiment of the present disclosure. FIG. 7F shows, in order from left to right, longitudinal spherical aberration curves, astigmatic field curves and a distortion curve of the imaging apparatus in a second zoom state according to the 7th embodiment. The imaging apparatus according to the 7th embodiment changes from the first zoom state into the second zoom state by changing the distance between the image-side surface 712 of the first optical element 710 and the stop 700 from 0.872 mm to 0.722 mm, and changing the distance between the filter 770 and the image surface 780 from 0.362 mm to 0.539 mm. The configuration of the rest optical elements of the 7th embodiment in the second zoom state is the same as that in the first zoom state. FIG. 7E is a schematic view of an imaging apparatus with reflective surfaces in a second zoom state equivalent to the 7th embodiment of the present disclosure. All the descriptions thereto are the same as the aforementioned zoom state and explanations in this regard will not be provided again.

The detailed optical data of the 7th embodiment are shown in TABLE 13, and the aspheric surface data are shown in TABLE 14.

TABLE 13

(7th Embodiment)
First zoom state: f = 10.27 mm, Fno = 2.35, HFOV = 13.8 deg.
Second zoom state: f = 10.25 mm, Fno = 2.40, HFOV = 13.5 deg.

| Surface # | | Curvature Radius | | Thickness (First zoom state) | Thickness (Second zoom state) | Material | Index | Abbe # | Focal Length |
|---|---|---|---|---|---|---|---|---|---|
| 0 | Object | Plano | | Infinity | 600.0 | | | | |
| 1 | Optical element 1* | −22.323 | ASP | 5.768 | | Plastic | 1.669 | 19.5 | 98.47 |

TABLE 13-continued (7th Embodiment)
First zoom state: f = 10.27 mm, Fno = 2.35, HFOV = 13.8 deg.
Second zoom state: f = 10.25 mm, Fno = 2.40, HFOV = 13.5 deg.

| Surface # | | Curvature Radius | | Thickness (First zoom state) | Thickness (Second zoom state) | Material | Index | Abbe # | Focal Length |
|---|---|---|---|---|---|---|---|---|---|
| 2 | | −18.400 | ASP | 0.872 | 0.722 | | | | |
| 3 | Ape. Stop | Plano | | −0.552 | | | | | |
| 4 | Optical element 2 | 3.522 | ASP | 2.594 | | Plastic | 1.544 | 56.0 | 5.64 |
| 5 | | −17.649 | ASP | 0.064 | | | | | |
| 6 | Optical element 3 | 69.275 | ASP | 0.471 | | Plastic | 1.607 | 26.6 | −7.01 |
| 7 | | 4.002 | ASP | 1.297 | | | | | |
| 8 | Optical element 4 | −2.696 | ASP | 0.597 | | Plastic | 1.634 | 23.8 | −12.10 |
| 9 | | −4.512 | ASP | 0.070 | | | | | |
| 10 | Optical element 5 | 2.265 | ASP | 0.660 | | Plastic | 1.544 | 56.0 | 13.13 |
| 11 | | 2.976 | ASP | 1.338 | | | | | |
| 12 | Prism | Plano | | 4.140 | | Glass | 1.954 | 32.3 | — |
| 13 | | Plano | | 1.375 | | | | | |
| 14 | Filter | Plano | | 0.210 | | Glass | 1.563 | 51.3 | — |
| 15 | | Plano | | 0.362 | 0.539 | | | | |
| 16 | Image Surface | Plano | | — | — | | | | |

Remark: Reference wavelength is d-line 587.6 nm.
*The effective radius of Surface 10 is 1.985 mm.
*Optical element 1 is a prism with refractive power.

TABLE 14

Aspheric Coefficient

| Surface # | 1 | 2 | 4 | 5 | 6 |
|---|---|---|---|---|---|
| k= | −1.0796E+01 | 4.6471E+00 | 0.0000E+00 | 0.0000E+00 | 0.0000E+00 |
| A4= | −2.7691E−05 | −1.6816E−06 | −8.3341E−04 | 3.7414E−03 | −2.7320E−03 |
| A6= | −1.9171E−06 | −2.7334E−05 | −1.2576E−04 | −4.2339E−03 | −3.2338E−03 |
| A8= | −3.9233E−06 | 7.7089E−06 | 2.0392E−05 | 3.4660E−03 | 4.4016E−03 |
| A10= | 1.5644E−06 | −9.8518E−07 | −1.9881E−05 | −1.6168E−03 | −2.0177E−03 |
| A12= | −3.4556E−07 | 6.4373E−08 | 8.1305E−06 | 4.4493E−04 | 4.8825E−04 |
| A14= | 4.6177E−08 | −2.2778E−08 | −2.2339E−06 | −7.5090E−05 | −5.3143E−05 |
| A16= | −3.7099E−09 | 6.1223E−09 | 3.4910E−07 | 7.3745E−06 | −1.8456E−06 |
| A18= | 1.6518E−10 | −6.4177E−10 | −2.9766E−08 | −3.5278E−07 | 1.0353E−06 |
| A20= | −3.1334E−12 | 2.3801E−11 | 1.0474E−09 | 4.3499E−09 | −7.3054E−08 |

| Surface # | 7 | 8 | 9 | 10 | 11 |
|---|---|---|---|---|---|
| k= | 0.0000E+00 | 0.0000E+00 | 0.0000E+00 | 0.0000E+00 | 0.0000E+00 |
| A4= | −6.9449E−03 | 8.7164E−02 | 3.6907E−02 | −7.5103E−02 | −4.8570E−02 |
| A6= | −9.3583E−04 | −6.1603E−02 | −1.5397E−02 | 2.6517E−02 | 1.3184E−02 |
| A8= | 2.2921E−03 | 4.8073E−02 | 1.2684E−02 | −1.1244E−02 | −5.4761E−03 |
| A10= | −9.1033E−04 | −2.9477E−02 | −6.5369E−03 | 4.0864E−03 | 2.4402E−03 |
| A12= | 1.2688E−04 | 1.3364E−02 | 2.1055E−03 | −1.3007E−03 | −9.6657E−04 |
| A14= | 5.5836E−05 | −4.1911E−03 | −3.0772E−04 | 3.5651E−04 | 2.9989E−04 |
| A16= | −3.0077E−05 | 8.4140E−04 | −2.4914E−05 | −7.6477E−05 | −6.3128E−05 |
| A18= | 5.5159E−06 | −9.6478E−05 | 1.3831E−05 | 1.0219E−05 | 7.6847E−06 |
| A20= | −4.0246E−07 | 4.7232E−06 | −1.2526E−06 | −6.1233E−07 | −4.0193E−07 |

In the 7th embodiment, the equation of the aspheric surface profiles of the aforementioned optical elements is the same as the equation of the 1st embodiment. Also, the definitions of these parameters shown in table below are the same as those stated in the 1st embodiment with corresponding values for the 7th embodiment, so an explanation in this regard will not be provided again.

Moreover, these parameters can be calculated from TABLE 13 and TABLE 14 and satisfy the conditions stated in table below.

| 7th Embodiment | | | |
|---|---|---|---|
| f [mm] | 10.27 | ΣCT/CT1 | 1.75 |
| Fno | 2.35 | Dr3r10/BL | 0.77 |

-continued

| 7th Embodiment | | | |
|---|---|---|---|
| HFOV [deg.] | 13.8 | |f/R1| + |f/R2| | 1.02 |
| Y2R1 | 2.43 | (f/R3) + (f/R6) | 5.48 |
| Y5R2 | 1.98 | (f/R9) + (f/R10) | 7.98 |
| V1/N1 | 11.65 | |f2/f1| | 0.06 |
| V2/N2 | 36.26 | |f2/f4| | 0.47 |
| V3/N3 | 16.57 | |f2/f5| | 0.43 |
| V4/N4 | 14.59 | |f3/f1| | 0.07 |
| V5/N5 | 36.26 | |f3/f2| | 1.24 |
| Tg1 (° C.) | 142.00 | |f3/f4| | 0.58 |
| Tg1/N1 | 85.08 | |f3/f5| | 0.53 |
| Y2R1/Y5R2 | 1.23 | f/f1 | 0.10 |
| CT2/CT3 | 5.51 | |f/f2| + |f/f3| | 3.28 |
| (CT2 + CT3)/(CT4 + CT5) | 2.44 | | |

8th Embodiment

Figure 8A:
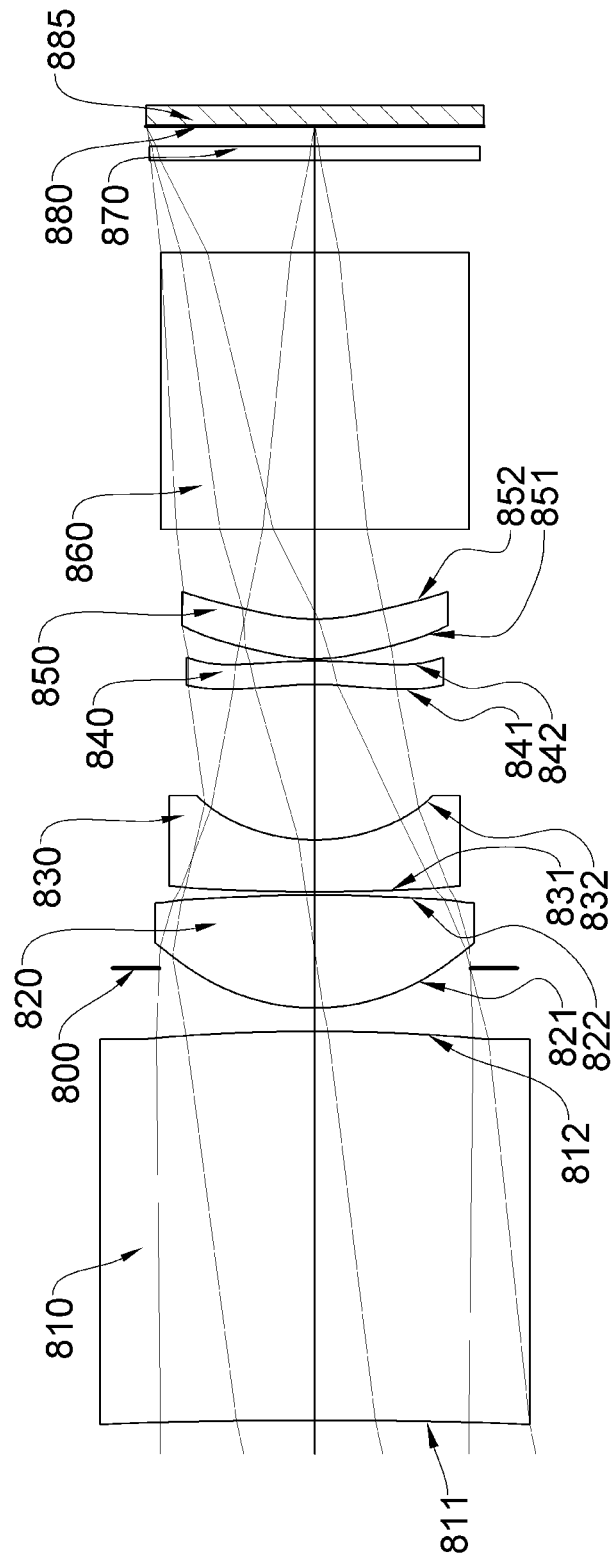
FIG. 8A is a schematic view of an imaging apparatus in a first zoom state according to the 8th embodiment of the present disclosure.
Figure 8B:
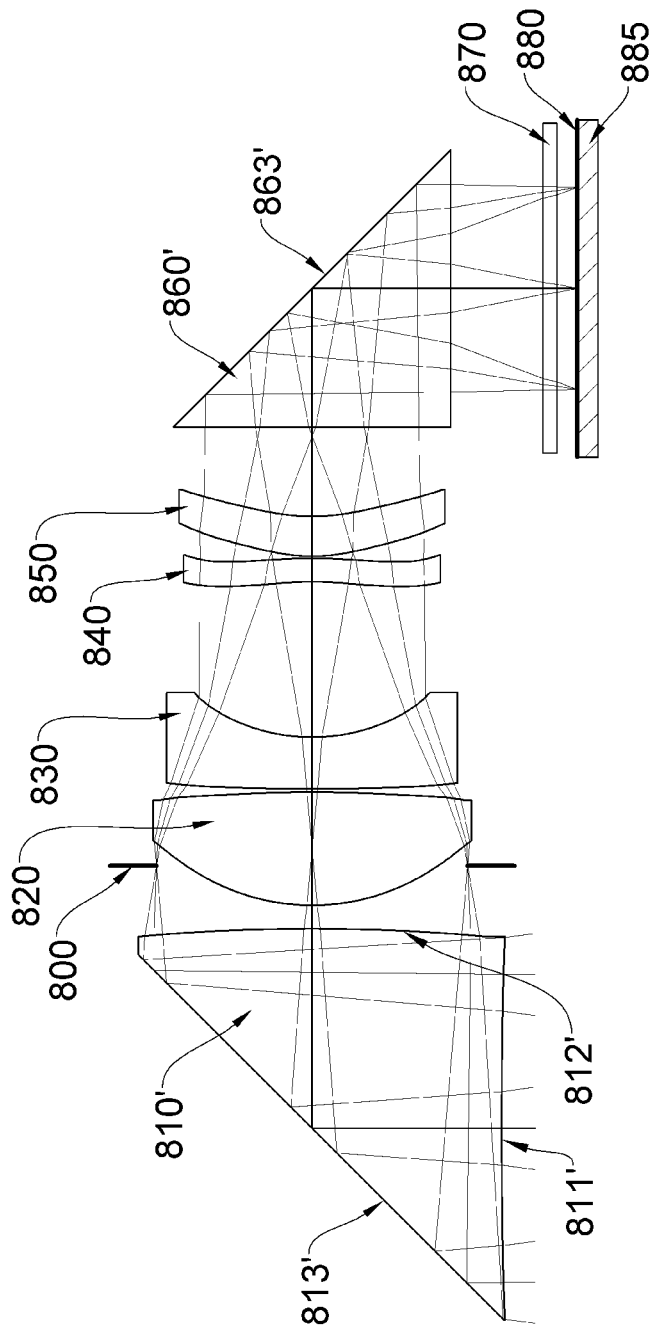
FIG. 8B is a schematic view of an imaging apparatus with reflective surfaces in a first zoom state equivalent to the 8th embodiment of the present disclosure.
Figure 8C:
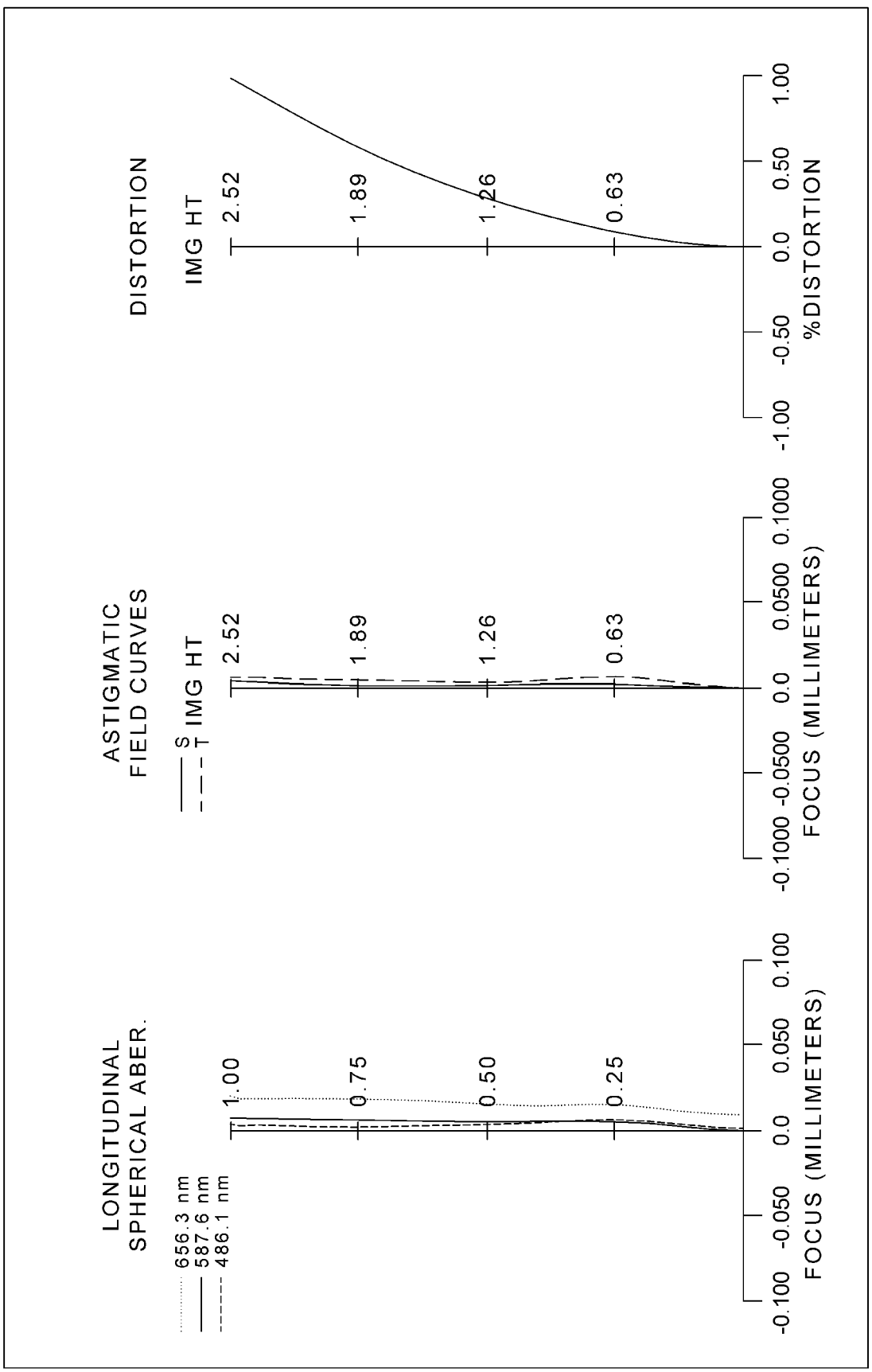
FIG. 8C shows longitudinal spherical aberration curves, astigmatic field curves and a distortion curve of the imaging apparatus in the first zoom state according to the 8th embodiment.

FIG. 8A is a schematic view of an imaging apparatus in a first zoom state according to the 8th embodiment of the present disclosure. FIG. 8B is a schematic view of an imaging apparatus with reflective surfaces in a first zoom state equivalent to the 8th embodiment of the present disclosure. FIG. 8C shows, in order from left to right, longitudinal spherical aberration curves, astigmatic field curves and a distortion curve of the imaging apparatus in a first zoom state according to the 8th embodiment.

In FIG. 8A, the imaging apparatus includes an imaging optical lens assembly (not otherwise herein labeled) of the present disclosure and an image sensor 885. The imaging optical lens assembly includes, in order from an object side to an image side along an optical path, a first optical element 810, an aperture stop 800, a second optical element 820, a third optical element 830, a fourth optical element 840, a fifth optical element 850, a prism 860, a filter 870, and an image surface 880. There is no additional optical element inserted between the first optical element 810 and the fifth optical element 850. There are air gaps between paraxial regions of the first optical element 810, the second optical element 820, the third optical element 830, the fourth optical element 840, and the fifth optical element 850.

The first optical element 810 with positive refractive power has an object-side surface 811 being concave in the paraxial region thereof, and an image-side surface 812 being convex in the paraxial region thereof. Both the object-side surface 811 and the image-side surface 812 are aspheric. The first optical element 810 is made of plastic material.

The second optical element 820 with positive refractive power has an object-side surface 821 being convex in the paraxial region thereof, and an image-side surface 822 being convex in the paraxial region thereof. Both the object-side surface 821 and the image-side surface 822 are aspheric. The second optical element 820 is made of plastic material.

The third optical element 830 with negative refractive power has an object-side surface 831 being convex in the paraxial region thereof, and an image-side surface 832 being concave in the paraxial region thereof. Both the object-side surface 831 and the image-side surface 832 are aspheric. The third optical element 830 is made of plastic material.

The fourth optical element 840 with negative refractive power has an object-side surface 841 being concave in the paraxial region thereof, and an image-side surface 842 being convex in the paraxial region thereof. Both the object-side surface 841 and the image-side surface 842 are aspheric. The fourth optical element 840 is made of plastic material.

The fifth optical element 850 with positive refractive power has an object-side surface 851 being convex in the paraxial region thereof, and an image-side surface 852 being concave in the paraxial region thereof. Both the object-side surface 851 and the image-side surface 852 are aspheric. The fifth optical element 850 is made of plastic material.

The prism 860 is disposed between the fifth optical element 850 and the filter 870. The prism 860 is made of glass material. The filter 870 is disposed between the prism 860 and the image surface 880. The filter 870 is made of glass material and does not affect the focal length of the imaging optical lens assembly. The image sensor 885 is disposed on the image surface 880 of the imaging optical lens assembly.

FIG. 8B is a schematic view of an imaging apparatus with reflective surfaces in a first zoom state equivalent to the 8th embodiment of the present disclosure. In FIG. 8B, a first optical element 810' is a prism including a reflective surface 813' so as to fold the optical path by 90 degrees. An object-side surface 811' of the first optical element 810' corresponds to the object-side surface 811 of the first optical element 810 and an image-side surface 812' of the first optical element 810' corresponds to the image-side surface 812 of the first optical element 810 such that the overall optical properties of the first optical element 810' are equivalent to those of the first optical element 810 shown in FIG. 8A. A prism 860' includes a reflective surface 863' such that the overall optical properties of the prism 860' are equivalent to those of the prism 860 shown in FIG. 8A. According to the aforementioned configuration, an imaging apparatus equivalent to the 8th embodiment with the optical path being folded can be obtained.

Figure 8D:
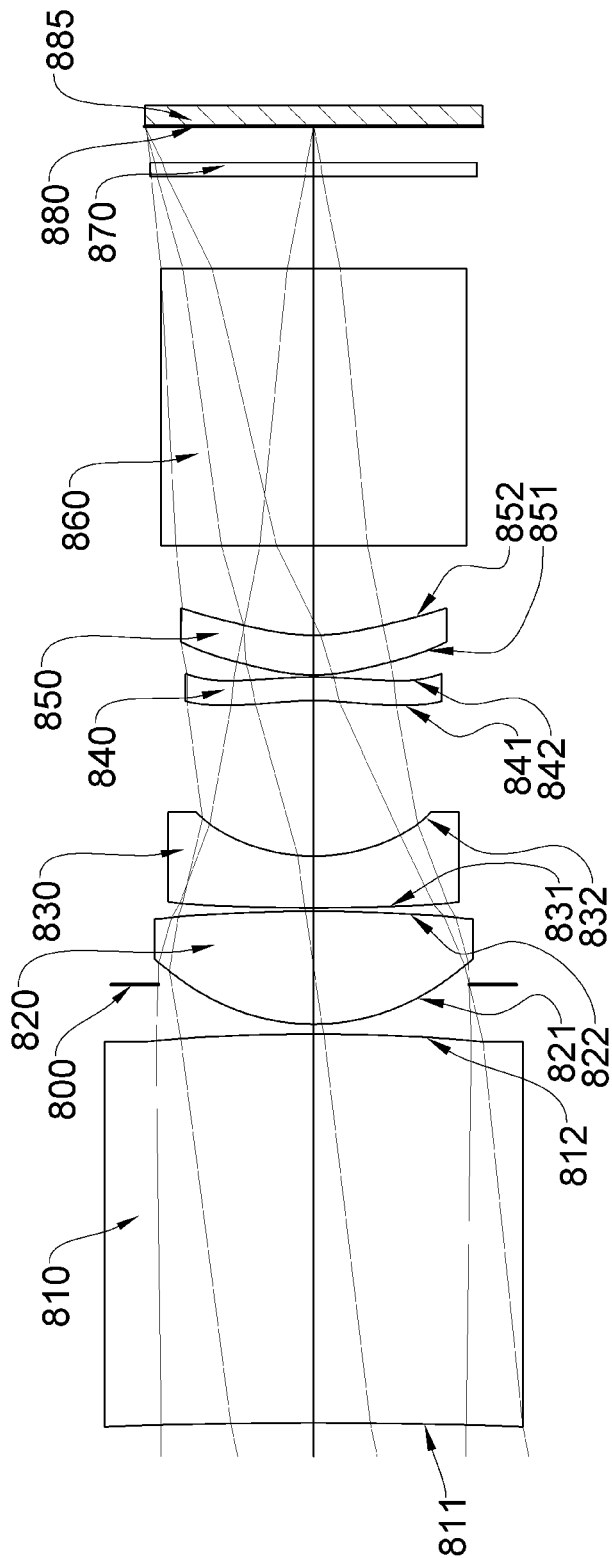
FIG. 8D is a schematic view of an imaging apparatus in a second zoom state according to the 8th embodiment of the present disclosure.
Figure 8E:
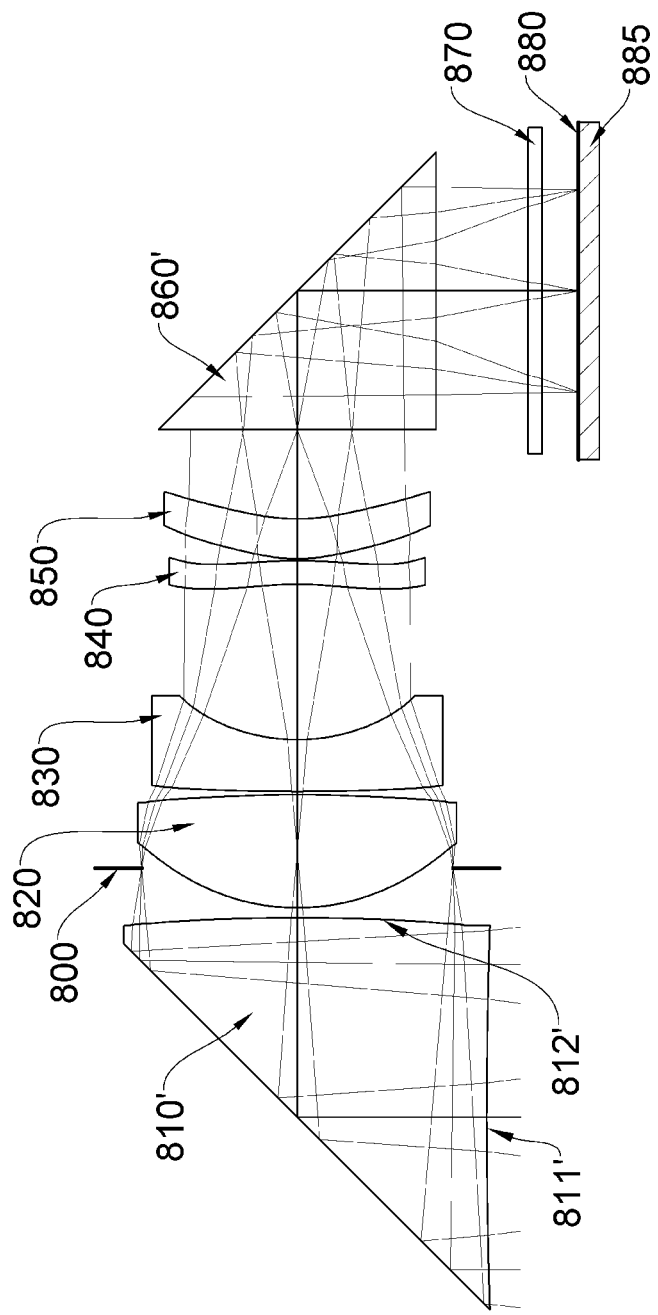
FIG. 8E is a schematic view of an imaging apparatus with reflective surfaces in a second zoom state equivalent to the 8th embodiment of the present disclosure.
Figure 8F:
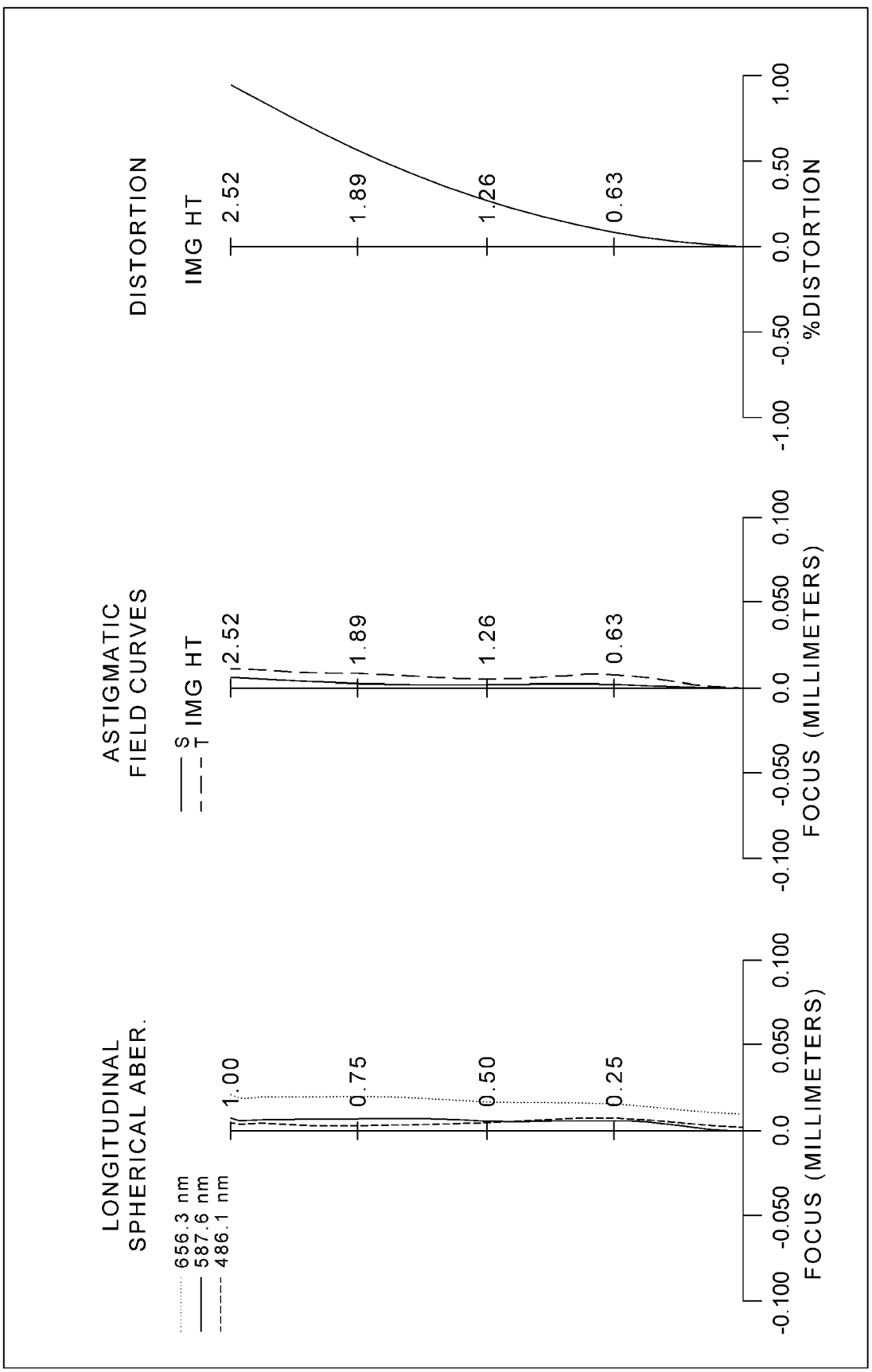
FIG. 8F shows longitudinal spherical aberration curves, astigmatic field curves and a distortion curve of the imaging apparatus in the second zoom state according to the 8th embodiment.

FIG. 8D is a schematic view of an imaging apparatus in a second zoom state according to the 8th embodiment of the present disclosure. FIG. 8E is a schematic view of an imaging apparatus with reflective surfaces in a second zoom state equivalent to the 8th embodiment of the present disclosure. FIG. 8F shows, in order from left to right, longitudinal spherical aberration curves, astigmatic field curves and a distortion curve of the imaging apparatus in a second zoom state according to the 8th embodiment. The imaging apparatus according to the 8th embodiment changes from the first zoom state into the second zoom state by changing the distance between the image-side surface 812 of the first optical element 810 and the stop 800 from 0.944 mm to 0.742 mm, and changing the distance between the filter 870 and the image surface 880 from 0.302 mm to 0.542 mm. The configuration of the rest optical elements of the 8th embodiment in the second zoom state is the same as that in the first zoom state. FIG. 8E is a schematic view of an imaging apparatus with reflective surfaces in a second zoom state equivalent to the 8th embodiment of the present disclosure. All the descriptions thereto are the same as the aforementioned zoom state and explanations in this regard will not be provided again.

The detailed optical data of the 8th embodiment are shown in TABLE 15, and the aspheric surface data are shown in TABLE 16.

TABLE 15

(8th Embodiment)
First zoom state: f = 11.74 mm, Fno = 2.55, HFOV = 12.0 deg.
Second zoom state: f = 11.71 mm, Fno = 2.62, HFOV = 11.7 deg.

| Surface # | | Curvature Radius | Thickness (First zoom state) | Thickness (Second zoom state) | Material | Index | Abbe # | Focal Length |
|---|---|---|---|---|---|---|---|---|
| 0 | Object | Plano | Infinity | 600.0 | | | | |
| 1 | Optical element 1* | −100.000 ASP | 5.811 | | Plastic | 1.669 | 19.5 | 66.31 |

TABLE 15-continued (8th Embodiment)
First zoom state: f = 11.74 mm, Fno = 2.55, HFOV = 12.0 deg.
Second zoom state: f = 11.71 mm, Fno = 2.62, HFOV = 11.7 deg.

| Surface # | | Curvature Radius | | Thickness (First zoom state) | Thickness (Second zoom state) | Material | Index | Abbe # | Focal Length |
|---|---|---|---|---|---|---|---|---|---|
| 2 | | −31.446 | ASP | 0.944 | 0.742 | | | | |
| 3 | Ape. Stop | Plano | | −0.592 | | | | | |
| 4 | Optical element 2 | 3.232 | ASP | 1.689 | | Plastic | 1.544 | 56.0 | 5.20 |
| 5 | | −18.487 | ASP | 0.047 | | | | | |
| 6 | Optical element 3 | 25.256 | ASP | 0.775 | | Plastic | 1.607 | 26.6 | −5.15 |
| 7 | | 2.753 | ASP | 2.314 | | | | | |
| 8 | Optical element 4 | −4.166 | ASP | 0.350 | | Plastic | 1.669 | 19.5 | −18.12 |
| 9 | | −6.561 | ASP | 0.030 | | | | | |
| 10 | Optical element 5 | 2.302 | ASP | 0.595 | | Plastic | 1.607 | 26.6 | 14.81 |
| 11 | | 2.792 | ASP | 1.338 | | | | | |
| 12 | Prism | Plano | | 4.140 | | Glass | 1.954 | 32.3 | — |
| 13 | | Plano | | 1.375 | | | | | |
| 14 | Filter | Plano | | 0.210 | | Glass | 1.563 | 51.3 | — |
| 15 | | Plano | | 0.302 | 0.542 | | | | |
| 16 | Image Surface | Plano | | — | — | | | | |

Remark: Reference wavelength is d-line 587.6 nm.
*The effective radius of Surface 10 is 1.985 mm.
*Optical element 1 is a prism with refractive power.

TABLE 16

Aspheric Coefficient

| Surface # | 1 | 2 | 4 | 5 | 6 |
|---|---|---|---|---|---|
| k= | −9.9000E+01 | 1.4792E+01 | 0.0000E+00 | 0.0000E+00 | 0.0000E+00 |
| A4= | −8.0377E−05 | −2.8188E−04 | −7.6341E−04 | 2.0907E−03 | −4.2306E−03 |
| A6= | 1.3478E−05 | 1.6965E−04 | 2.6230E−04 | 8.2400E−04 | 1.5096E−03 |
| A8= | −1.0772E−05 | −1.1802E−04 | −1.9039E−04 | −1.1283E−03 | −1.1769E−03 |
| A10= | 3.5267E−06 | 4.6531E−05 | 6.1723E−05 | 9.7892E−04 | 1.3516E−03 |
| A12= | −6.8010E−07 | −1.1100E−05 | −1.4976E−05 | −4.9793E−04 | −7.9578E−04 |
| A14= | 8.1665E−08 | 1.6203E−06 | 2.9341E−06 | 1.4601E−04 | 2.5984E−04 |
| A16= | −6.0030E−09 | −1.3886E−07 | −5.7825E−07 | −2.4866E−05 | −4.8395E−05 |
| A18= | 2.4790E−10 | 6.1888E−09 | 7.7183E−08 | 2.2821E−06 | 4.8160E−06 |
| A20= | −4.4187E−12 | −1.0197E−10 | −4.8629E−09 | −8.7366E−08 | −1.9808E−07 |

| Surface # | 7 | 8 | 9 | 10 | 11 |
|---|---|---|---|---|---|
| k= | 0.0000E+00 | 0.0000E+00 | 0.0000E+00 | 0.0000E+00 | 0.0000E+00 |
| A4= | −4.4887E−03 | 1.1590E−01 | 5.5207E−02 | −9.5657E−02 | −5.3764E−02 |
| A6= | 9.6299E−04 | −1.1242E−01 | −6.0737E−02 | 3.6026E−02 | 1.6541E−02 |
| A8= | −5.0533E−04 | 9.7918E−02 | 6.1623E−02 | −1.0560E−02 | −9.6890E−03 |
| A10= | 1.5714E−03 | −6.2492E−02 | −3.8641E−02 | 2.7531E−03 | 8.1221E−03 |
| A12= | −1.2813E−03 | 2.8003E−02 | 1.5086E−02 | −1.5413E−03 | −5.2510E−03 |
| A14= | 5.6383E−04 | −8.4262E−03 | −3.4113E−03 | 9.0066E−04 | 2.1705E−03 |
| A16= | −1.3293E−04 | 1.6124E−03 | 3.6875E−04 | −2.9340E−04 | −5.3780E−04 |
| A18= | 1.5069E−05 | −1.7744E−04 | −4.3861E−06 | 4.7356E−05 | 7.2715E−05 |
| A20= | −5.0255E−07 | 8.5729E−06 | −1.6516E−06 | −3.0300E−06 | −4.1343E−06 |

In the 8th embodiment, the equation of the aspheric surface profiles of the aforementioned optical elements is the same as the equation of the 1st embodiment. Also, the definitions of these parameters shown in table below are the same as those stated in the 1st embodiment with corresponding values for the 8th embodiment, so an explanation in this regard will not be provided again.

Moreover, these parameters can be calculated from TABLE 15 and TABLE 16 and satisfy the conditions stated in table below.

| 8th Embodiment | | | |
|---|---|---|---|
| f [mm] | 11.74 | ΣCT/CT1 | 1.59 |
| Fno | 2.55 | Dr3r10/BL | 0.79 |
| HFOV [deg.] | 12.0 | |f/R1| + |f/R2| | 0.49 |
| Y2R1 | 2.38 | (f/R3) + (f/R6) | 7.90 |
| Y5R2 | 1.96 | (f/R9) + (f/R10) | 9.30 |
| V1/N1 | 11.65 | |f2/f1| | 0.08 |
| V2/N2 | 36.26 | |f2/f4| | 0.29 |
| V3/N3 | 16.57 | |f2/f5| | 0.35 |
| V4/N4 | 11.65 | |f3/f1| | 0.08 |
| V5/N5 | 16.57 | |f3/f2| | 0.99 |
| Tg1 (° C.) | 142.00 | |f3/f4| | 0.28 |
| Tg1/N1 | 85.08 | |f3/f5| | 0.35 |
| Y2R1/Y5R2 | 1.21 | f/f1 | 0.18 |
| CT2/CT3 | 2.18 | |f/f2| + |f/f3| | 4.53 |
| (CT2 + CT3)/(CT4 + CT5) | 2.61 | | |

9th Embodiment

Figure 9A:
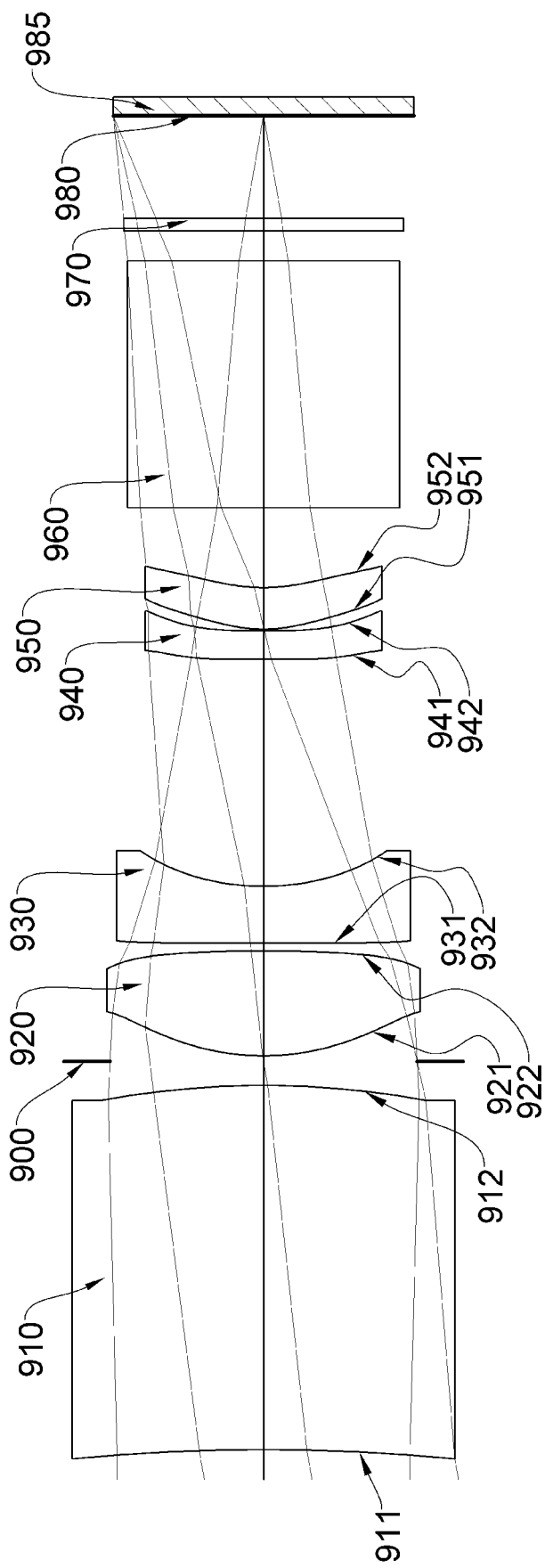
FIG. 9A is a schematic view of an imaging apparatus in a first zoom state according to the 9th embodiment of the present disclosure.
Figure 9B:
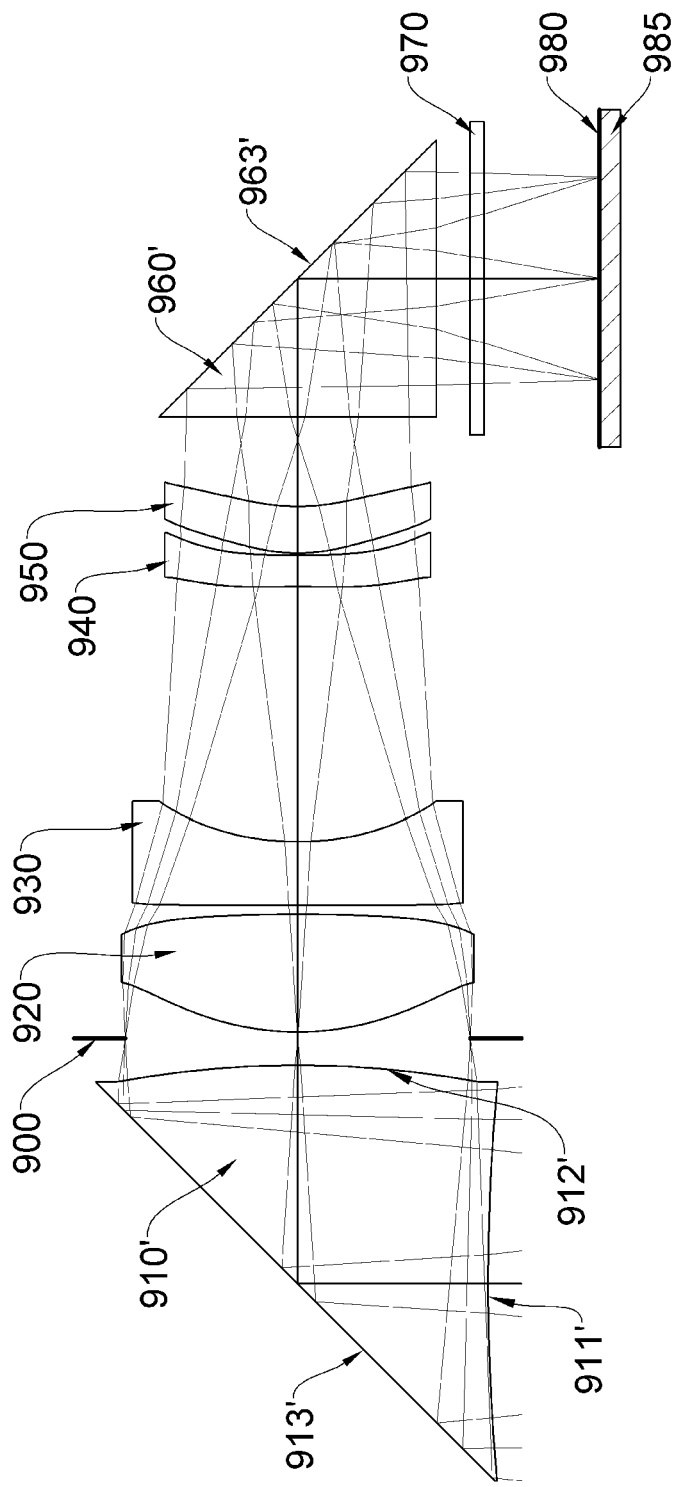
FIG. 9B is a schematic view of an imaging apparatus with reflective surfaces in a first zoom state equivalent to the 9th embodiment of the present disclosure.
Figure 9C:
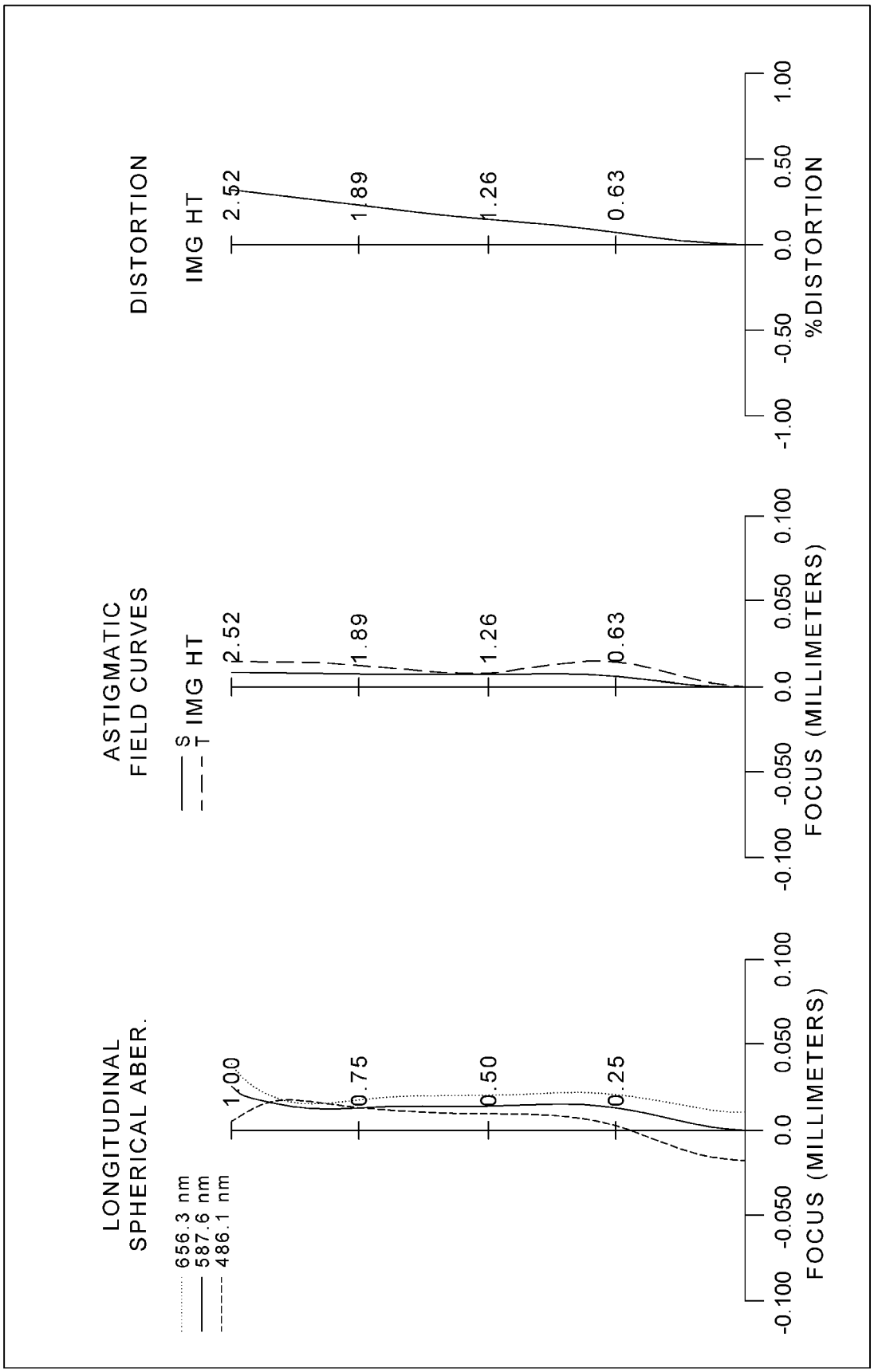
FIG. 9C shows longitudinal spherical aberration curves, astigmatic field curves and a distortion curve of the imaging apparatus in the first zoom state according to the 9th embodiment.

FIG. 9A is a schematic view of an imaging apparatus in a first zoom state according to the 9th embodiment of the present disclosure. FIG. 9B is a schematic view of an imaging apparatus with reflective surfaces in a first zoom state equivalent to the 9th embodiment of the present disclosure. FIG. 9C shows, in order from left to right, longitudinal spherical aberration curves, astigmatic field curves and a distortion curve of the imaging apparatus in a first zoom state according to the 9th embodiment.

In FIG. 9A, the imaging apparatus includes an imaging optical lens assembly (not otherwise herein labeled) of the present disclosure and an image sensor 985. The imaging optical lens assembly includes, in order from an object side to an image side along an optical path, a first optical element 910, an aperture stop 900, a second optical element 920, a third optical element 930, a fourth optical element 940, a fifth optical element 950, a prism 960, a filter 970, and an image surface 980. There is no additional optical element inserted between the first optical element 910 and the fifth optical element 950. There are air gaps between paraxial regions of the first optical element 910, the second optical element 920, the third optical element 930, the fourth optical element 940, and the fifth optical element 950.

The first optical element 910 with positive refractive power has an object-side surface 911 being concave in the paraxial region thereof, and an image-side surface 912 being convex in the paraxial region thereof. Both the object-side surface 911 and the image-side surface 912 are aspheric. The first optical element 910 is made of plastic material. In one embodiment of the present disclosure, the first optical element 910 is made of cyclo olefin polymer material and the cyclo olefin polymer may be a copolymer.

The second optical element 920 with positive refractive power has an object-side surface 921 being convex in the paraxial region thereof, and an image-side surface 922 being convex in the paraxial region thereof. Both the object-side surface 921 and the image-side surface 922 are aspheric. The second optical element 920 is made of plastic material.

The third optical element 930 with negative refractive power has an object-side surface 931 being planar in the paraxial region thereof, and an image-side surface 932 being concave in the paraxial region thereof. Both the object-side surface 931 and the image-side surface 932 are aspheric. The third optical element 930 is made of plastic material.

The fourth optical element 940 with negative refractive power has an object-side surface 941 being concave in the paraxial region thereof, and an image-side surface 942 being concave in the paraxial region thereof. Both the object-side surface 941 and the image-side surface 942 are aspheric. The fourth optical element 940 is made of plastic material.

The fifth optical element 950 with positive refractive power has an object-side surface 951 being convex in the paraxial region thereof, and an image-side surface 952 being concave in the paraxial region thereof. Both the object-side surface 951 and the image-side surface 952 are aspheric. The fifth optical element 950 is made of plastic material.

The prism 960 is disposed between the fifth optical element 950 and the filter 970. The prism 960 is made of glass material. The filter 970 is disposed between the prism 960 and the image surface 980. The filter 970 is made of glass material and does not affect the focal length of the imaging optical lens assembly. The image sensor 985 is disposed on the image surface 980 of the imaging optical lens assembly.

FIG. 9B is a schematic view of an imaging apparatus with reflective surfaces in a first zoom state equivalent to the 9th embodiment of the present disclosure. In FIG. 9B, a first optical element 910' is a prism including a reflective surface 913' so as to fold the optical path by 90 degrees. An object-side surface 911' of the first optical element 910' corresponds to the object-side surface 911 of the first optical element 910 and an image-side surface 912' of the first optical element 910' corresponds to the image-side surface 912 of the first optical element 910 such that the overall optical properties of the first optical element 910' are equivalent to those of the first optical element 910 shown in FIG. 9A. A prism 960' includes a reflective surface 963' such that the overall optical properties of the prism 960' are equivalent to those of the prism 960 shown in FIG. 9A. According to the aforementioned configuration, an imaging apparatus equivalent to the 9th embodiment with the optical path being folded can be obtained.

Figure 9D:
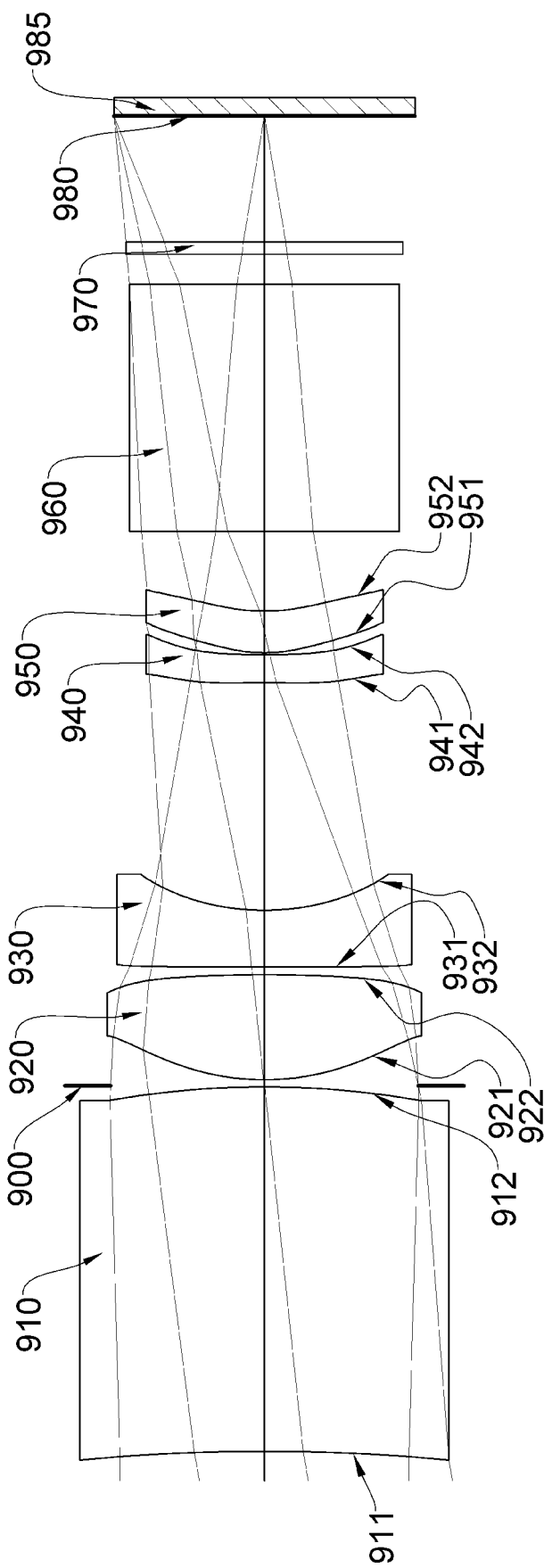
FIG. 9D is a schematic view of an imaging apparatus in a second zoom state according to the 9th embodiment of the present disclosure.
Figure 9E:
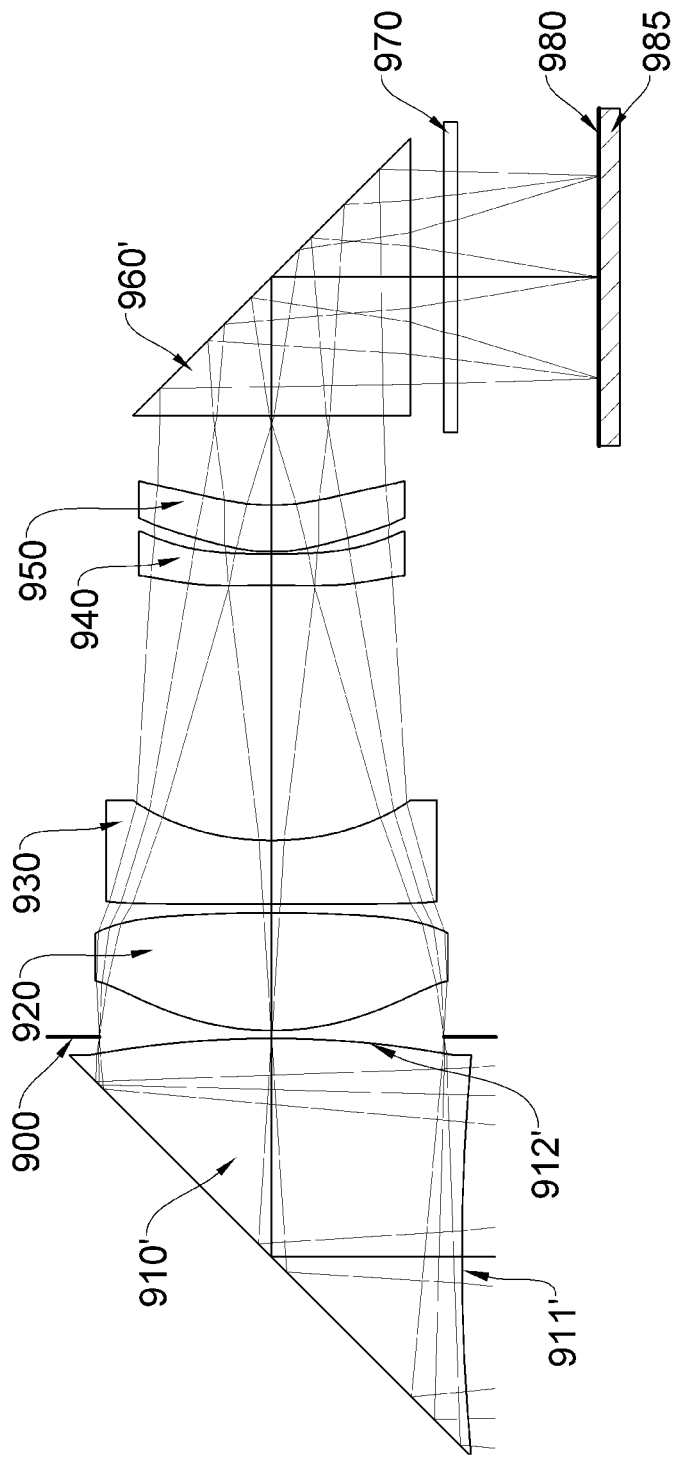
FIG. 9E is a schematic view of an imaging apparatus with reflective surfaces in a second zoom state equivalent to the 9th embodiment of the present disclosure.
Figure 9F:
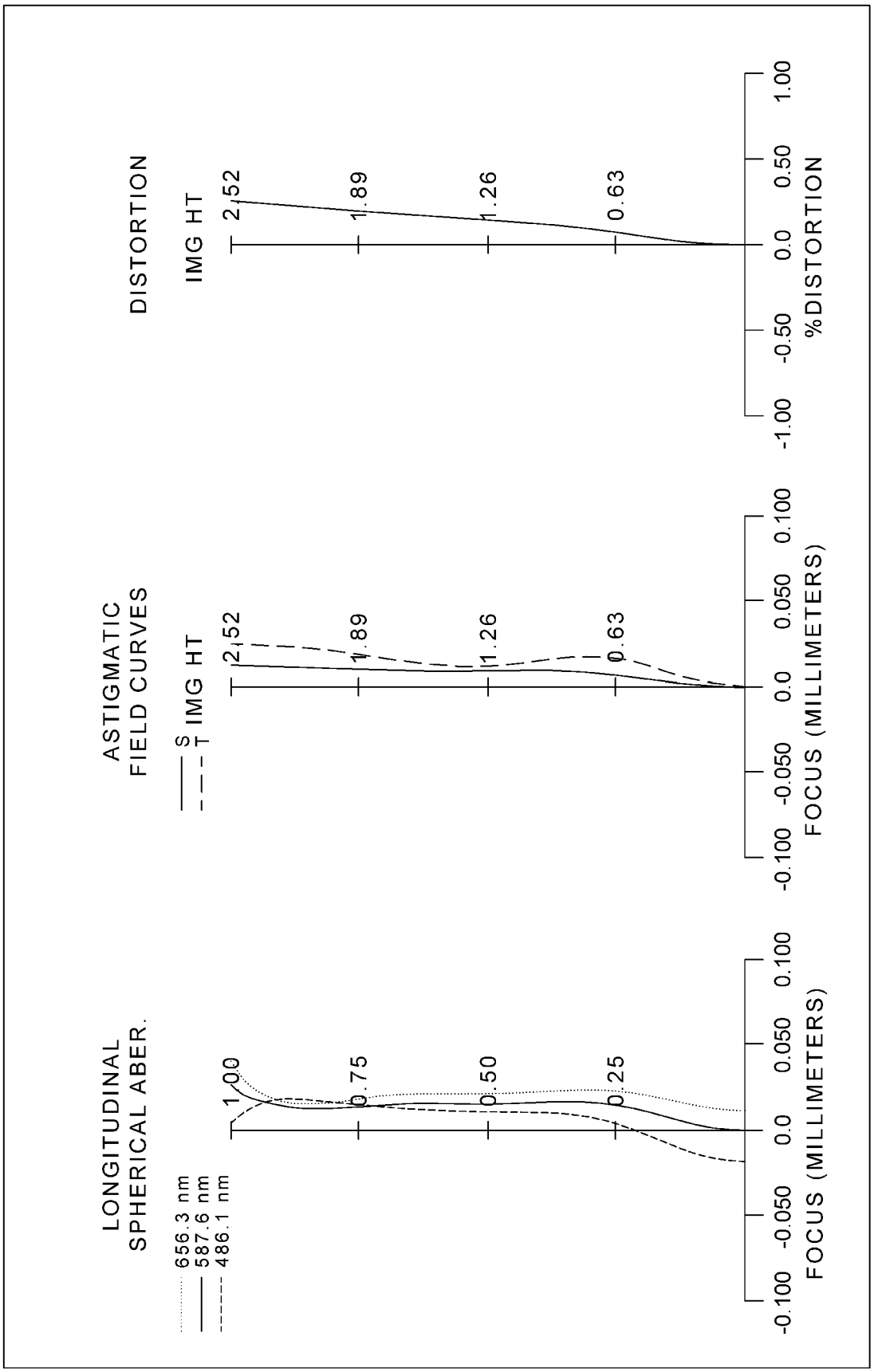
FIG. 9F shows longitudinal spherical aberration curves, astigmatic field curves and a distortion curve of the imaging apparatus in the second zoom state according to the 9th embodiment.

FIG. 9D is a schematic view of an imaging apparatus in a second zoom state according to the 9th embodiment of the present disclosure. FIG. 9E is a schematic view of an imaging apparatus with reflective surfaces in a second zoom state equivalent to the 9th embodiment of the present disclosure. FIG. 9F shows, in order from left to right, longitudinal spherical aberration curves, astigmatic field curves and a distortion curve of the imaging apparatus in a second zoom state according to the 9th embodiment. The imaging apparatus according to the 9th embodiment changes from the first zoom state into the second zoom state by changing the distance between the image-side surface 912 of the first optical element 910 and the stop 900 from 0.401 mm to 0.020 mm, and changing the distance between the filter 970 and the image surface 980 from 1.726 mm to 2.107 mm. As such, an axial distance between the image-side surface 912 of the first optical element 910 and the image surface 980 along the optical path remains the same while performing focusing. The configuration of the rest optical elements of the 9th embodiment in the second zoom state is the same as that in the first zoom state. FIG. 9E is a schematic view of an imaging apparatus with reflective surfaces in a second zoom state equivalent to the 9th embodiment of the present disclosure. All the descriptions thereto are the same as the aforementioned zoom state and explanations in this regard will not be provided again.

The detailed optical data of the 9th embodiment are shown in TABLE 17, and the aspheric surface data are shown in TABLE 18.

TABLE 17

(9th Embodiment)
First zoom state: f = 14.23 mm, Fno = 2.90, HFOV = 10.0 deg.
Second zoom state: f = 14.17 mm, Fno = 3.00, HFOV = 9.8 deg.

| Surface # | | Curvature Radius | | Thickness (First zoom state) | Thickness (Second zoom state) | Material | Index | Abbe # | Focal Length |
|---|---|---|---|---|---|---|---|---|---|
| 0 | Object | Plano | | Infinity | 600.0 | | | | |
| 1 | Optical element 1* | −32.641 | SPH | 6.108 | | Plastic | 1.515 | 56.6 | 47.96 |
| 2 | | −14.947 | SPH | 0.401 | 0.020 | | | | |
| 3 | Ape. Stop | Plano | | 0.096 | | | | | |
| 4 | Optical element 2 | 4.121 | ASP | 1.759 | | Plastic | 1.530 | 55.8 | 6.94 |
| 5 | | −29.186 | ASP | 0.131 | | | | | |
| 6 | Optical element 3 | ∞ | ASP | 0.952 | | Plastic | 1.583 | 30.2 | −7.13 |
| 7 | | 4.155 | ASP | 3.803 | | | | | |
| 8 | Optical element 4 | −13.847 | ASP | 0.470 | | Plastic | 1.566 | 37.4 | −16.26 |
| 9 | | 27.779 | ASP | 0.030 | | | | | |
| 10 | Optical element 5 | 2.374 | ASP | 0.698 | | Plastic | 1.566 | 37.4 | 16.27 |
| 11 | | 2.859 | ASP | 1.338 | | | | | |
| 12 | Prism | Plano | | 4.140 | | Glass | 1.954 | 32.3 | — |
| 13 | | Plano | | 0.500 | | | | | |
| 14 | Filter | Plano | | 0.210 | | Glass | 1.563 | 51.3 | — |
| 15 | | Plano | | 1.726 | 2.107 | | | | |
| 16 | Image Surface | Plano | | — | — | | | | |

Remark: Reference wavelength is d-line 587.6 nm.
*The effective radius of Surface 10 is 1.985 mm.
*Optical element 1 is a prism with refractive power.

TABLE 18

Aspheric Coefficient

| Surface # | 4 | 5 | 6 | 7 |
|---|---|---|---|---|
| k= | 0.0000E+00 | 0.0000E+00 | 0.0000E+00 | 0.0000E+00 |
| A4= | −1.2685E−03 | −7.1625E−03 | −5.8027E−03 | 6.8133E−04 |
| A6= | −3.1620E−05 | 5.6465E−03 | 6.4232E−03 | 1.0077E−03 |
| A8= | −3.0803E−05 | −2.2322E−03 | −2.5165E−03 | −1.7084E−04 |
| A10= | −1.5954E−06 | 4.2872E−04 | 4.9023E−04 | −1.2172E−04 |
| A12= | 3.2816E−07 | −4.6319E−05 | −4.9375E−05 | 7.1396E−05 |
| A14= | −1.5221E−07 | 2.6771E−06 | 2.4153E−06 | −1.3482E−05 |
| A16= | 7.3244E−09 | −6.5529E−08 | −3.7020E−08 | 9.2584E−07 |

| Surface # | 8 | 9 | 10 | 11 |
|---|---|---|---|---|
| k= | 0.0000E+00 | 0.0000E+00 | 0.0000E+00 | 0.0000E+00 |
| A4= | 7.0004E−02 | 4.9438E−02 | −5.6881E−02 | −4.5512E−02 |
| A6= | −4.1159E−02 | −3.8174E−02 | −1.2914E−03 | 6.3713E−03 |
| A8= | 2.1588E−02 | 2.8890E−02 | 1.1871E−02 | −8.3236E−04 |
| A10= | −8.2182E−03 | −1.2997E−02 | −7.0690E−03 | 6.6636E−04 |
| A12= | 1.9232E−03 | 3.2353E−03 | 2.1353E−03 | −6.0821E−04 |
| A14= | −2.4746E−04 | −4.1134E−04 | −3.7440E−04 | 2.8150E−04 |
| A16= | 1.3307E−05 | 2.0365E−05 | 3.8639E−05 | −7.2933E−05 |
| A18= | | | −2.0103E−06 | 1.0450E−05 |
| A20= | | | | −6.4765E−07 |

In the 9th embodiment, the equation of the aspheric surface profiles of the aforementioned optical elements is the same as the equation of the 1st embodiment. Also, the definitions of these parameters shown in table below are the same as those stated in the 1st embodiment with corresponding values for the 9th embodiment, so an explanation in this regard will not be provided again.

Moreover, these parameters can be calculated from TABLE 17 and TABLE 18 and satisfy the conditions stated in table below.

| 9th Embodiment | | | |
|---|---|---|---|
| f [mm] | 14.23 | ΣCT/CT1 | 1.64 |
| Fno | 2.90 | Dr3r10/BL | 0.99 |
| HFOV [deg.] | 10.0 | |f/R1| + |f/R2| | 1.39 |
| Y2R1 | 2.63 | (f/R3) + (f/R6) | 6.88 |
| Y5R2 | 1.97 | (f/R9) + (f/R10) | 10.97 |
| V1/N1 | 37.34 | |f2/f1| | 0.14 |
| V2/N2 | 36.45 | |f2/f4| | 0.43 |
| V3/N3 | 19.11 | |f2/f5| | 0.43 |
| V4/N4 | 23.91 | |f3/f1| | 0.15 |
| V5/N5 | 23.91 | |f3/f2| | 1.03 |
| Tg1 (° C.) | 127.00 | |f3/f4| | 0.44 |
| Tg1/N1 | 83.85 | |f3/f5| | 0.44 |
| Y2R1/Y5R2 | 1.34 | f/f1 | 0.30 |
| CT2/CT3 | 1.85 | |f/f2| + |f/f3| | 4.05 |
| (CT2 + CT3)/(CT4 + CT5) | 2.32 | | |

10th Embodiment

Figure 10A:
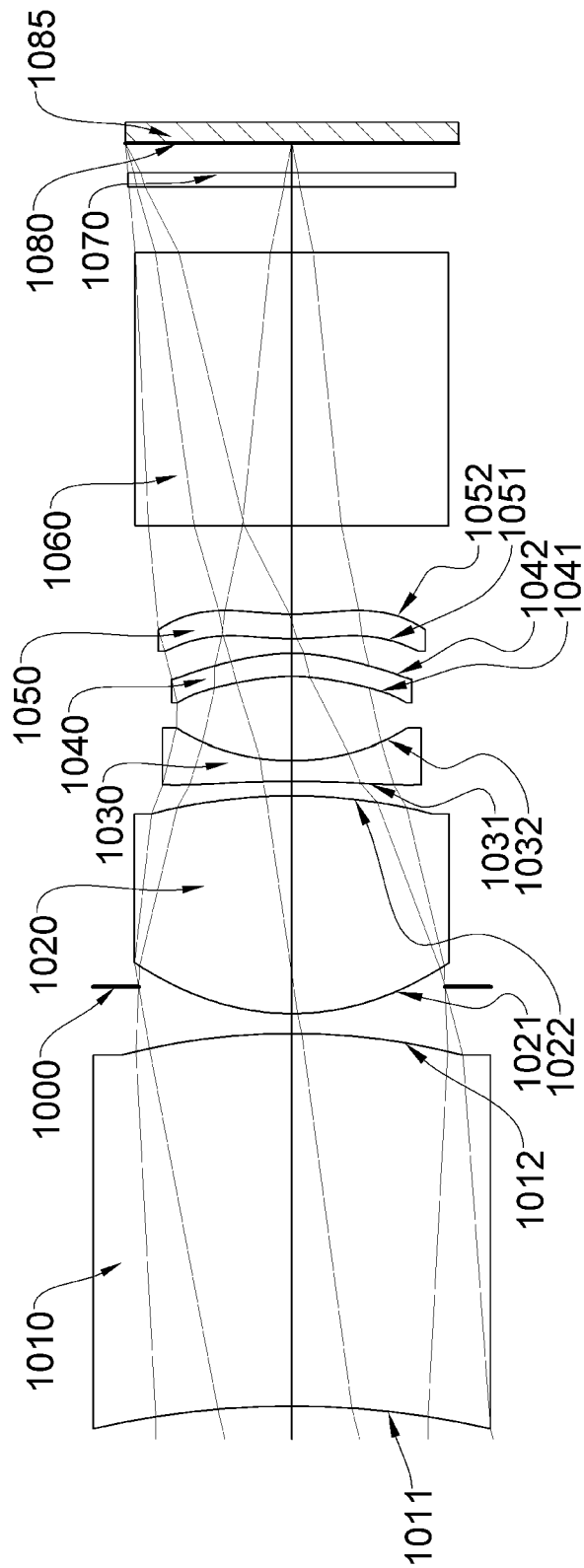
FIG. 10A is a schematic view of an imaging apparatus in a first zoom state according to the 10th embodiment of the present disclosure.
Figure 10B:
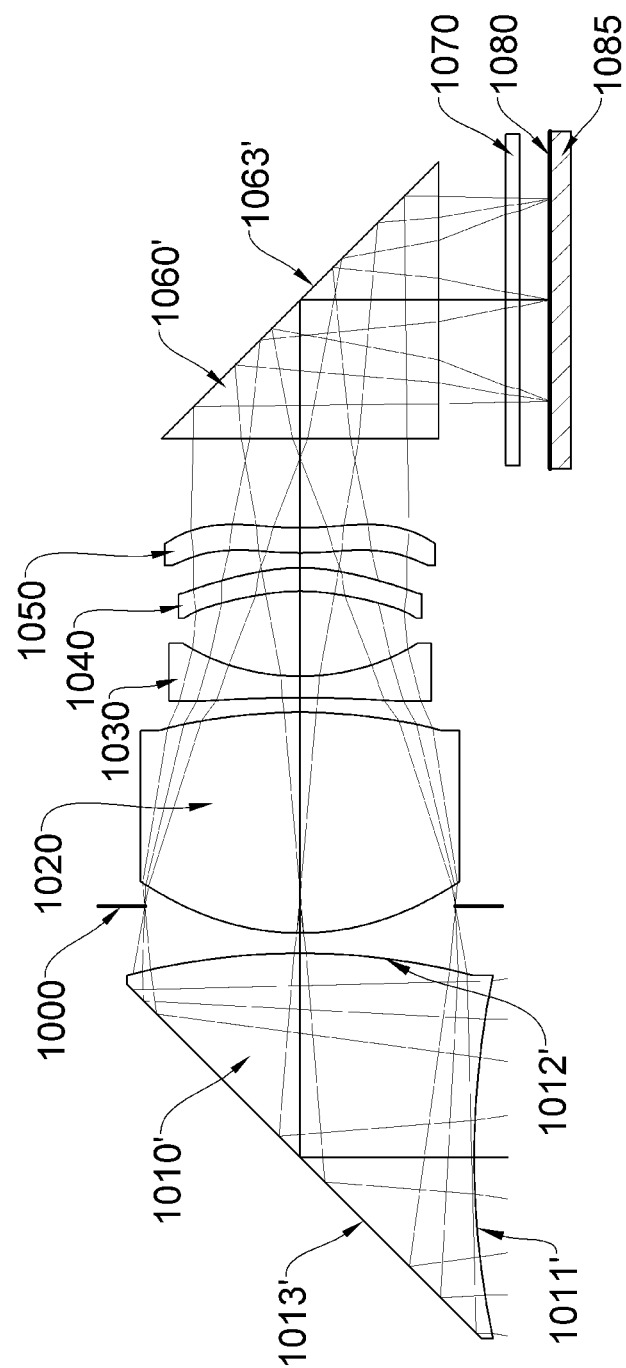
FIG. 10B is a schematic view of an imaging apparatus with reflective surfaces in a first zoom state equivalent to the 10th embodiment of the present disclosure.
Figure 10C:
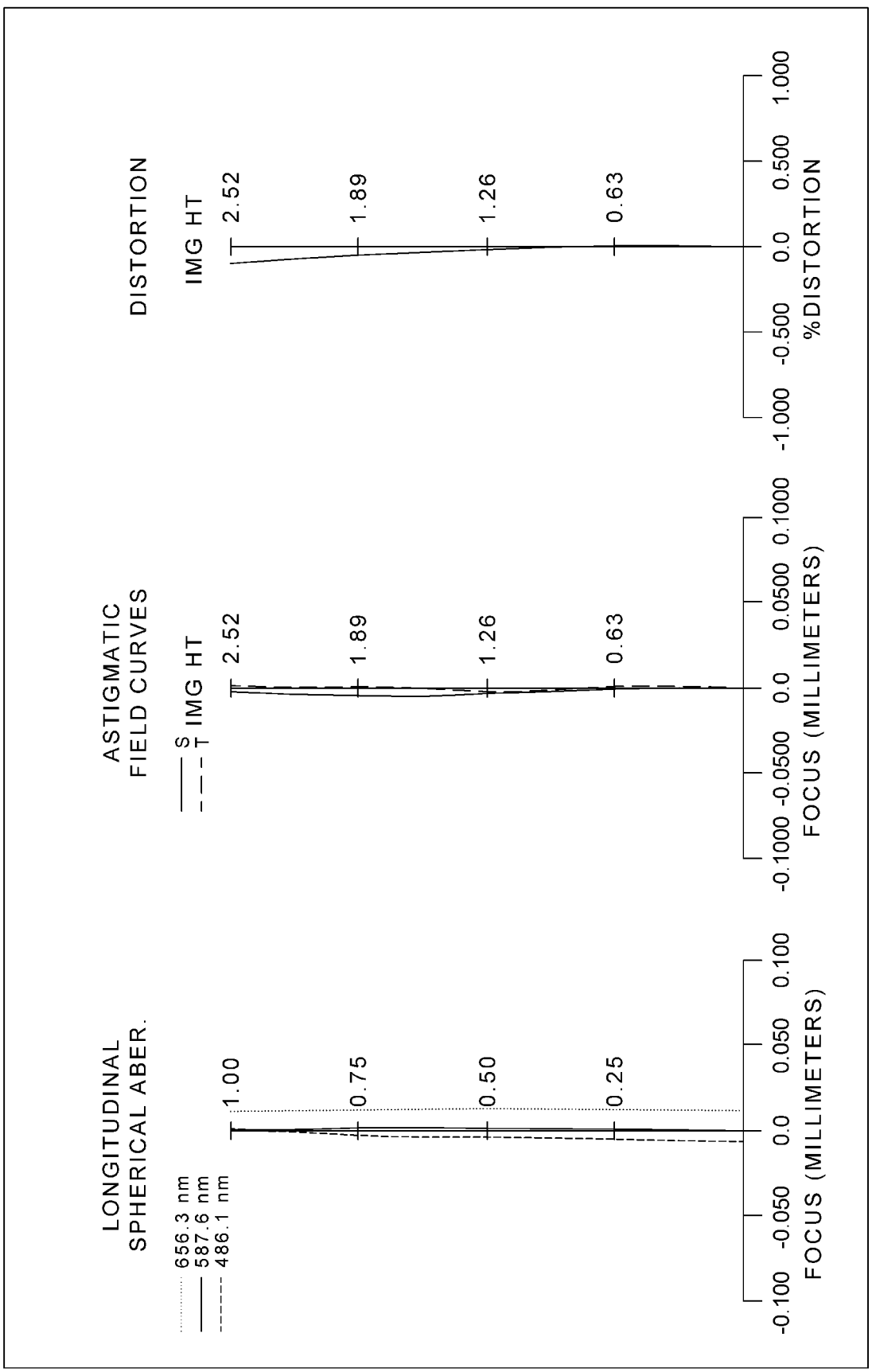
FIG. 10C shows longitudinal spherical aberration curves, astigmatic field curves and a distortion curve of the imaging apparatus in the first zoom state according to the 10th embodiment.

FIG. 10A is a schematic view of an imaging apparatus in a first zoom state according to the 10th embodiment of the present disclosure. FIG. 10B is a schematic view of an imaging apparatus with reflective surfaces in a first zoom state equivalent to the 10th embodiment of the present disclosure. FIG. 10C shows, in order from left to right, longitudinal spherical aberration curves, astigmatic field curves and a distortion curve of the imaging apparatus in a first zoom state according to the 10th embodiment.

In FIG. 10A, the imaging apparatus includes an imaging optical lens assembly (not otherwise herein labeled) of the present disclosure and an image sensor 1085. The imaging optical lens assembly includes, in order from an object side to an image side along an optical path, a first optical element 1010, an aperture stop 1000, a second optical element 1020, a third optical element 1030, a fourth optical element 1040, a fifth optical element 1050, a prism 1060, a filter 1070, and an image surface 1080. There is no additional optical element inserted between the first optical element 1010 and the fifth optical element 1050. There are air gaps between paraxial regions of the first optical element 1010, the second optical element 1020, the third optical element 1030, the fourth optical element 1040, and the fifth optical element 1050.

The first optical element 1010 with positive refractive power has an object-side surface 1011 being concave in the paraxial region thereof, and an image-side surface 1012 being convex in the paraxial region thereof. Both the object-side surface 1011 and the image-side surface 1012 are spherical. The first optical element 1010 is made of glass material.

The second optical element 1020 with positive refractive power has an object-side surface 1021 being convex in the paraxial region thereof, and an image-side surface 1022 being convex in the paraxial region thereof. Both the object-side surface 1021 and the image-side surface 1022 are aspheric. The second optical element 1020 is made of plastic material.

The third optical element 1030 with negative refractive power has an object-side surface 1031 being concave in the paraxial region thereof, and an image-side surface 1032 being concave in the paraxial region thereof. Both the object-side surface 1031 and the image-side surface 1032 are aspheric. The third optical element 1030 is made of plastic material.

The fourth optical element 1040 with positive refractive power has an object-side surface 1041 being concave in the paraxial region thereof, and an image-side surface 1042 being convex in the paraxial region thereof. Both the object-side surface 1041 and the image-side surface 1042 are aspheric. The fourth optical element 1040 is made of plastic material.

The fifth optical element 1050 with negative refractive power has an object-side surface 1051 being convex in the paraxial region thereof, and an image-side surface 1052 being concave in the paraxial region thereof. Both the object-side surface 1051 and the image-side surface 1052 are aspheric. The fifth optical element 1050 is made of plastic material.

The prism 1060 is disposed between the fifth optical element 1050 and the filter 1070. The prism 1060 is made of glass material. The filter 1070 is disposed between the prism 1060 and the image surface 1080. The filter 1070 is made of glass material and does not affect the focal length of the imaging optical lens assembly. The image sensor 1085 is disposed on the image surface 1080 of the imaging optical lens assembly.

FIG. 10B is a schematic view of an imaging apparatus with reflective surfaces in a first zoom state equivalent to the 10th embodiment of the present disclosure. In FIG. 10B, a first optical element 1010' is a prism including a reflective surface 1013' so as to fold the optical path by 90 degrees. An object-side surface 1011' of the first optical element 1010' corresponds to the object-side surface 1011 of the first optical element 1010 and an image-side surface 1012' of the first optical element 1010' corresponds to the image-side surface 1012 of the first optical element 1010 such that the overall optical properties of the first optical element 1010' are equivalent to those of the first optical element 1010 shown in FIG. 10A. A prism 1060' includes a reflective surface 1063' such that the overall optical properties of the prism 1060' are equivalent to those of the prism 1060 shown in FIG. 10A. According to the aforementioned configuration, an imaging apparatus equivalent to the 10th embodiment with the optical path being folded can be obtained.

Figure 10D:
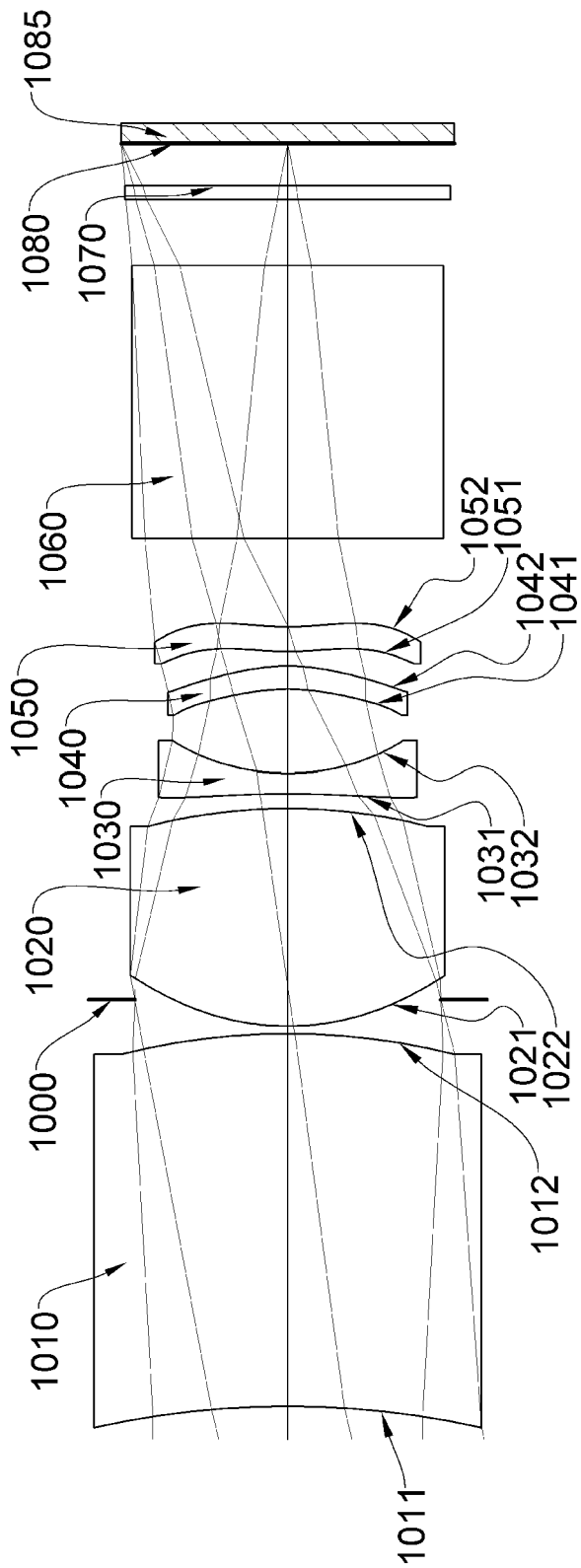
FIG. 10D is a schematic view of an imaging apparatus in a second zoom state according to the 10th embodiment of the present disclosure.
Figure 10E:
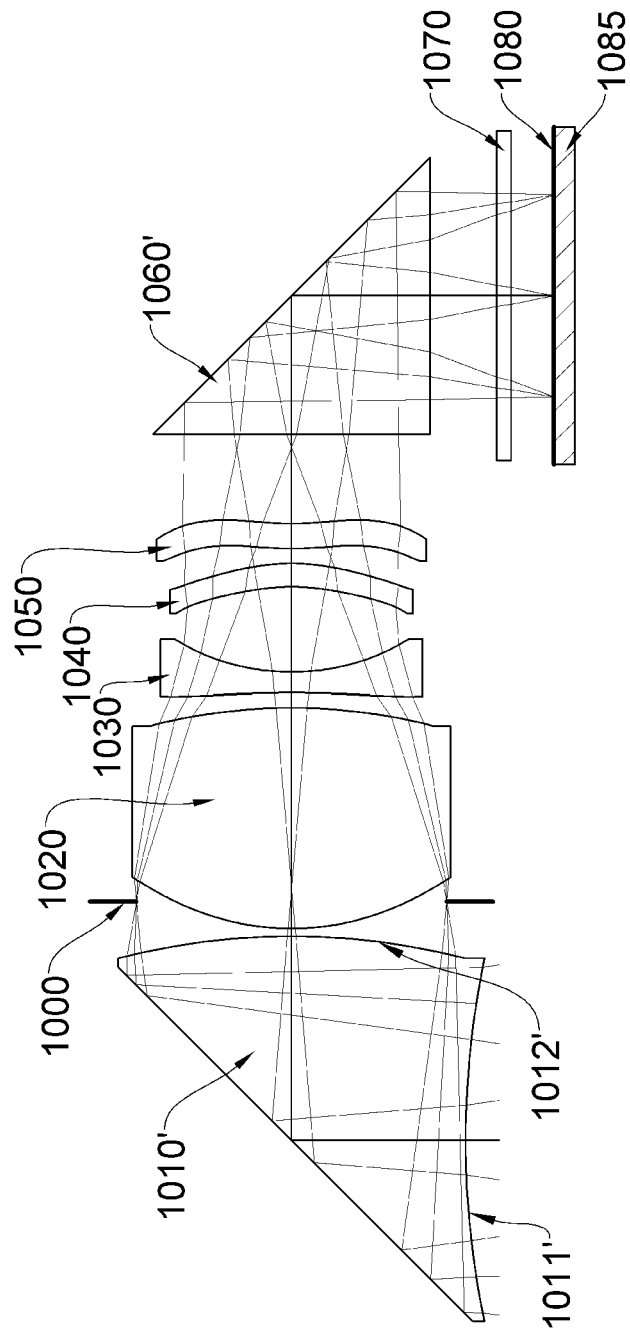
FIG. 10E is a schematic view of an imaging apparatus with reflective surfaces in a second zoom state equivalent to the 10th embodiment of the present disclosure.
Figure 10F:
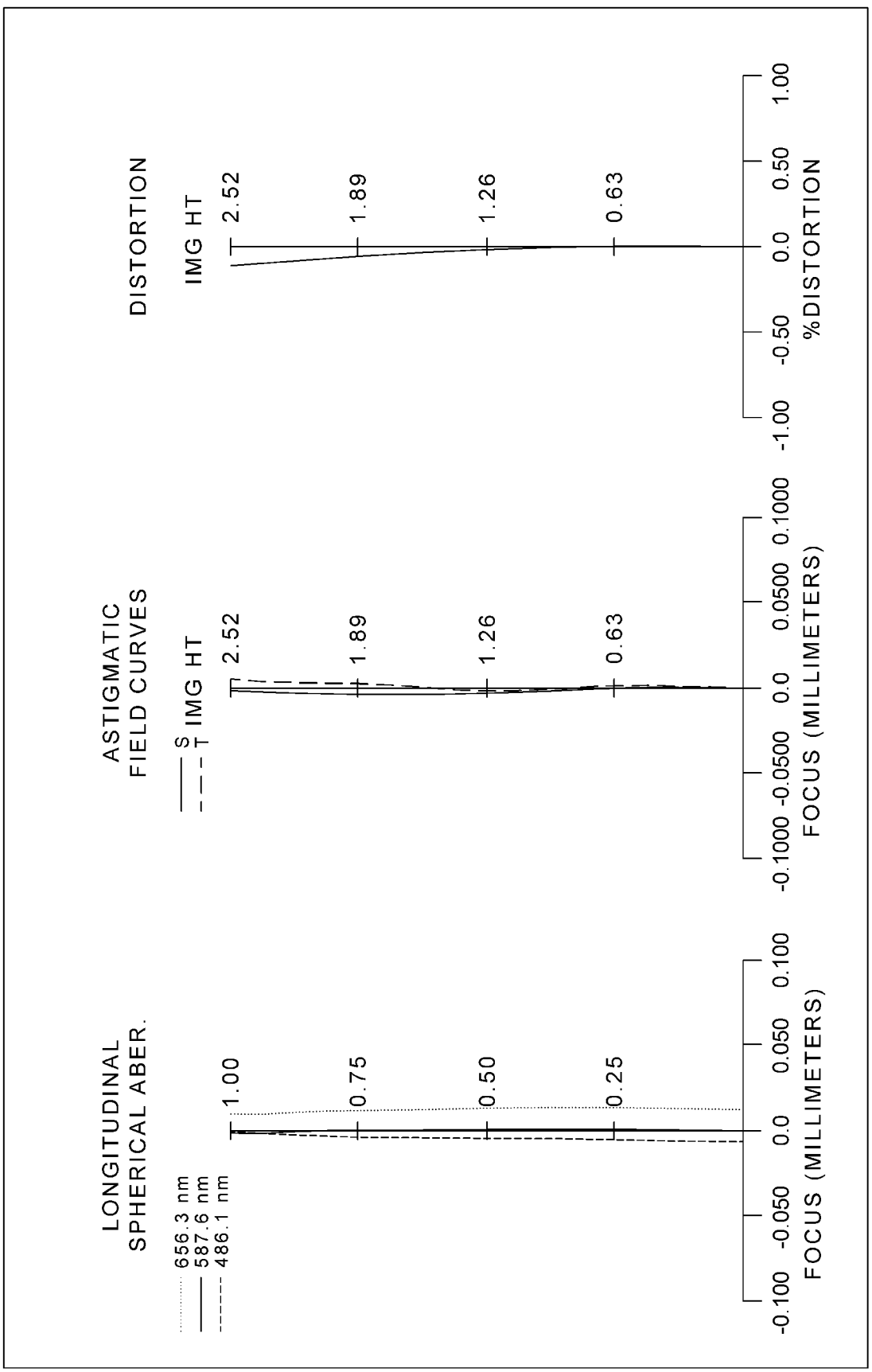
FIG. 10F shows longitudinal spherical aberration curves, astigmatic field curves and a distortion curve of the imaging apparatus in the second zoom state according to the 10th embodiment.

FIG. 10D is a schematic view of an imaging apparatus in a second zoom state according to the 10th embodiment of the present disclosure. FIG. 10E is a schematic view of an imaging apparatus with reflective surfaces in a second zoom state equivalent to the 10th embodiment of the present disclosure. FIG. 10F shows, in order from left to right, longitudinal spherical aberration curves, astigmatic field curves and a distortion curve of the imaging apparatus in a second zoom state according to the 10th embodiment. The imaging apparatus according to the 10th embodiment changes from the first zoom state into the second zoom state by changing the distance between the image-side surface 1012 of the first optical element 1010 and the stop 1000 from 0.703 mm to 0.516 mm, and changing the distance between the filter 1070 and the image surface 1080 from 0.454 mm to 0.641 mm. As such, an axial distance between the image-side surface 1012 of the first optical element 1010 and the image surface 1080 along the optical path remains the same while performing focusing. The configuration of the rest optical elements of the 10th embodiment in the second zoom state is the same as that in the first zoom state. FIG. 10E is a schematic view of an imaging apparatus with reflective surfaces in a second zoom state equivalent to the 10th embodiment of the present disclosure. All the descriptions thereto are the same as the aforementioned zoom state and explanations in this regard will not be provided again.

The detailed optical data of the 10th embodiment are shown in TABLE 19, and the aspheric surface data are shown in TABLE 20.

TABLE 19

(10th Embodiment)
First zoom state: f = 10.31 mm, Fno = 2.50, HFOV = 13.7 deg.
Second zoom state: f = 10.29 mm, Fno = 2.56, HFOV = 13.5 deg.

| Surface # | | Curvature Radius | | Thickness (First zoom state) | Thickness (Second zoom state) | Material | Index | Abbe # | Focal Length |
|---|---|---|---|---|---|---|---|---|---|
| 0 | Object | Plano | | Infinity | 600.0 | | | | |
| 1 | Optical element 1* | −13.316 | SPH | 5.650 | | Glass | 1.517 | 64.2 | 53.18 |
| 2 | | −10.267 | SPH | 0.703 | 0.516 | | | | |
| 3 | Ape. Stop | Plano | | −0.403 | | | | | |
| 4 | Optical element 2 | 3.828 | ASP | 3.301 | | Plastic | 1.544 | 56.0 | 5.18 |
| 5 | | −7.424 | ASP | 0.218 | | | | | |
| 6 | Optical element 3 | −17.929 | ASP | 0.310 | | Plastic | 1.607 | 26.6 | −4.60 |
| 7 | | 3.329 | ASP | 1.272 | | | | | |
| 8 | Optical element 4 | −3.019 | ASP | 0.350 | | Plastic | 1.686 | 18.4 | 57.72 |
| 9 | | −2.937 | ASP | 0.221 | | | | | |
| 10 | Optical element 5 | 4.318 | ASP | 0.374 | | Plastic | 1.584 | 28.2 | −176.96 |
| 11 | | 4.013 | ASP | 1.338 | | | | | |
| 12 | Prism | Plano | | 4.140 | | Glass | 1.954 | 32.3 | — |
| 13 | | Plano | | 1.000 | | | | | |
| 14 | Filter | Plano | | 0.210 | | Glass | 1.517 | 64.2 | — |
| 15 | | Plano | | 0.454 | 0.641 | | | | |
| 16 | Image Surface | Plano | | — | — | | | | |

Remark: Reference wavelength is d-line 587.6 nm.
*Optical element 1 is a prism with refractive power.

TABLE 20

Aspheric Coefficient

| Surface # | 4 | 5 | 6 | 7 |
|---|---|---|---|---|
| k= | 0.0000E+00 | 0.0000E+00 | 0.0000E+00 | 0.0000E+00 |
| A4= | −7.9300E−04 | 9.4513E−03 | 3.4726E−03 | −4.5118E−03 |
| A6= | −9.4135E−05 | −5.5892E−03 | −6.0350E−03 | −2.1318E−03 |
| A8= | −8.7312E−06 | 2.6447E−03 | 6.1597E−03 | 3.8551E−03 |
| A10= | −1.1028E−06 | −8.8386E−04 | −2.7398E−03 | −1.2171E−03 |
| A12= | −7.4246E−08 | 1.7777E−04 | 6.5103E−04 | 1.6592E−05 |
| A14= | 7.6876E−09 | −1.9356E−05 | −7.9022E−05 | 5.4067E−05 |
| A16= | −1.8586E−09 | 8.7293E−07 | 3.8251E−06 | −7.9224E−06 |

| Surface # | 8 | 9 | 10 | 11 |
|---|---|---|---|---|
| k= | 0.0000E+00 | 0.0000E+00 | 0.0000E+00 | 0.0000E+00 |
| A4= | 6.8013E−02 | 5.2341E−02 | −9.0518E−02 | −9.6132E−02 |
| A6= | −4.9633E−02 | −3.5097E−02 | 1.8030E−02 | 3.4142E−02 |
| A8= | 2.7233E−02 | 1.8268E−02 | −1.5940E−02 | −1.6419E−02 |
| A10= | −9.1228E−03 | −3.8349E−03 | 1.2480E−03 | 8.7531E−03 |
| A12= | 1.7887E−03 | −2.8597E−04 | −1.2096E−03 | −3.9172E−03 |
| A14= | −2.9594E−04 | 1.8739E−04 | 3.7603E−04 | 1.1845E−03 |
| A16= | 3.4925E−05 | −1.1885E−05 | −4.2883E−05 | −2.2254E−04 |
| A18= | | | 1.2304E−06 | 2.3729E−05 |
| A20= | | | | −1.1081E−06 |

In the 10th embodiment, the equation of the aspheric surface profiles of the aforementioned optical elements is the same as the equation of the 1st embodiment. Also, the definitions of these parameters shown in table below are the same as those stated in the 1st embodiment with corresponding values for the 10th embodiment, so an explanation in this regard will not be provided again.

Moreover, these parameters can be calculated from TABLE 19 and TABLE 20 and satisfy the conditions stated in table below.

| 10th Embodiment | | | |
|---|---|---|---|
| f [mm] | 10.31 | ΣCT/CT1 | 1.77 |
| Fno | 2.50 | Dr3r10/BL | 0.85 |
| HFOV [deg.] | 13.7 | |f/R1| + |f/R2| | 1.78 |
| Y2R1 | 2.38 | (f/R3) + (f/R6) | 5.79 |
| Y5R2 | 2.02 | (f/R9) + (f/R10) | 4.96 |
| V1/N1 | 42.32 | |f2/f1| | 0.10 |
| V2/N2 | 36.26 | |f2/f4| | 0.09 |
| V3/N3 | 16.57 | |f2/f5| | 0.03 |
| V4/N4 | 10.90 | |f3/f1| | 0.09 |
| V5/N5 | 17.83 | |f3/f2| | 0.89 |
| Tg1 (° C.) | 556.00 | |f3/f4| | 0.08 |
| Tg1/N1 | 366.56 | |f3/f5| | 0.03 |
| Y2R1/Y5R2 | 1.18 | f/f1 | 0.19 |
| CT2/CT3 | 10.65 | |f/f2| + |f/f3| | 4.24 |
| (CT2 + CT3)/(CT4 + CT5) | 4.99 | | |

11th Embodiment

Figure 11A:
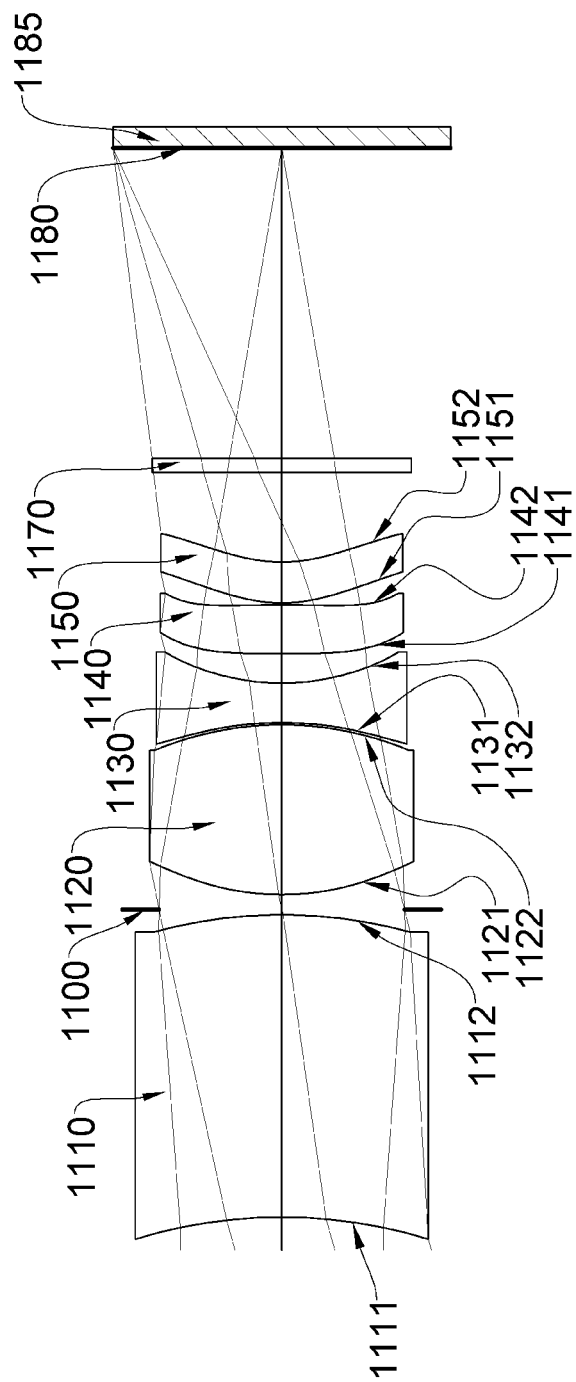
FIG. 11A is a schematic view of an imaging apparatus according to the 11th embodiment of the present disclosure.
Figure 11B:
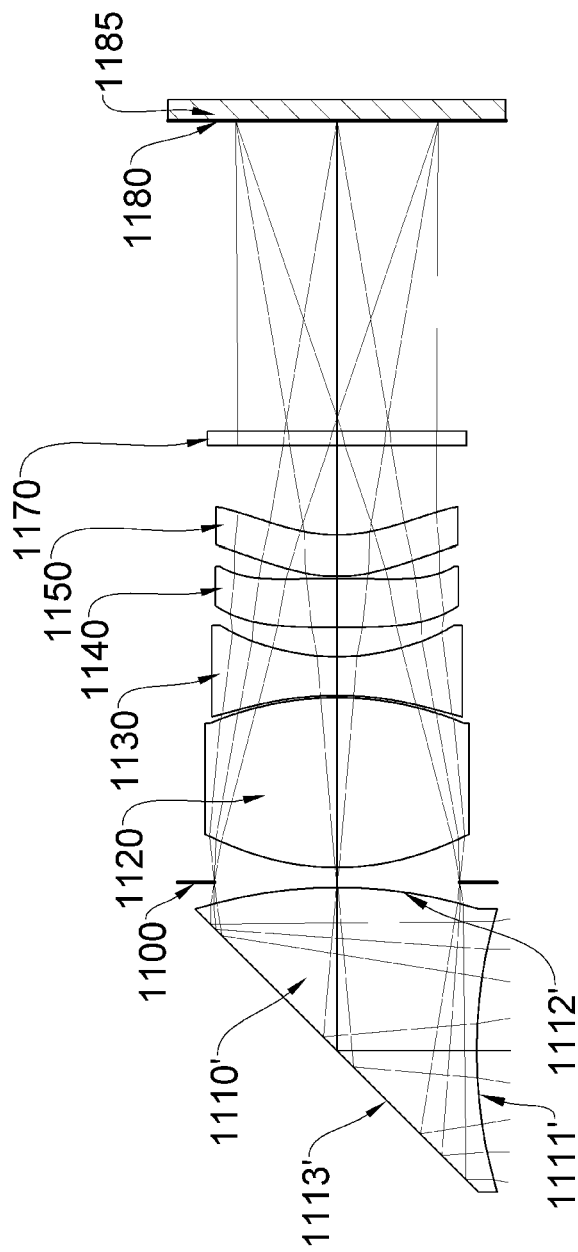
FIG. 11B is a schematic view of an imaging apparatus with reflective surfaces equivalent to the 11th embodiment of the present disclosure.
Figure 11C:
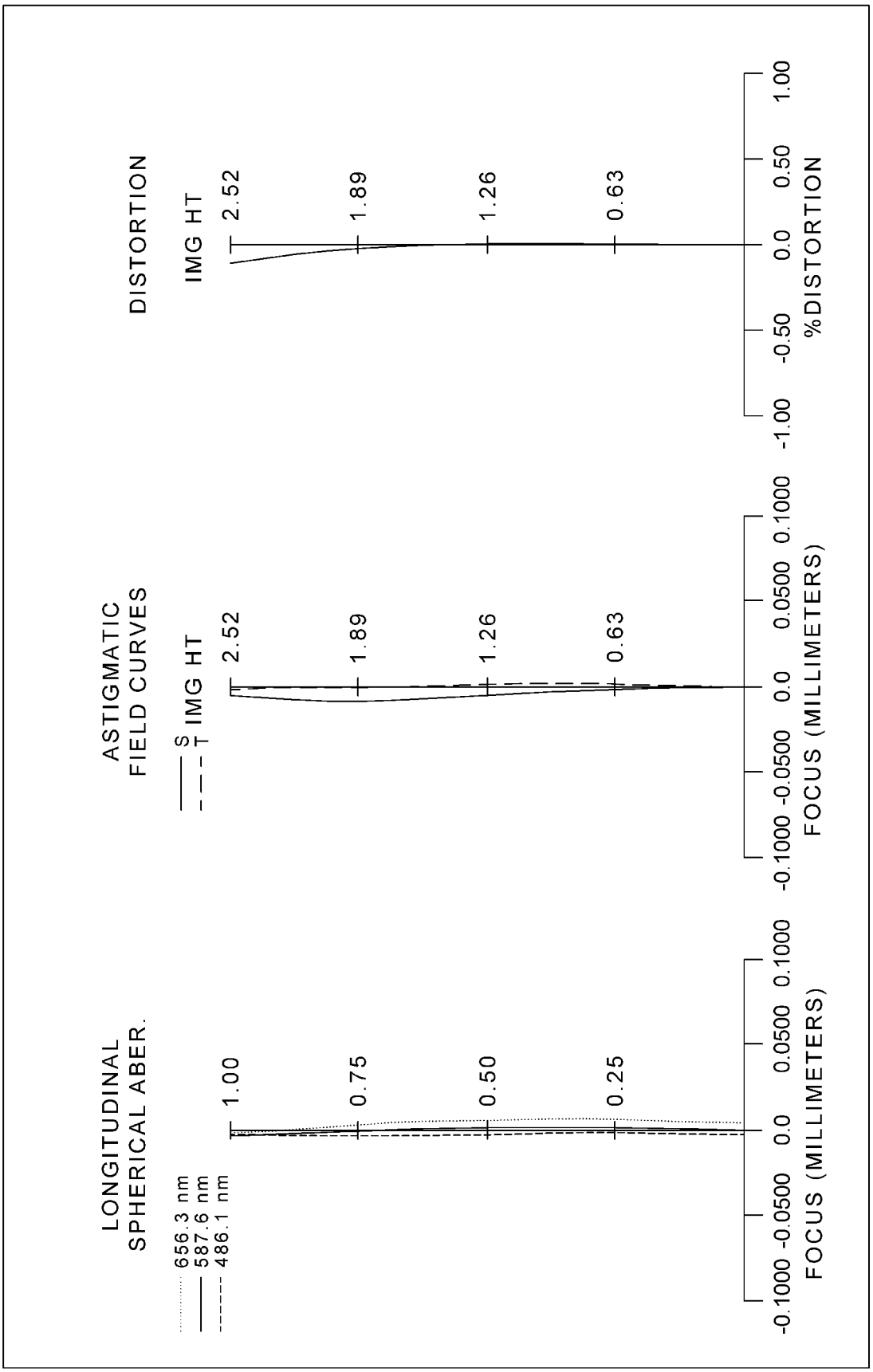
FIG. 11C shows longitudinal spherical aberration curves, astigmatic field curves and a distortion curve of the imaging apparatus according to the 11th embodiment.

FIG. 11A is a schematic view of an imaging apparatus according to the 11th embodiment of the present disclosure. FIG. 11B is a schematic view of an imaging apparatus with reflective surfaces equivalent to the 11th embodiment of the present disclosure. FIG. 11C shows, in order from left to right, longitudinal spherical aberration curves, astigmatic field curves and a distortion curve of the imaging apparatus according to the 11th embodiment.

In FIG. 11A, the imaging apparatus includes an imaging optical lens assembly (not otherwise herein labeled) of the present disclosure and an image sensor 1185. The imaging optical lens assembly includes, in order from an object side to an image side along an optical path, a first optical element 1110, an aperture stop 1100, a second optical element 1120, a third optical element 1130, a fourth optical element 1140, a fifth optical element 1150, a filter 1170, and an image surface 1180. There is no additional optical element inserted between the first optical element 1110 and the fifth optical element 1150. There are air gaps between paraxial regions of the first optical element 1110, the second optical element 1120, the third optical element 1130, the fourth optical element 1140, and the fifth optical element 1150.

The first optical element 1110 with positive refractive power has an object-side surface 1111 being concave in the paraxial region thereof, and an image-side surface 1112 being convex in the paraxial region thereof. Both the object-side surface 1111 and the image-side surface 1112 are spherical. The first optical element 1110 is made of glass material.

The second optical element 1120 with positive refractive power has an object-side surface 1121 being convex in the paraxial region thereof, and an image-side surface 1122 being convex in the paraxial region thereof. Both the object-side surface 1121 and the image-side surface 1122 are aspheric. The second optical element 1120 is made of plastic material.

The third optical element 1130 with negative refractive power has an object-side surface 1131 being concave in the paraxial region thereof, and an image-side surface 1132 being concave in the paraxial region thereof. Both the object-side surface 1131 and the image-side surface 1132 are aspheric. The third optical element 1130 is made of plastic material.

The fourth optical element 1140 with positive refractive power has an object-side surface 1141 being convex in the paraxial region thereof, and an image-side surface 1142 being convex in the paraxial region thereof. Both the object-side surface 1141 and the image-side surface 1142 are aspheric. The fourth optical element 1140 is made of plastic material.

The fifth optical element 1150 with positive refractive power has an object-side surface 1151 being convex in the paraxial region thereof, and an image-side surface 1152 being concave in the paraxial region thereof. Both the object-side surface 1151 and the image-side surface 1152 are aspheric. The fifth optical element 1150 is made of plastic material.

The filter 1170 is disposed between the fifth optical element 1150 and the image surface 1180. The filter 1170 is made of glass material and will not affect the focal length of the imaging optical lens assembly. The image sensor 1185 is disposed on the image surface 1180 of the imaging optical lens assembly.

FIG. 1/B is a schematic view of an imaging apparatus with reflective surfaces equivalent to the 11th embodiment of the present disclosure. In FIG. 11B, a first optical element 1110' is a prism including a reflective surface 1113' so as to fold the optical path by 90 degrees. An object-side surface 1111' of the first optical element 1110' corresponds to the object-side surface 1111 of the first optical element 1110 and an image-side surface 1112' of the first optical element 1110' corresponds to the image-side surface 1112 of the first optical element 1110 such that the overall optical properties of the first optical element 1110' are equivalent to those of the first optical element 1110 shown in FIG. 11A. According to the aforementioned configuration, an imaging apparatus equivalent to the 11th embodiment with the optical path being folded can be obtained.

The detailed optical data of the 11th embodiment are shown in TABLE 21, and the aspheric surface data are shown in TABLE 22.

TABLE 21

(11th Embodiment)
f = 9.10 mm, Fno = 3.00, HFOV = 15.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Optical element 1* | −7.409 | SPH | 4.519 | Glass | 1.540 | 59.7 | 54.38 |
| 2 | | −7.182 | SPH | 0.078 | | | | |
| 3 | Ape. Stop | Plano | | 0.222 | | | | |
| 4 | Optical element 2 | 3.876 | ASP | 2.538 | Plastic | 1.544 | 56.0 | 4.47 |
| 5 | | −5.020 | ASP | 0.030 | | | | |
| 6 | Optical element 3 | −6.131 | ASP | 0.581 | Plastic | 1.603 | 28.5 | −3.32 |
| 7 | | 3.080 | ASP | 0.441 | | | | |
| 8 | Optical element 4 | 60.957 | ASP | 0.729 | Plastic | 1.686 | 18.4 | 20.88 |
| 9 | | −18.638 | ASP | 0.030 | | | | |
| 10 | Optical element 5 | 2.166 | ASP | 0.612 | Plastic | 1.544 | 56.0 | 28.47 |
| 11 | | 2.267 | ASP | 1.338 | | | | |
| 12 | Filter | Plano | | 0.210 | Glass | 1.517 | 64.2 | — |
| 13 | | Plano | | 4.643 | | | | |
| 14 | Image Surface | Plano | | — | | | | |

Remark: Reference wavelength is d-line 587.6 nm.
*Optical element 1 is a prism with refractive power.

TABLE 22

Aspheric Coefficient

| Surface # | 4 | 5 | 6 | 7 |
|---|---|---|---|---|
| k= | 5.5794E−02 | −2.9545E−01 | 0.0000E+00 | 0.0000E+00 |
| A4= | −1.2868E−03 | −7.8017E−03 | −2.7586E−02 | −2.8551E−02 |
| A6= | −2.5561E−04 | 7.1835E−03 | 2.0203E−02 | 1.3015E−02 |
| A8= | 2.9171E−05 | −3.2272E−03 | −7.7376E−03 | −4.0217E−03 |
| A10= | −3.4006E−05 | 8.0677E−04 | 1.8984E−03 | 1.7224E−03 |
| A12= | 8.7438E−06 | −1.2037E−04 | −2.8972E−04 | −6.9451E−04 |
| A14= | −1.3669E−06 | 1.0080E−05 | 2.6154E−05 | 1.5009E−04 |
| A16= | 5.8889E−08 | −3.7272E−07 | −1.0764E−06 | −1.2131E−05 |

| Surface # | 8 | 9 | 10 | 11 |
|---|---|---|---|---|
| k= | 0.0000E+00 | 0.0000E+00 | 0.0000E+00 | 0.0000E+00 |
| A4= | 4.0592E−02 | 2.1984E−02 | −5.8228E−02 | −4.7952E−02 |
| A6= | −1.8294E−02 | −3.8322E−03 | 8.0002E−03 | 3.7175E−03 |
| A8= | 1.0618E−02 | 4.2061E−03 | −1.7092E−03 | −1.3134E−03 |
| A10= | −3.0092E−03 | −7.0051E−04 | 4.4975E−04 | 3.8122E−04 |
| A12= | 3.4877E−04 | −1.7432E−04 | −1.7493E−04 | 9.0051E−05 |
| A14= | 4.7263E−06 | 7.3433E−05 | 1.6765E−06 | −1.7423E−04 |
| A16= | −3.0375E−06 | −7.4904E−06 | 1.0876E−05 | 6.9081E−05 |
| A18= | | | −1.6612E−06 | −1.1761E−05 |
| A20= | | | | 7.4151E−07 |

In the 11th embodiment, the equation of the aspheric surface profiles of the aforementioned optical elements is the same as the equation of the 1st embodiment. Also, the definitions of these parameters shown in table below are the same as those stated in the 1st embodiment with corresponding values for the 11th embodiment, so an explanation in this regard will not be provided again.

Moreover, these parameters can be calculated from TABLE 21 and TABLE 22 and satisfy the conditions stated in table below.

| 11th Embodiment | | | |
|---|---|---|---|
| f [mm] | 9.10 | ΣCT/CT1 | 1.99 |
| Fno | 3.00 | Dr3r10/BL | 0.80 |
| HFOV [deg.] | 15.5 | \|f/R1\| + \|f/R2\| | 2.50 |
| Y2R1 | 1.97 | (f/R3) + (f/R6) | 5.30 |
| Y5R2 | 1.80 | (f/R9) + (f/R10) | 8.21 |
| V1/N1 | 38.77 | \|f2/f1\| | 0.08 |
| V2/N2 | 36.26 | \|f2/f4\| | 0.21 |
| V3/N3 | 17.78 | \|f2/f5\| | 0.16 |
| V4/N4 | 10.90 | \|f3/f1\| | 0.06 |
| V5/N5 | 36.26 | \|f3/f2\| | 0.74 |
| Tg1 (° C.) | 554.00 | \|f3/f4\| | 0.16 |
| Tg1/N1 | 359.75 | \|f3/f5\| | 0.12 |
| Y2R1/Y5R2 | 1.09 | f/f1 | 0.17 |
| CT2/CT3 | 4.37 | \|f/f2\| + \|f/f3\| | 4.78 |
| (CT2 + CT3)/(CT4 + CT5) | 2.33 | | |

12th Embodiment

Figure 16:
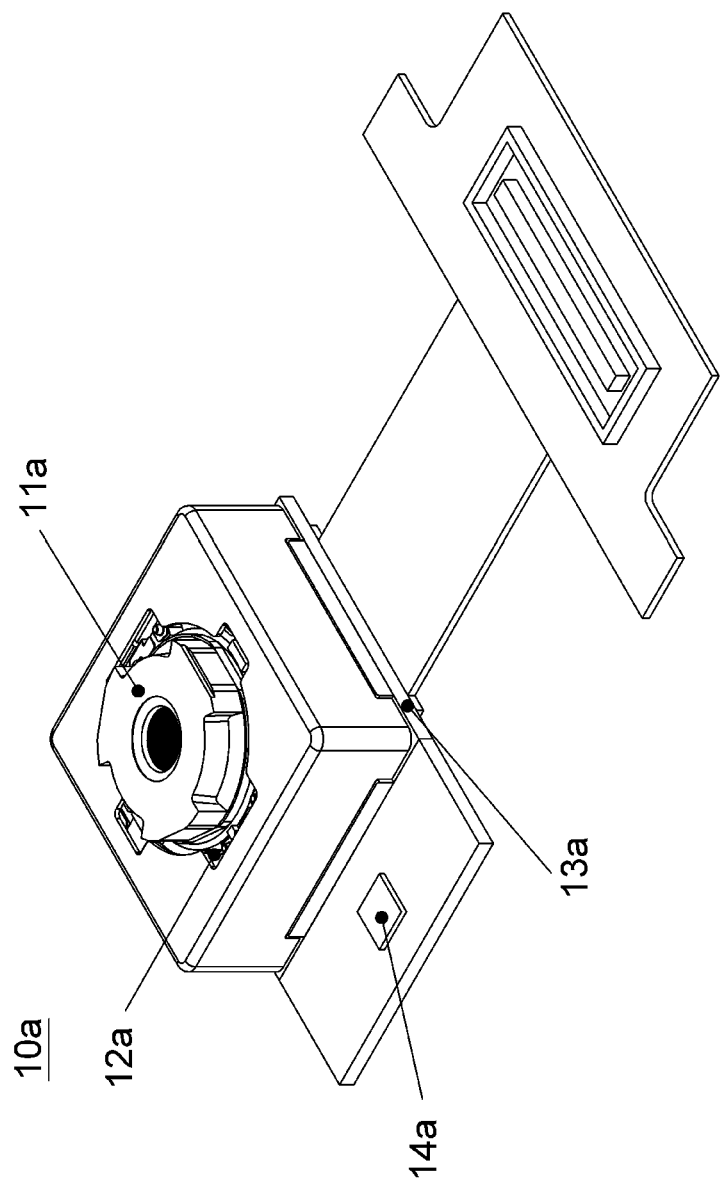
FIG. 16 is a 3-dimensional schematic view of an imaging apparatus according to the 12th embodiment of the present disclosure.

FIG. 16 is a 3-dimensional schematic view of an imaging apparatus 10a according to the 12th embodiment of the present disclosure. In the present embodiment, the imaging apparatus 10a is a camera module. The imaging apparatus 10a includes an imaging optical lens assembly 11a, a driving device 12a, and an image sensor 13a. The imaging optical lens assembly 11a includes the imaging optical lens assembly of the 1st embodiment described above and a lens barrel (not otherwise herein labeled) for carrying the imaging optical lens assembly. The imaging apparatus 10a uses the imaging optical lens assembly 11a to converge light and generates an image by, utilizes the driving device 12a for focusing so as to photograph on the image sensor 13a (that is the image sensor 185 in the 1st embodiment), and outputs the image data thereafter.

The driving device 12a may be an auto-focus module that can be driven by a voice coil motor (VCM), a micro electro-mechanical system (MEMS), a piezoelectric system, shape memory alloys or other driving systems. The driving device 12a allows the imaging optical lens assembly 11a to obtain a better imaging position, so that a clear image can be obtained wherever an imaged object is positioned with different object distances.

The imaging apparatus 10a may be equipped with an image sensor 13a (e.g., CMOS, CCD) with high sensitivity and low noise on the image surface to provide accurate and satisfactory image quality from the imaging optical lens assembly.

In addition, the imaging apparatus 10a may further include an image stabilizer 14a, which may be a motion sensing element such as an accelerometer, a gyro sensor or a Hall Effect sensor. The image stabilizer 14a in the 12th embodiment is a gyro sensor but is not limited thereto. By adjusting the photographing lens system in different axial directions to provide compensation for image blurs due to motion during exposures, the image quality under dynamic and low-light circumstances can be further improved, and enhanced image compensation functions such as optical image stabilization (OIS) or electronic image stabilization (EIS) can also be provided.

The imaging apparatus 10a of the present disclosure is not limited to be applied to the smartphone. The imaging apparatus 10a may be used in a system of moving focus and features excellent aberration corrections with satisfactory image quality. For example, the imaging apparatus 10a may be applied to a variety of applications such as car electronics, drones, smart electronic products, tablet computers, wearable devices, medical devices, precision instruments, surveillance cameras, portable video recorders, identification systems, multi-lens devices, somatosensory detections, virtual realities, motion devices, smart home systems and other electronic devices.

13th Embodiment

Figure 17A:
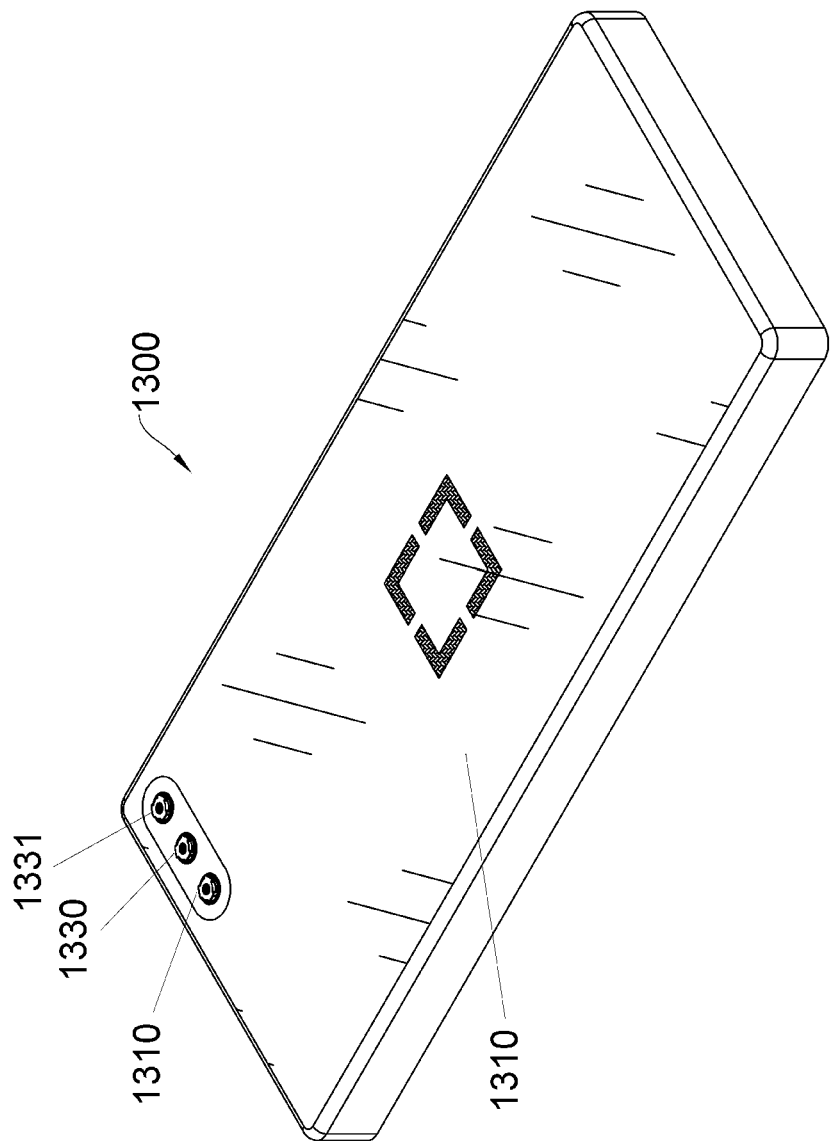
FIG. 17A is a front view of an electronic device according to the 13th embodiment of the present disclosure.

FIG. 17A is a front view of an electronic device 1300 according to the 13th embodiment of the present disclosure.

Figure 17B:
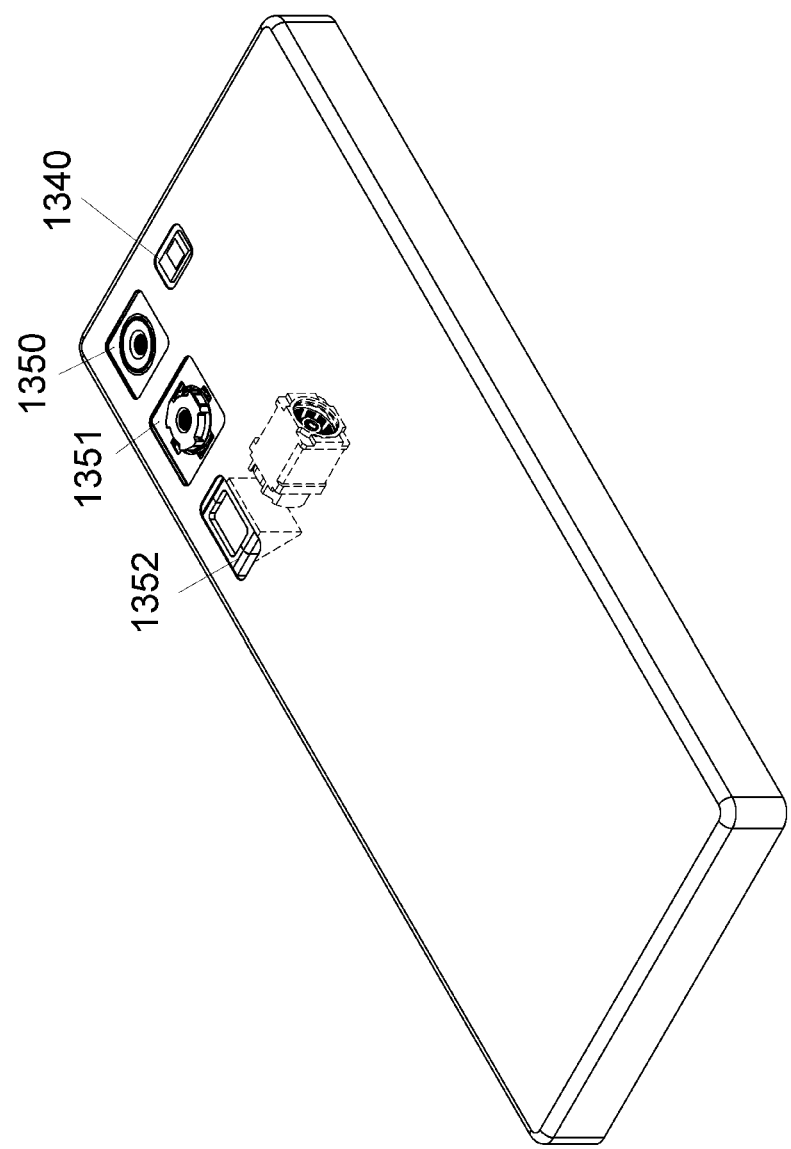
FIG. 17B is a rear view of the electronic device according to the 13th embodiment of the present disclosure.

FIG. 17B is a rear view of the electronic device 1300 shown in the FIG. 17A. In the present embodiment, the electronic device 1300 is a smartphone. As shown in FIG. 17A, the electronic device 1300 includes a display 1310, a TOF (Time of Flight) module 1320, an imaging apparatus 1330, and an imaging apparatus 1331 on the front surface. The imaging apparatus 1330 and the imaging apparatus 1331 are positioned above the top of the display 1310, facing toward the same direction and are horizontally disposed on an upper edge of the electronic device. The imaging apparatus 1330 is an ultra-wide angle imaging apparatus and the imaging apparatus 1331 is a wide angle imaging apparatus. The field of view of the imaging apparatus 1330 is larger than that of the imaging apparatus 1331 by at least 20 degrees.

As shown in FIG. 17B, the electronic device 1300 includes a flash module 1340, an imaging apparatus 1350, an imaging apparatus 1351, and an imaging apparatus 1352 on the back surface. The imaging apparatus 1350, the imaging apparatus 1351, and the imaging apparatus 1352 face toward the same direction and are vertically disposed on the back surface of the electronic device 1300. The flash module 1340 is disposed on the upper edge of the back surface of the electronic device 1300 near the imaging apparatus 1350. The imaging apparatus 1350 is an ultra-wide angle imaging apparatus. The imaging apparatus 1351 is a wide angle imaging apparatus. The imaging apparatus 1352 is a telephoto imaging apparatus utilizing the imaging optical lens assembly with reflective surfaces according to the 1st embodiment of the present disclosure. The field of view of the imaging apparatus 1350 is larger than that of the imaging apparatus 1351 by at least 20 degrees. The field of view of the imaging apparatus 1351 is larger than that of the imaging apparatus 1352 by at least 20 degrees. As such, the largest field of view, which is the field of view of the imaging apparatus 1350, among the imaging apparatuses disposed on the back surface of the electronic device 1300, is larger than the smallest field of view, which is the field of view of the imaging apparatus 1352, by at least 40 degrees.

14th Embodiment

Figure 18:
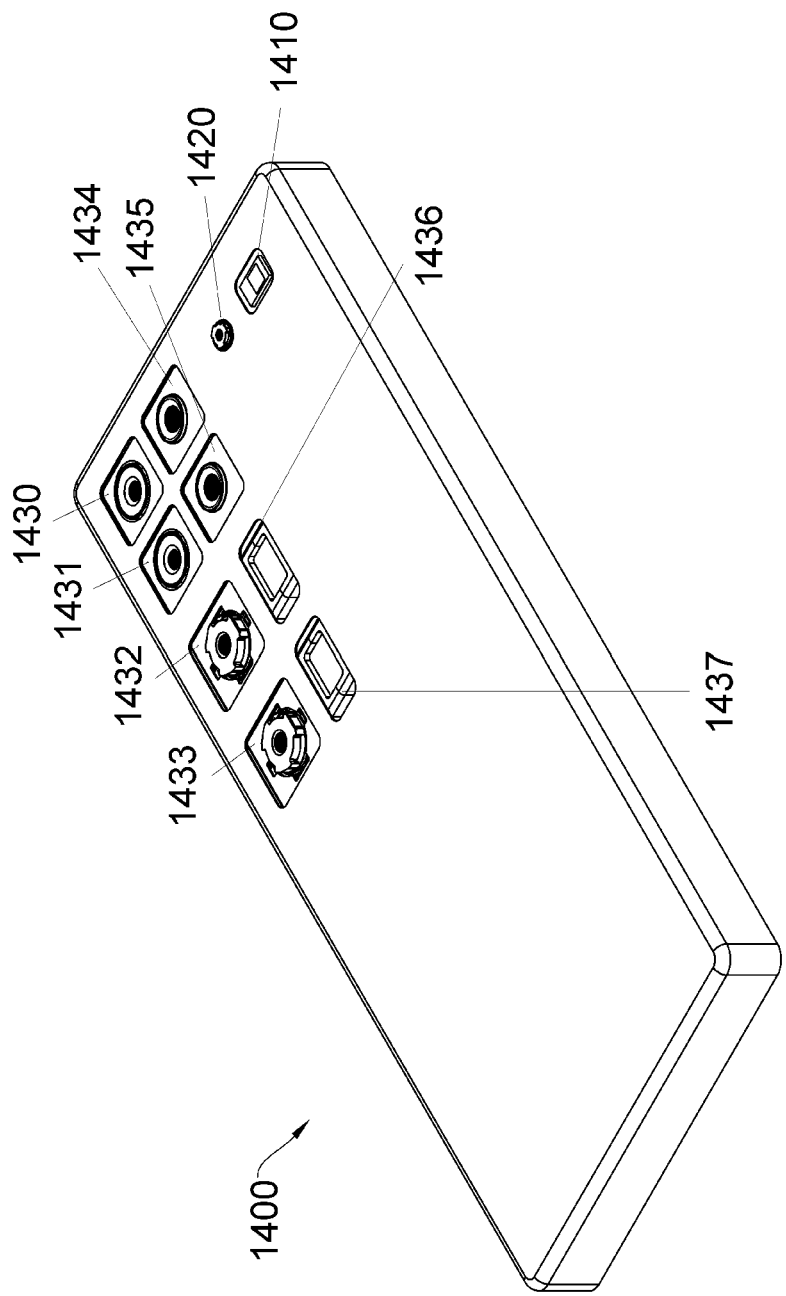
FIG. 18 is a rear view of an electronic device according to the 14th embodiment of the present disclosure.

FIG. 18 is a rear view of the electronic device 1400 according to the 14th embodiment of the present disclosure. As shown in FIG. 18, the electronic device 1400 includes a flash module 1410, a TOF (Time of Flight) module 1420, an imaging apparatus 1430, an imaging apparatus 1431, an imaging apparatus 1432, an imaging apparatus 1433, an imaging apparatus 1434, an imaging apparatus 1435, an imaging apparatus 1436, and an imaging apparatus 1437 on the back surface. The imaging apparatus 1430, the imaging apparatus 1431, the imaging apparatus 1432, the imaging apparatus 1433, the imaging apparatus 1434, the imaging apparatus 1435, the imaging apparatus 1436, and the imaging apparatus 1437 face toward the same direction and are vertically disposed in two rows on the back surface of the electronic device 1400. The flash module 1410 and the TOF module 1420 are disposed on the upper edge of the back surface of the electronic device 1400 near the imaging apparatus 1434. The imaging apparatus 1430 and the imaging apparatus 1431 are ultra-wide angle imaging apparatuses. The imaging apparatus 1432 and the imaging apparatus 1433 are wide angle imaging apparatuses. The imaging apparatus 1434 and the imaging apparatus 1435 are telephoto imaging apparatuses utilizing the imaging optical lens assembly according to the 1st embodiment of the present disclosure. The imaging apparatus 1436 and the imaging apparatus 1437 are telephoto imaging apparatuses utilizing the imaging optical lens assembly with reflective surfaces according to the 1st embodiment of the present disclosure. The fields of view of the imaging apparatus 1430 and the imaging apparatus 1431 are larger than those of the imaging apparatus 1432 and the imaging apparatus 1433 by at least 20 degrees. The fields of view of the imaging apparatus 1432 and the imaging apparatus 1433 are larger than those of the imaging apparatus 1434, the imaging apparatus 1435, the imaging apparatus 1436, and the imaging apparatus 1437 by at least 20 degrees. As such, the largest fields of view, which are the fields of view of the imaging apparatus 1430 and the imaging apparatus 1431, among the imaging apparatuses disposed on the back surface of the electronic device 1400, are larger than the smallest fields of view, which are the fields of view of the imaging apparatus 1434, the imaging apparatus 1435, the imaging apparatus 1436 and the imaging apparatus 1437, by at least 40 degrees.

The aforementioned exemplary figures of different electronic devices are only exemplary for showing the imaging apparatus of the present disclosure installed in an electronic device, and the present disclosure is not limited thereto. Preferably, the electronic device can further include a control unit, a display unit, a storage unit, a random access memory unit (RAM) or a combination thereof.

The foregoing description, for purpose of explanation, has been described with reference to specific embodiments. It is to be noted that TABLES 1-22 show different data of the different embodiments; however, the data of the different embodiments are obtained from experiments. The embodiments were chosen and described in order to best explain the principles of the disclosure and its practical applications, and thereby to enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging optical lens assembly, comprising several optical elements with refractive power, in order from an object side to an image side along an optical path, being a first optical element, a second optical element and a third optical element;

wherein the first optical element has positive refractive power and being made of plastic material, and the first optical element is a reflective element, the imaging optical lens assembly comprises another reflective element, and the imaging optical lens assembly provides a focusing function to perform focusing by changing a distance between the first optical element and the second optical element, and an axial distance between an image-side surface of the first optical element and an image surface along the optical path remains the same while focusing;

wherein an Abbe number of an optical element with refractive power is V, a refractive index of the optical element with refractive power is N, and at least one of the several optical elements with refractive power satisfies the following condition:

$$5.0 < V/N < 12.0.$$

2. The imaging optical lens assembly of claim 1, comprising the first optical element, the second optical element, the third optical element, a fourth optical element, and a fifth optical element, the fifth optical element has an object-side surface being convex in a paraxial region thereof, and the fifth optical element has an image-side surface being concave in a paraxial region thereof.

3. The imaging optical lens assembly of claim 1, comprising the first optical element, the second optical element, the third optical element and a fourth optical element, the fourth optical element has an object-side surface being concave in a paraxial region thereof, a curvature radius of an object-side surface of the third optical element and a curvature radius of an image-side surface of the third optical element have the same sign.

4. The imaging optical lens assembly of claim 1, wherein a focal length of the second optical element is f2, a focal length of the third optical element is f3, and the following condition is satisfied:

$$|f3/f2|<1.0.$$

5. The imaging optical lens assembly of claim 1, wherein an f-number of the imaging optical lens assembly is Fno, a focal length of the imaging optical lens assembly is f, a curvature radius of an object-side surface of the first optical element is R1, a curvature radius of an image-side surface of the first optical element is R2, and the following conditions are satisfied:

$$2.0<Fno<4.0;\text{ and}$$

$$0.50<|f/R1|+|f/R2|<2.50.$$

6. The imaging optical lens assembly of claim 1, wherein a focal length of the imaging optical lens assembly is f, a curvature radius of an object-side surface of the first optical element is R1, a curvature radius of an image-side surface of the first optical element is R2, and the following condition is satisfied:

$$0.50<|f/R1|+|f/R2|\leq1.36.$$

7. The imaging optical lens assembly of claim 1, comprising the first optical element, the second optical element, the third optical element, a fourth optical element, and a fifth optical element, wherein a sum of axial thicknesses of the first optical element, the second optical element, the third optical element, the fourth optical element and the fifth optical element along the optical path is ΣCT, an axial thickness of the first optical element along the optical path is CT1, and the following condition is satisfied:

$$\Sigma CT/CT1<2.30.$$

8. The imaging optical lens assembly of claim 1, comprising the first optical element, the second optical element, the third optical element, a fourth optical element, and a fifth optical element, a maximum vertical distance between a point on an effective optical region of an object-side surface of the second optical element and an optical axis is Y2R1, a maximum vertical distance between a point on an effective optical region of an image-side surface of the fifth optical element and the optical axis is Y5R2, and the following condition is satisfied:

$$0.90<Y2R1/Y5R2<1.25.$$

9. The imaging optical lens assembly of claim 1, wherein an object-side surface of the first optical element is concave in a paraxial region thereof.

10. An imaging apparatus, comprising the imaging optical lens assembly of claim 1 and an image sensor.

11. An electronic device, comprising at least three imaging apparatuses, wherein one of the three imaging apparatuses is the imaging apparatus of claim 10, the three imaging apparatuses face the same direction, a maximum angle of view among the three imaging apparatuses is FOVmax, a minimum angle of view among the three imaging apparatuses is FOVmin, and the following condition is satisfied:

$$40<FOVmax-FOVmin.$$

12. An imaging optical lens assembly, comprising several optical elements with refractive power, in order from an object side to an image side along an optical path, being a first optical element, a second optical element and a third optical element;
wherein the first optical element has positive refractive power and being made of plastic material, and the first optical element is a reflective element, the imaging optical lens assembly comprises another reflective element, and the imaging optical lens assembly provides a focusing function to perform focusing by changing a distance between the first optical element and the second optical element, and an axial distance between an image-side surface of the first optical element and an image surface along the optical path remains the same while focusing;
wherein an f-number of the imaging optical lens assembly is Fno, and the following condition is satisfied:

$$2.0<Fno\leq2.55.$$

13. The imaging optical lens assembly of claim 12, comprising the first optical element, the second optical element, the third optical element, a fourth optical element, and a fifth optical element, the second optical element has positive refractive power and the fifth optical element has positive refractive power.

14. The imaging optical lens assembly of claim 12, comprising the first optical element, the second optical element, the third optical element and a fourth optical element, the fourth optical element has negative refractive power, and the fourth optical element has an object-side surface being concave in a paraxial region thereof.

15. The imaging optical lens assembly of claim 12, wherein a focal length of the first optical element is f1, a focal length of the second optical element is f2, a focal length of the third optical element is f3, and the following conditions are satisfied:

$$|f2/f1|<0.75;\text{ and}$$

$$|f3/f1|<0.75.$$

16. The imaging optical lens assembly of claim 12, wherein the first optical element is made of cyclo olefin polymer material, an axial thickness of the second optical element along the optical path is CT2, an axial thickness of the third optical element along the optical path is CT3, and the following condition is satisfied:

$$CT2/CT3<2.0.$$

17. The imaging optical lens assembly of claim 12, wherein the axial thickness of the second optical element along the optical path is CT2, the axial thickness of the third optical element along the optical path is CT3, and the following condition is satisfied:

$$CT2/CT3\leq1.47.$$

18. The imaging optical lens assembly of claim 12, wherein the first optical element has an object-side surface being concave in a paraxial region thereof, a focal length of the imaging optical lens assembly is f, a focal length of the first optical element is f1, and the following condition is satisfied:

$$0.03<f/f1<0.40.$$

19. An imaging optical lens assembly, comprising several optical elements with refractive power, in order from an object side to an image side along an optical path, being a first optical element, a second optical element, a third optical element, a fourth optical element and a fifth optical element;

wherein the first optical element has positive refractive power, the second optical element has positive refractive power, the fourth optical element has negative refractive power, the fifth optical element has positive refractive power, the fifth optical element has an object-side surface being convex in a paraxial region thereof, the fifth optical element has an image-side surface being concave in a paraxial region thereof, the first optical element is a reflective element and being made of plastic material, the imaging optical lens assembly comprises another reflective element, and the imaging optical lens assembly provides a focusing function to perform focusing by changing a distance between the first optical element and the second optical element, and an axial distance between an image-side surface of the first optical element and an image surface along the optical path remains the same while focusing;

wherein a focal length of the imaging optical lens assembly is f, a curvature radius of an object-side surface of the first optical element is R1, a curvature radius of an image-side surface of the first optical element is R2, and the following condition is satisfied:

$0.75<|f/R1|+|f/R2|<1.60.$

20. The imaging optical lens assembly of claim 19, wherein a sum of axial thicknesses of the first optical element, the second optical element, the third optical element, the fourth optical element and the fifth optical element along the optical path is ΣCT, an axial thickness of the first optical element along the optical path is CT1, and the following condition is satisfied:

$\Sigma CT/CT1<3.0.$

21. The imaging optical lens assembly of claim 19, wherein a focal length of the imaging optical lens assembly is f, a focal length of the second optical element is f2, a focal length of the third optical element is f3, and the following condition is satisfied:

$3.0<|f/f2|+|f/f3|<6.0.$

22. The imaging optical lens assembly of claim 19, wherein a focal length of the imaging optical lens assembly is f, a curvature radius of the object-side surface of the fifth optical element is R9, a curvature radius of the image-side surface of the fifth optical element is R10, and the following condition is satisfied:

$7.0<(f/R9)+(f/R10).$

23. The imaging optical lens assembly of claim 19, wherein a glass transition temperature of an optical element with refractive power is Tg, a refractive index of the optical element with refractive power is N, and at least one of the optical elements with refractive power satisfies the following condition:

$92.5<Tg/N<100.$

24. The imaging optical lens assembly of claim 19, wherein the first optical element has an object-side surface being concave in a paraxial region thereof.

* * * * *